US011775836B2

(12) United States Patent
Chidananda et al.

(10) Patent No.: US 11,775,836 B2
(45) Date of Patent: Oct. 3, 2023

(54) HAND POSE ESTIMATION

(71) Applicant: MAGIC LEAP, INC., Plantation, FL (US)

(72) Inventors: Prajwal Chidananda, Sunnyvale, CA (US); Ayan Tuhinendu Sinha, San Francisco, CA (US); Adithya Shricharan Srinivasa Rao, San Francisco, CA (US); Douglas Bertram Lee, Redwood City, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/879,736

(22) Filed: May 20, 2020

(65) Prior Publication Data
US 2020/0372246 A1 Nov. 26, 2020

Related U.S. Application Data

(60) Provisional application No. 62/850,542, filed on May 21, 2019.

(51) Int. Cl.
*G06N 3/084* (2023.01)
*G06F 3/01* (2006.01)
(Continued)

(52) U.S. Cl.
CPC .............. *G06N 3/084* (2013.01); *G06F 3/017* (2013.01); *G06N 3/045* (2023.01); *G06V 10/454* (2022.01);
(Continued)

(58) Field of Classification Search
CPC ........... G06K 9/00389; G06K 9/00382; G06K 2009/00395; G06F 3/017; G06N 3/0454
(Continued)

(56) References Cited

U.S. PATENT DOCUMENTS 5,111,516 A 5/1992 Nakano et al.
5,291,560 A 3/1994 Daugman
(Continued)

FOREIGN PATENT DOCUMENTS

AU 2017230184 10/2021
CN 1977286 6/2007
(Continued)

OTHER PUBLICATIONS

Wende (On Improving the Performance of Multi-threaded CUDA Applications with Concurrent Kernel Execution by Kernel Reordering, 2012 Symposium on Application Accelerators in High Performance Computing) (Year: 2012).*

(Continued)

*Primary Examiner* — Mark Roz
(74) *Attorney, Agent, or Firm* — Vista IP Law Group, LLP

(57) ABSTRACT

A neural network in multi-task deep learning paradigm for machine vision includes an encoder that further includes a first, a second, and a third tier. The first tier comprises a first-tier unit having one or more first-unit blocks. The second tier receives a first-tier output from the first tier at one or more second-tier units in the second tier, a second-tier unit comprises one or more second-tier blocks, the third tier receives a second-tier output from the second tier at one or more third-tier units in the third tier, and a third-tier block comprises one or more third-tier blocks. The neural network further comprises a decoder operatively the encoder to receive an encoder output from the encoder as well as one or more loss function layers that are configured to backpropagate one or more losses for training at least the encoder of the neural network in a deep learning paradigm.

19 Claims, 36 Drawing Sheets

(51) Int. Cl.
  *G06V 40/10* (2022.01)
  *G06N 3/045* (2023.01)
  *G06V 10/764* (2022.01)
  *G06V 10/778* (2022.01)
  *G06V 10/44* (2022.01)
  *G06V 40/20* (2022.01)

(52) U.S. Cl.
  CPC ........ *G06V 10/764* (2022.01); *G06V 10/7784* (2022.01); *G06V 40/11* (2022.01); *G06V 40/113* (2022.01); *G06V 40/20* (2022.01); *G06V 40/117* (2022.01)

(58) Field of Classification Search
  USPC ....................................................... 382/103
  See application file for complete search history.

(56) References Cited

U.S. PATENT DOCUMENTS

| | | |
|---|---|---|
| 5,511,134 A | 4/1996 | Kuratomi et al. |
| 5,572,596 A | 11/1996 | Wildes et al. |
| 5,751,286 A | 5/1998 | Barber et al. |
| 5,850,470 A | 12/1998 | Kung et al. |
| 6,018,728 A | 1/2000 | Spence et al. |
| 6,035,057 A | 3/2000 | Hoffman |
| 6,121,953 A | 9/2000 | Walker |
| 6,138,109 A | 10/2000 | Grichnik et al. |
| 6,768,509 B1 | 7/2004 | Bradski et al. |
| 6,865,302 B2 | 3/2005 | Chang |
| 7,016,532 B2 | 3/2006 | Boncyk et al. |
| 7,324,669 B2 | 1/2008 | Nakanishi et al. |
| 7,379,563 B2 | 5/2008 | Shamaie |
| 7,603,000 B2 | 10/2009 | Zheng et al. |
| 7,644,049 B2 | 1/2010 | Bradski |
| 7,689,008 B2 | 3/2010 | Hammoud et al. |
| 8,031,948 B2 | 10/2011 | Liu et al. |
| 8,131,011 B2 | 3/2012 | Nevatia et al. |
| 8,180,112 B2 | 5/2012 | Kurtz et al. |
| 8,369,595 B1 | 2/2013 | Derakhshani et al. |
| 8,374,404 B2 | 2/2013 | Williams et al. |
| 8,392,484 B2 | 3/2013 | Zhou et al. |
| 8,411,910 B2 | 4/2013 | Savvides et al. |
| 8,472,120 B2 | 6/2013 | Border et al. |
| 8,488,888 B2 | 7/2013 | Balan et al. |
| 8,553,989 B1 | 10/2013 | Owechko et al. |
| 8,767,016 B2 | 7/2014 | Yang |
| 8,873,812 B2 | 10/2014 | Larlus-Larrondo et al. |
| 8,890,813 B2 | 11/2014 | Minnen |
| 8,963,806 B1 | 2/2015 | Starner et al. |
| 8,965,822 B2 | 2/2015 | Frank et al. |
| 9,041,622 B2 | 5/2015 | McCulloch et al. |
| 9,147,125 B2 | 9/2015 | Wang et al. |
| 9,224,068 B1 | 12/2015 | Ranzato |
| 9,317,785 B1 | 4/2016 | Moon et al. |
| 9,501,498 B2 | 11/2016 | Wnuk et al. |
| 9,530,047 B1 | 12/2016 | Tang et al. |
| 9,542,626 B2 | 1/2017 | Martinson et al. |
| 9,600,069 B2 | 3/2017 | Publicover et al. |
| 9,619,748 B1* | 4/2017 | Commons ............... G06N 3/08 |
| 9,721,150 B2 | 8/2017 | Gottemukkula et al. |
| 9,730,643 B2 | 8/2017 | Georgescu et al. |
| 9,767,615 B2 | 9/2017 | Young et al. |
| 9,791,700 B2 | 10/2017 | Schowengerdt |
| 9,811,730 B2 | 11/2017 | Komogortsev |
| 9,911,219 B2 | 3/2018 | Fleishman et al. |
| 10,255,529 B2 | 4/2019 | Rabinovich et al. |
| 10,275,902 B2 | 4/2019 | Bradski |
| 10,636,159 B2 | 4/2020 | Bradski |
| 2002/0102024 A1 | 8/2002 | Jones et al. |
| 2002/0159627 A1 | 10/2002 | Schneiderman et al. |
| 2005/0100209 A1 | 5/2005 | Lewis et al. |
| 2006/0008151 A1 | 1/2006 | Lin et al. |
| 2006/0291697 A1 | 12/2006 | Luo |
| 2007/0022329 A1 | 1/2007 | Adamek et al. |
| 2007/0036397 A1 | 2/2007 | Hamza |
| 2008/0187227 A1 | 8/2008 | Bober et al. |
| 2009/0185723 A1 | 7/2009 | Kurtz et al. |
| 2010/0002913 A1 | 1/2010 | Hamza |
| 2010/0014718 A1 | 1/2010 | Savvides et al. |
| 2010/0177929 A1 | 7/2010 | Kurtz et al. |
| 2011/0194738 A1 | 8/2011 | Choi et al. |
| 2011/0286628 A1 | 11/2011 | Goncalves |
| 2011/0317917 A1 | 12/2011 | Free |
| 2012/0121193 A1 | 5/2012 | Lipson et al. |
| 2013/0076943 A1 | 3/2013 | Yoon et al. |
| 2013/0336547 A1 | 12/2013 | Komogortsev |
| 2013/0346168 A1 | 12/2013 | Zhou et al. |
| 2014/0037152 A1 | 2/2014 | Tan et al. |
| 2014/0055488 A1 | 2/2014 | Masters et al. |
| 2014/0171756 A1 | 6/2014 | Waldorf et al. |
| 2014/0270361 A1 | 9/2014 | Amma |
| 2015/0009124 A1 | 1/2015 | Antoniac |
| 2015/0016712 A1 | 1/2015 | Rhoads et al. |
| 2015/0036922 A1 | 2/2015 | El Dokor |
| 2015/0051840 A1 | 2/2015 | Vervier et al. |
| 2015/0117760 A1 | 4/2015 | Wang et al. |
| 2015/0139535 A1 | 5/2015 | Siddiqui |
| 2015/0186708 A1 | 7/2015 | Katz |
| 2015/0205126 A1 | 7/2015 | Schowengerdt |
| 2015/0261803 A1 | 9/2015 | Song et al. |
| 2015/0278642 A1 | 10/2015 | Chertok et al. |
| 2015/0296135 A1 | 10/2015 | Wacquant et al. |
| 2015/0301797 A1 | 10/2015 | Miller |
| 2015/0302027 A1 | 10/2015 | Wnuk et al. |
| 2015/0302250 A1 | 10/2015 | Miller |
| 2015/0324998 A1 | 11/2015 | Song et al. |
| 2015/0332513 A1 | 11/2015 | Scavezze et al. |
| 2015/0346495 A1 | 12/2015 | Welch et al. |
| 2016/0104058 A1 | 4/2016 | He et al. |
| 2016/0140383 A1 | 5/2016 | Kim et al. |
| 2016/0148079 A1* | 5/2016 | Shen .................. G06N 3/0454 382/157 |
| 2016/0189413 A1 | 6/2016 | Houjou et al. |
| 2016/0335512 A1 | 11/2016 | Bradski |
| 2016/0358070 A1 | 12/2016 | Brothers et al. |
| 2017/0175172 A1 | 6/2017 | Apte et al. |
| 2017/0262737 A1 | 9/2017 | Rabinovich |
| 2017/0293736 A1 | 10/2017 | Kramer et al. |
| 2018/0018451 A1 | 1/2018 | Spizhevoy et al. |
| 2018/0018553 A1 | 1/2018 | Bach et al. |
| 2018/0024726 A1 | 1/2018 | Hviding |
| 2018/0129870 A1 | 5/2018 | Bacivarov et al. |
| 2018/0137335 A1 | 5/2018 | Kim et al. |
| 2018/0365532 A1 | 12/2018 | Molchanov et al. |
| 2019/0130275 A1* | 5/2019 | Chen .................. G06N 3/0454 |
| 2019/0213751 A1 | 7/2019 | Bradski |
| 2019/0286951 A1 | 9/2019 | Rabinovich et al. |

FOREIGN PATENT DOCUMENTS

| | | |
|---|---|---|
| EP | 1650711 | 4/2006 |
| EP | 3476119 B1 | 4/2021 |
| EP | 3343320 B1 | 6/2021 |
| EP | 3435284 B1 | 6/2021 |
| EP | 3623761 B1 | 3/2022 |
| JP | 2013-250856 | 12/2013 |
| WO | WO 2005022343 | 3/2005 |
| WO | WO 2006/001525 | 1/2006 |
| WO | WO 14/158345 | 10/2014 |
| WO | WO 2016/183020 | 11/2016 |

OTHER PUBLICATIONS

Demjen, E., et al., "Eye Tracking Using Artificial Neural Networks for Human Computer Interaction," Institute of Experimental Physics, Slovakia, dated Aug. 1, 2011 (4 pages).

PCT International Search Report and Written Opinion for International Appln. No. PCT/US2016/031499, Applicant Magic Leap, Inc., Forms PCT/ISAI210, 220, and 237, dated Aug. 5, 2016 (14 pages).

(56) References Cited

OTHER PUBLICATIONS

PCT International Search Report and Written Opinion for International Appln. No. PCT/US17/22206, Applicant Magic Leap, Inc., forms PCT/ISA/210, 220, and 237, dated May 25, 2017 (8 pages).
Feng, J., et al., "Learning the structure of deep convolutional networks," Department of EECS and ICSI, UC Berkeley, dated 2015 (9 pages).
Response to Non-final office action filed May 21, 2018 for U.S. Appl. No. 15/457,990.
Extended European Search Report for EP Appln. No. 16793329.0, dated May 29, 2018.
Final Office Action for U.S. Appl. No. 15/457,990, dated Jun. 25, 2018.
Non-Final Office Action for U.S. Appl. No. 15/150,042, dated Sep. 12, 2018.
RCE and Response to Final Office Action filed Sep. 25, 2018 for U.S. Appl. No. 15/457,990.
Response to Office Action filed Dec. 12, 2018 for U.S. Appl. No. 15/150,042.
Notice of Allowance dated Nov. 29, 2018 for U.S. Appl. No. 15/457,990.
Response to European Search Report filed Dec. 24, 2018 for EP Appln. No. 16793329.0.
Notice of Allowance dated Jan. 18, 2019 for U.S. Appl. No. 15/150,492.
Extended European Search Report for EP Appln. No. 17764297.2, dated Feb. 26, 2019.
Non-Final Office Action dated Apr. 18, 2019 for U.S. Appl. No. 16/351,912.
Office Action dated Jun. 23, 2019, for Israeli Patent Appln. No. 255234, with English translation, 18 pages.
Response to Office Action filed Aug. 15, 2019 for U.S. Appl. No. 16/351,912.
Response to Extended European Search Report for EP Appln. No. 17764297.2, filed Sep. 17, 2019.
Final Office Action dated Nov. 15, 2019 for U.S. Appl. No. 16/351,912.
Response to Final Office Action dated Nov. 15, 2019 for U.S. Appl. No. 16/351,912.
Examination Report for Australian Appln. No. 2016261487, dated Nov. 28, 2019 (4 pages).
Examination Report for New Zealand Appln. No. 736574, dated Jan. 31, 2020 (3 pages).
Response to Examination Report for Australian Appln. No. 2016261487, filed Feb. 5, 2020 (14 pages).
Foreign Office Action for IL Patent Appln. No. 261245 dated May 4, 2020.
Foreign Notice of Acceptance for IL Patent Appln. No. 255234 dated Jul. 2, 2020.
Foreign Office Action for JP Patent Appln. No. 2017-558715 dated Jul. 2, 2020.
3rd Exam Report for AU Patent Appln. No. 2016261487 dated Jul. 1, 2020.
Response to 2nd Exam for AU Patent Appln. No. 2016261487 dated Jun. 9, 2020.
Foreign Office Action for KR Patent Appln. No. 10-2018-7029132 dated Jul. 23, 2020.
Foreign Response to Examiner's Report for NZ Patent Appln. No. 736574 dated Jul. 28, 2020.
Foreign Office Action for JP Patent Appln. No. 2018-547429 dated Jul. 21, 2020.
2nd Examination Report for NZ Patent Appln. No. 736574 dated Aug. 24, 2020.
3rd Examination Report for AU Patent Appln. No. 2016261487 dated Aug. 26, 2020.
Foreign OA Response for IP Patent Appln. No. 261245 dated Sep. 6, 2020.
Foreign Examination Report for AU Patent Appln. No. 2016261487 dated Sep. 16, 2020.
Foreign Notice of Acceptance for IL Patent Appln. No. 261245 dated Sep. 15, 2020.
Foreign Response for KR Patent Appln. No. 10-2018-7029132 dated Sep. 23, 2020.
Foreign Response for JP Patent Appln. No. 2017-558715 dated Sep. 25, 2020.
Foreign 4th Examiner's Response for AU Patent Appln. No. 2016261487 dated Sep. 28, 2020.
1st Examination Report for EP Patent Appln. No. 16793329.0 dated Sep. 30, 2020.
Foreign OA Response for JP Patent Appln. No. 2018-547429 dated Oct. 13, 2020.
Foreign 1st Exam Report for AU Patent Appln. No. 2017230184 dated Oct. 13, 2020.
Response to Non-Final Office Action filed Oct. 21, 2020 for U.S. Appl. No. 16/366,047.
Non-Final Office Action dated Jul. 21, 2020 for U.S. Appl. No. 16/366,047.
Foreign OA for JP Patent Appln. No. 2017-558715 dated Oct. 20, 2020.
Foreign OA for JP Patent Appln. No. 2018-547429 dated Nov. 4, 2020.
Foreign NOA for KR Patent Appln. No. 10-2018-7029132 dated Nov. 27, 2020.
Foreign Response for NZ Patent Application No. 736574 dated Dec. 23, 2020.
Foreign Response for EP Patent Appln. No. 16793329.0 dated Feb. 3, 2021.
Foreign Notice of Appeal for JP Patent Appln. No. 2017-558715 dated Nov. 15, 2020.
Foreign NOA for JP Patent Appln. No. 2017-558715 dated Apr. 1, 2021.
Foreign Response for JP Patent Appln. No. 2018-547429 dated Jan. 26, 2021.
Foreign NOA for JP Patent Appln. No. 2018-547429 dated Apr. 22, 2021.
Foreign OA for CN Patent Appln. No. 201780016251.0 dated Mar. 8, 2021.
Non-Final Office Action for U.S. Appl. No. 16/804,608 dated May 18, 2021.
Foreign OA for CN Patent Appln. No. 201680025287.0 dated Mar. 25, 2021.
Foreing OA for JP Patent Appln. No. 2020-42897 dated Jun. 1, 2021.
Foreign Response for CN Patent Appln. No. 201780016251.0 dated Jul. 14, 2021.
Foreign Exam Report for EP Patent Appln. No. 17764297.2 dated Jun. 24, 2021.
Foreign OA for IN Patent Appln. No. 201747040661 dated Feb. 18, 2021.
Foreign Response for CN Patent Appln. No. 201680025287.0 dated Jul. 30, 2021.
Foreign NOA for CA Patent Appln. No. 2983749 dated Jul. 26, 2021.
Foreign Response for JP Patent Appln. No. 2020-42897 dated Aug. 24, 2021.
Notice of Allowance for U.S. Appl. No. 16/804,608 dated Sep. 1, 2021.
Foreign Response for AU Patent Appln. No. 2017230184 dated Sep. 9, 2021.
Foreign OA for KR Patent Appln. No. 10-2017-7035543 dated Sep. 11, 2021.
Foreign Exam Report for IN Patent Appln. No. 201847036674 dated Sep. 24, 2021.
Foreign Notice of Acceptance for AU Patent Appln. No. 2017230184 dated Sep. 23, 2021.
Foreign NOA for JP Patent Appln. No. 2020-42897 dated Oct. 26, 2021.
Foreign Response for EP Patent Appln. No. 17764297.2 dated Nov. 3, 2021.
Foreign Response for KR Patent Appln. No. 10-2017-7035543 dated Nov. 11, 2021.
PCT International Search Report and Written Opinion for International Appln. No. PCT/US20/33885, Applicant Magic Leap, Inc., dated Aug. 31, 2020 (10 pages).

(56) References Cited

OTHER PUBLICATIONS

Chen et al. "Fully Convolutional Neural Network with Augmented Atrous Spatial Pyramid Pool and Fully Connected Fusion Path for High Resolution Remote Sensing Image Segmentation." In: Appl. Sci.; May 1, 2019, [online] [retrieved on Jul. 30, 2020 (Jul. 30, 2020)] Retrieved from the Internet <URL: https://www.mdpi.com/2076-3417/9/9/1816>, entire document.
Foreign OA for CN Patent Appln. No. 201680025287.0 dated Nov. 25, 2021.
Foreign OA for CN Patent Appln. No. 201780016251.0 dated Jan. 27, 2022.
Foreign Response for CN Patent Appln. No. 201680025287.0 dated Feb. 7, 2022.
Foreign NOA for CN Patent Appln. No. 201680025287.0 dated Feb. 23, 2022.
Foreign Response for CN Patent Appln. No. 201780016251.0 dated Mar. 18, 2022.
Foreign NOA for KR Patent Appln. No. 10-2017-7035543 dated Jan. 27, 2022.
Foreign Exam Report for IN Patent Appln. No. 202048011716 dated Feb. 26, 2022.
Foreign Response for IN Patent Appln. No. 201847036674 dated Mar. 21, 2022.
Foreign Exam Report for AU Patent Appln. No. 2021290336 dated Apr. 1, 2022.
Non-Final Office Action for U.S. Appl. No. 17/183,021 dated Aug. 16, 2022.
Foreign Summons of Oral Proceedings for EP Patent Appln. No. 16793329.0 dated Jun. 13, 2022.
Extended European Search Report for EP Patent Appln. No. 20809006.8 dated Aug. 11, 2022.
Rajeev Ranjan et al: "HyperFace: A Deep Multi-Task Learning Framework for Face Detection, Landmark Localization, Pose Estimation, and Gender Recognition", May 11, 2016 (May 11, 2016), XP055552344, DOI: 10.1109/TPAMI.2017.2781233 Retrieved from the Internet: URL:https://arxiv.org/pdf/1603.01249v2 [retrieved on Feb. 6, 2019] * 3, 4 and 5; figures 2, 6 *.
Fisher Yu et al: "Deep Layer Aggregation" arxiv.org, Cornell University Library, 201 Olin Library Cornell University Ithaca, NY 14853, Jul. 20, 2017 (Jul. 20, 2017), XP081001885, * Section 3 and 4; figures 2,3,4 *.
Amendment Response to NFOA for U.S. Appl. No. 17/183,021 dated Nov. 16, 2022.
Foreign Response for IN Patent Appln. No. 202048011716 dated Nov. 25, 2022 in English.
Foreign Response for CN Patent Appln. No. 202210416969.1 dated Dec. 12, 2022.
Notice of Allowance for U.S. Appl. No. 17/183,021 dated Jan. 19, 2023.
Foreign OA for CN Patent Appln. No. 202210416969.1 dated Dec. 28, 2022.
Foreign Response for EP Patent Appln. No. 20809006.8 dated Mar. 9, 2023.
Foreign Response for CN Patent Appln. No. 202210416969.1 dated Apr. 3, 2023.
Foreign OA for CN Patent Appln. No. 202210416969.1 dated Jul. 28, 2023.

\* cited by examiner

HAND POSE ESTIMATION

CROSS-REFERENCE TO RELATED APPLICATIONS

This application claims the benefit of U.S. Prov. Pat. App. Ser. No. 62/850,542, filed May 21, 2019 and entitled "HAND POSE ESTIMATION". The contents of the foregoing provisional patent application are hereby expressly incorporated by reference into the present application in their entireties for all purposes.

BACKGROUND

Hand pose estimation is a critical component of augmented reality (AR)/virtual reality (VR)/mixed reality (MR)/extended reality (XR) applications to enable controller-less interactions. Hand pose estimation may come in different forms such as (1) simple discrete pose classification, (2) 2D (two-dimensional) hand key-point estimation of visible skeletal joint positions, (3) 2.5D (two-and-a-half dimensional) or hybrid-3D (three-dimensional) hand key-point estimation wherein 2D key-point estimates are lifted to 2.5D using corresponding depth values, (4) 3D hand key-point estimation, and (5) fully articulated 3D hand shape and pose tracking.

The research of semantic segmentation, which amounts to assign semantic labels to each pixel of an input image, is a fundamental task in computer vision. It can be broadly applied to the fields such as autonomous driving, and video surveillance. These applications have a high demand for efficient inference speed for fast interaction or response. On the other hand, semantic segmentation often uses a neural network that needs training and/or deep learning capabilities and thus requires not only an extensive amount of compute and storage resources but also higher power consumption as a result of the extensive amount of compute and storage resources. As a result, although semantic segmentation may have a practical or even desired application in wearable devices such as VR, AR, MR, and/or XR devices. Nonetheless, either one of the requirement of compute and storage resources and power consumption renders the practical implementation of computer vision with semantic segmentation difficult, if not entirely impractical for wearable devices.

Therefore, there is a need for a neural network that not only has deep learning and training capabilities but is also practical for a broad field of applications including wearable devices.

SUMMARY

Some embodiments are directed to a neural network in multi-task deep learning paradigm for machine vision with a mobile electronic device. The neural network includes an encoder comprising a first tier, a second tier, and a third tier, wherein the first tier comprises a first-tier unit, the first-tier unit comprises one or more first-unit blocks, the second tier receives a first-tier output from the first tier at one or more second-tier units in the second tier, a second-tier unit comprises one or more second-tier blocks, the third tier receives a second-tier output from the second tier at one or more third-tier units in the third tier, and a third-tier block comprises one or more third-tier blocks. The neural network may further comprise a decoder operatively the encoder to receive an encoder output from the encoder as well as one or more loss function layers that are configured to back-propagate one or more losses for training at least the encoder of the neural network in a deep learning paradigm.

In some embodiments, the one or more first-unit blocks in the first-tier unit comprise a convolution layer logically followed by a batch normalization layer that is further logically followed by a scale layer, and the one or more first unit blocks further comprise a rectified linear unit that logically follows the scale layer.

In addition or in the alternative, the second tier in the neural network comprises a first second-tier unit and a second second-tier unit, wherein the first second-tier unit receives a first-tier output from the first tier and comprises a first second-tier first-unit block and a second second-tier first-unit block, both the first second-tier first-unit block and the second second-tier first-unit block respectively comprise a batch normalization layer followed by a scale layer that is further logically followed by a rectified linear unit, the batch normalization layer in the first second-tier first-unit block logically follows a first convolution layer, the batch normalization layer in the second second-tier first-unit block logically follows a second convolution layer, and the first convolution layer is different from the second convolution layer.

In some of the immediately preceding embodiments, the second second-tier unit comprises a first second-tier second-unit block that receives a concatenated output from the second second-tier first-unit block and the first-tier output, a second second-tier second-unit block, and a third second-tier second-unit block, the first second-tier second-unit block, the second second-tier second-unit block, and the third second-tier second-unit block respectively comprise the batch normalization layer followed by the scale layer that is further logically followed by the rectified linear unit, the batch normalization layer in the first second-tier second-unit block logically follows the second convolution layer, the batch normalization layer in the second second-tier second-unit block logically follows the first convolution layer, the batch normalization layer in the third second-tier second-unit block logically follows the second convolution layer, and the third second-tier second-unit block is configured to generate a second-tier output.

In some embodiments, a first-tier output generated by the first tier may be concatenated with a second-tier output generated by the second tier and provided as a third-tier input to the third tier, wherein the third tier comprises a first third-tier unit and a second third-tier unit, the first third-tier unit comprises multiple third-tier first-unit blocks located at respective first-unit hierarchical levels, and at least some of the multiple third-tier first-unit blocks comprise different dilated convolution layers corresponding to more than one first dilation factor.

In some of the immediately preceding embodiments, the second third-tier unit comprises multiple third-tier second-unit blocks located at respective second-unit hierarchical levels, at least some of the multiple third-tier second-unit blocks comprise a plurality of dilated convolution layers corresponding to more than one second dilation factor, and the multiple third-tier first unit blocks and the multiple third-tier second unit blocks comprise at least one respective dilated convolution layer and a plurality of respective residual blocks for training at least the encoder of the neural network in the deep learning paradigm.

In some embodiments, a second tier output is provided to the third tier as a third-tier input and is further concatenated with a third-tier output generated by the third tier as a final concatenated output for the neural output, and training at least the encoder of the neural network in the deep learning paradigm comprises backpropagating the one or more losses using at least an activation layer and a cross-entropy loss.

Some embodiments are directed to a mobile electronic device with an embedded implementation of a neural network, comprising a mobile communication device; and an embedded implementation of a neural network in multi-task deep learning paradigm for machine vision, wherein the neural network in the embedded implementation comprises a vision processing unit having a plurality of super high vision processors or processor cores; an encoder comprising a first tier, a second tier, and a third tier, wherein the first tier comprises a first-tier unit, the first-tier unit comprises one or more first-unit blocks, the second tier receives a first-tier output from the first tier at one or more second-tier units in the second tier, a second-tier unit comprises one or more second-tier blocks, the third tier receives a second-tier output from the second tier at one or more third-tier units in the third tier, and a third-tier block comprises one or more third-tier blocks.

In some of these embodiments, the one or more first-unit blocks in the first-tier unit comprise a convolution layer logically followed by a batch normalization layer that is further logically followed by a scale layer, and the one or more first unit blocks further comprise a rectified linear unit that logically follows the scale layer.

In addition or in the alternative, the second tier in the neural network comprises a first second-tier unit and a second second-tier unit, wherein the first second-tier unit receives a first-tier output from the first tier and comprises a first second-tier first-unit block and a second second-tier first-unit block, both the first second-tier first-unit block and the second second-tier first-unit block respectively comprise a batch normalization layer followed by a scale layer that is further logically followed by a rectified linear unit, the batch normalization layer in the first second-tier first-unit block logically follows a first convolution layer, the batch normalization layer in the second second-tier first-unit block logically follows a second convolution layer, and the first convolution layer is different from the second convolution layer.

In some embodiments, a first-tier output generated by the first tier may be concatenated with a second-tier output generated by the second tier and provided as a third-tier input to the third tier, wherein the third tier comprises a first third-tier unit and a second third-tier unit, the first third-tier unit comprises multiple third-tier first-unit blocks located at respective first-unit hierarchical levels, and at least some of the multiple third-tier first-unit blocks comprise different dilated convolution layers corresponding to more than one first dilation factor.

In some of the immediately preceding embodiments, the second third-tier unit comprises multiple third-tier second-unit blocks located at respective second-unit hierarchical levels, at least some of the multiple third-tier second-unit blocks comprise a plurality of dilated convolution layers corresponding to more than one second dilation factor, and the multiple third-tier first unit blocks and the multiple third-tier second unit blocks comprise at least one respective dilated convolution layer and a plurality of respective residual blocks for training at least the encoder of the neural network in the deep learning paradigm.

In addition or in the alternative, a second tier output is provided to the third tier as a third-tier input and is further concatenated with a third-tier output generated by the third tier as a final concatenated output for the neural output, and training at least the encoder of the neural network in the deep learning paradigm comprises backpropagating the one or more losses using at least an activation layer and a cross-entropy loss.

Some embodiments are directed to a neural network within multi-task deep learning paradigm for machine vision, comprising a spatial path layer configured to preserve spatial information in an input dataset in a spatial path, wherein the spatial path encodes the spatial information; a context path layer configured to increase a receptive field of the neural network by using a context path, wherein the context path encodes context information in the input dataset; and a feature fusion layer configured to fuse a first output from the spatial path layer and a second output from the context path.

In some of these embodiments, the spatial path layer comprises an encoder comprising a first tier, a second tier, and a third tier, wherein the first tier comprises a first-tier unit, the first-tier unit comprises one or more first-unit blocks, the second tier receives a first-tier output from the first tier at one or more second-tier units in the second tier, a second-tier unit comprises one or more second-tier blocks, the third tier receives a second-tier output from the second tier at one or more third-tier units in the third tier, and a third-tier block comprises one or more third-tier blocks.

In some of the immediately preceding embodiments, the spatial path layer further comprises a decoder operatively the encoder to receive an encoder output from the encoder; and one or more loss function layers that are configured to backpropagate one or more losses for training at least the encoder of the neural network in a deep learning paradigm.

In some embodiments, the second tier comprises a first second-tier unit and a second second-tier unit, wherein the first second-tier unit receives a first-tier output from the first tier and comprises a first second-tier first-unit block and a second second-tier first-unit block, both the first second-tier first-unit block and the second second-tier first-unit block respectively comprise a batch normalization layer followed by a scale layer that is further logically followed by a rectified linear unit, the batch normalization layer in the first second-tier first-unit block logically follows a first convolution layer, the batch normalization layer in the second second-tier first-unit block logically follows a second convolution layer, the first convolution layer is different from the second convolution layer, and the one or more first-unit blocks in the first-tier unit comprise a convolution layer logically followed by a batch normalization layer that is further logically followed by a scale layer, and the one or more first unit blocks further comprise a rectified linear unit that logically follows the scale layer.

In some embodiments, the context path layer comprises a lightweight model configured based to down-sample an input image at least in part upon a receptive field provided by the lightweight model to the neural network; and a pooling layer coupled to the lightweight model and logically followed by a convolution layer configured to capture the context information.

In some of the immediately preceding embodiments, the neural network further comprises an attention refinement layer operatively coupled to the plurality of pooling layers and configured to determine an attention vector for guiding feature selection or combination, wherein the feature fusion layer configured to fuse a spatial path output from the spatial path layer and a context path output from the context path layer; a first loss function configured to train the spatial path layer; and a second loss function configured to train the context path layer.

Additional and other objects, features, and advantages of the disclosure are described in the Detail Description, figures, and claims.

BRIEF DESCRIPTION OF THE DRAWING FIGURES

The drawings illustrate the design and utility of preferred embodiments of the present invention, in which similar elements are referred to by common reference numerals. In order to better appreciate how the above-recited and other advantages and objects of the present inventions are obtained, a more particular description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

DETAILED DESCRIPTION

Figure 1:
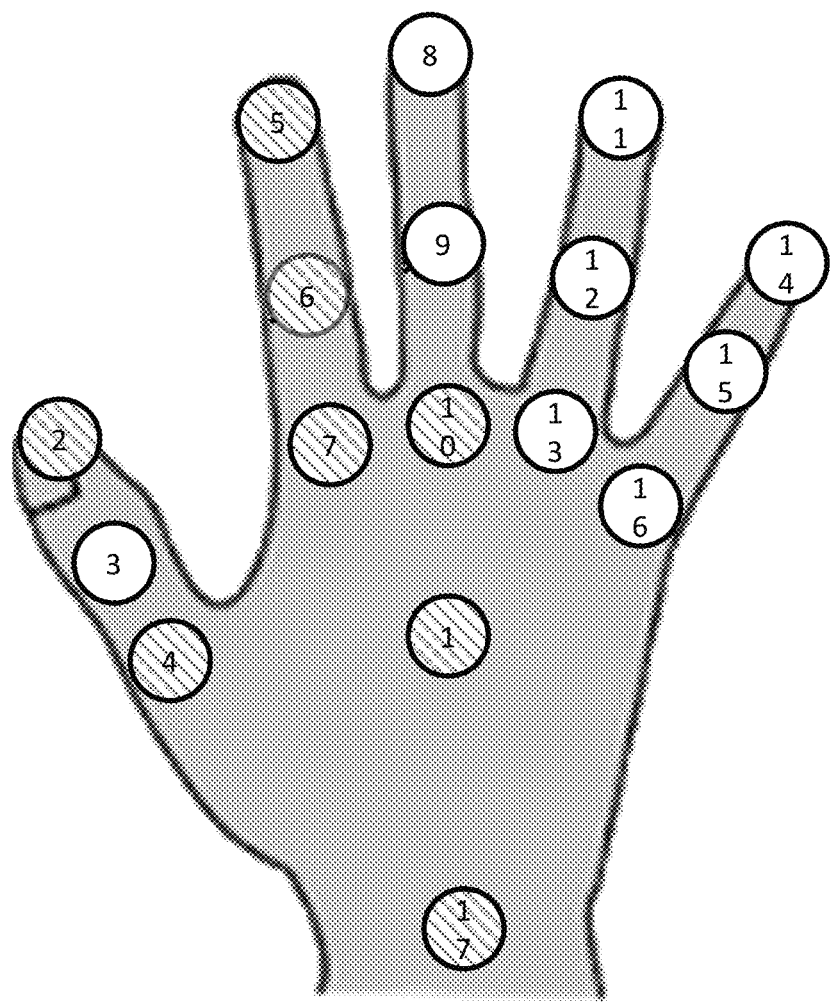
FIG. 1 illustrates an example of a first subset and a second subset of keypoints with respect to a left hand of a user in an image in some embodiments.

Various embodiments of the disclosure are directed to methods, systems, and articles of manufacture for implementing semantic segmentation with multi-task deep learning and a neural network while preserving spatial information and enhancing receptive field for computer vision in a single embodiment or in some embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with virtual and augmented reality systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Some embodiments in this disclosure primarily relate to (3)-2.5D or hybrid-3D (collectively 2.5D) computer vision such as hand key-point estimation, gesture recognition, etc., while identical or substantially similar techniques may also be applied to 3D hand key-point estimation and computer vision. Some advantages of various embodiments described herein may include, for example, that it suffices for most hand interactions in AR/VR/MR environments. In 2.5D hand key-point estimation, the network architecture disclosed herein has access to a depth image, and the network architecture disclosed herein is used to perform 2D key-point estimation, and the depth value at the point where the 2D key-point estimation is performed can be extracted from the depth image. From an algorithmic perspective, it is much easier to compute/estimate 2D key-points. Some disadvantages of 2.5D hand key-point estimation may include, for example, that it does not perform well when the key-points on the hands are self-occluded and the depth corresponds to hand surface's depth ignoring occlusions.

2D Key-point estimation is an important precursor to 3D pose estimation problems, for example, for human body and hands. 2.5D hand pose estimation may be used, for example, on embedded devices with constrained memory and compute envelopes, such as AR/VR/MR/XR wearables. 2.5D hand pose estimation may consist of 2D key-point estimation of joint positions on an egocentric image, captured by a depth sensor, and lifted (e.g., projected) to 2.5D using corresponding depth values. Modules in the network architecture disclosed herein may collectively lead to 3% the flop count and 2% the number of parameters when compared to the state-of-the-art architectures. An auxiliary multi-task training strategy may be used to compensate for the small capacity of the network architecture disclosed herein while achieving performance comparable to MobileNetV2. In some examples, a 32-bit trained model may have a memory footprint of less than 300 Kilobytes, operate at more than 50 Hz with less than 35 MFLOPs (mega floating-point operations per second).

An input to a vision-based hand tracking systems of mobile electronic device including, for example, an AR/VR/MR/XR wearables may be, for example, either a monocular red-green-blue (RGB)/grayscale image or a depth image. Depth-based approaches often outperform RGB-based approaches for 3D pose estimation. In some embodiments, depth-based approaches that output a depth image may use a time-of-flight (TOF) depth sensor.

Ground-truth images may be labeled, for example, by a labeler, with M key-points. The ground-truth images may be labeled with visible key-points (e.g., key-points that are visible in the ground-truth images), which correspond to all visible key-points. The ground-truth images may be histogram equalized version of one or more phase image/depth images (described below). In some embodiments, the network architecture disclosed herein may predict N key-points. In some embodiments, N may be less than M. The additional key points (e.g., the key-points that are in M but not in N) may serve as auxiliary supervision. FIG. 1 illustrates hand key-points, according to some embodiments.

The primary labels are the N key-points the network architecture disclosed herein predicts, and the combination of the primary labels and the auxiliary labels are the M key-points the ground-truth images may be labeled with.

In some embodiments, the images may be labeled with 17 key-points and the network architecture disclosed herein may predict 8 key-points, and the additional key-points (e.g., 17-8) may serve as auxiliary supervision. In some embodiments, the images may be labeled with 27 key-points and the network architecture disclosed herein may predict 15 key-points, and the additional key-points (e.g., 27-15) may serve as auxiliary supervision. One of ordinary skill in the art will appreciate the number of labeled key-points (M) and the number of predicted key-points (N) may vary.

Images of hands may also be labeled with 8 discrete hand key-pose classes including, for example, OK, open-hand, pinch, C-pose, fist, L-pose, point, and thumbs-up, a dummy class capturing all other key-poses (e.g., non-key-poses), as well as right/left hand assignments. In some embodiments, the additional labels act as supervisory tasks.

To avoid hand-like (distractor) objects confounding the predictions, the ground-truth images containing the hand may be composited with varied backgrounds containing challenging distractor objects. By collecting data in controlled environments and using augmentation, the training data may be expanded to generalize to different environments. As most of the collected data (e.g., ground-truth images) corresponds to a user performing single handed interactions, a skew may be introduced in the dataset. To mitigate this, left and right hands may be composited from different images.

Figure 2:
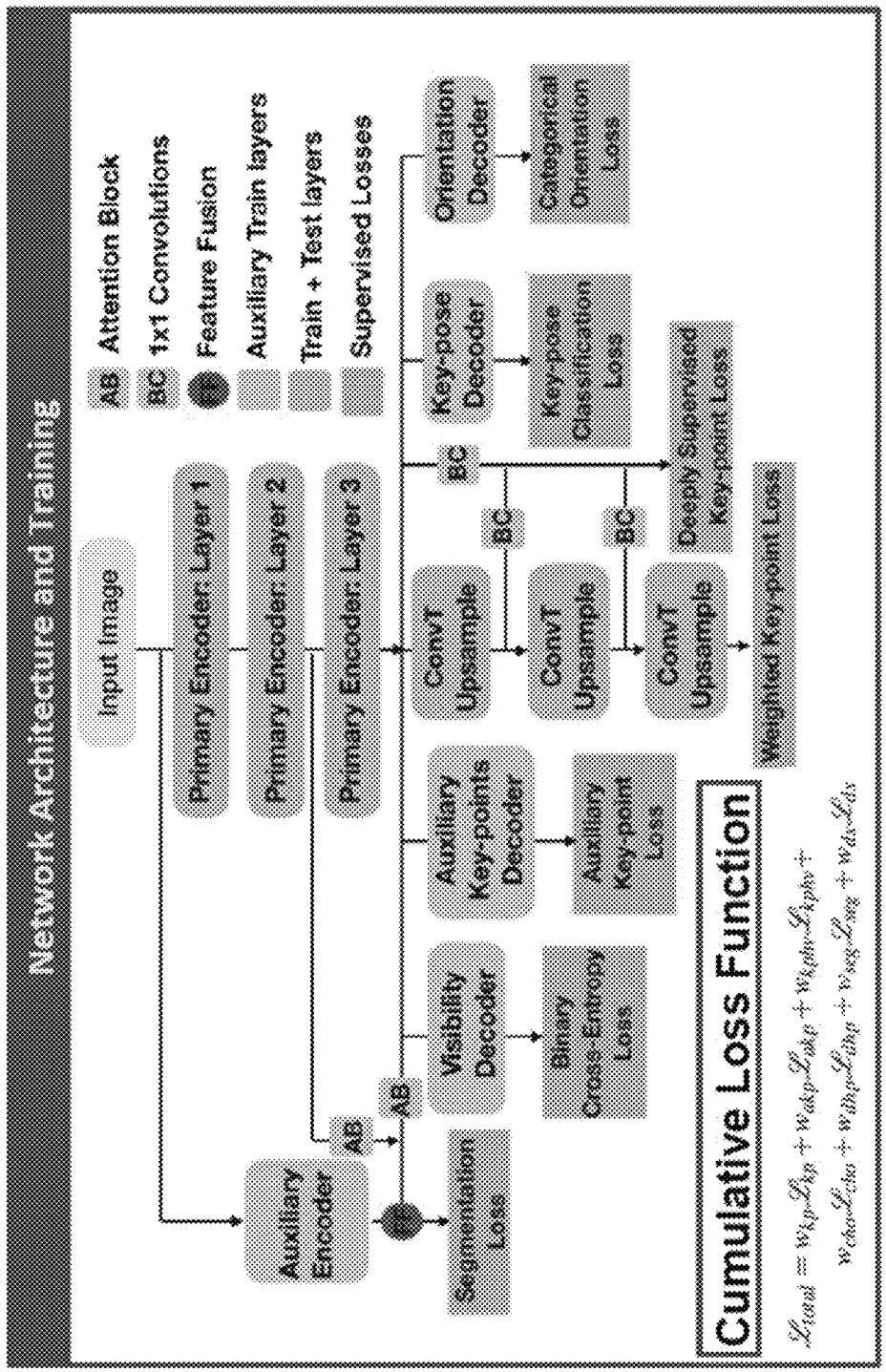
FIG. 2 illustrates a simplified example of a neural network having multiple tiers of processing blocks for implementing computer vision in some embodiments.

FIG. 2 illustrates an example network architecture, according to some embodiments. The portions in blue are used in training and in an embedded implementation, whereas the rest of the portions are used only as auxiliary supervision during training.

In some embodiments, the input image in FIG. 2 may be one or more phase images, one or more depth images, one or more amplitude images, one or more RGB images, one or more grayscale images, or any combinations thereof although depth images have shown improved performances in some embodiments that receive other types of images as inputs. An amplitude image may include a combination (e.g., a linear combination) of multiple phase images. In an example where a phase image is used, TOF depth sensors capture phase images which may be translated to a depth image using post-processing.

A compute time for post-processing the phase images to calculate the depth image may add a considerable portion to the end-to-end latency for hand tracking. In some embodiments, a linear combination of phase images, which may be referred to as an amplitude image, may be used to perform 2D key-point estimation and perform depth image processing in parallel, effectively reducing the overall latency. As discussed herein, this may improve performance while removing latency of sequential depth processing by instead implementing parallel depth processing. In some embodiments, the input image may be modified such that the number of rows in the modified input image are favorable to the network architecture described herein, for example such that the number of rows in the modified input image are a multiple of 4, 8, 16, etc. or some other number related to the number of channels/depths of the network architecture disclosed herein.

"Primary Encoder: Layer 1" will be referred to as "Tier 1," "Primary Encoder: Layer 2" will be referred to as "Tier 2," and "Primary Encoder: Layer 3" will be referred to as "Tier 3." The output of each Tier is a set of activation maps.

A convolution (Cony hereinafter) batchnorm (batch normalization or BN hereinafter) scale (S or SC hereinafter) rectified linear unit may be referred to as a Conv-BN-S-ReLU block for simplicity may be used in the aforementioned tiers (e.g., Tier 1, Tier 2, Tier 3, etc.) In some embodiments, batchnorm and scale may be folded into a convolution layer. The rectified linear unit ensures that only positive values are output from the block.

Figure 3:
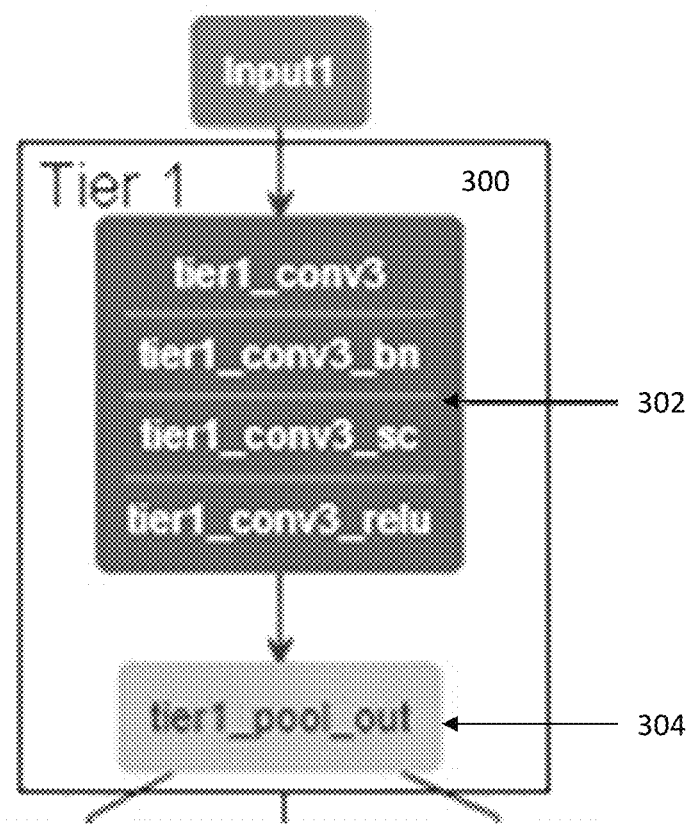
FIG. 3 illustrates a simplified example of a first tier in the multiple tiers of an example neural network in some embodiments.

FIG. 3 illustrates an example Tier 1 of the example network architecture according to some embodiments. Tier 1 (300) may include a single Conv-BN-S-ReLU block—302—and a max pooling operation (tier_1_pool_out). 302 may be a 3×3 convolution. The inputs and outputs of Tier 1 are illustrated in FIG. 3. A convolutional operation is a linear application of a smaller filter to a larger input that results in an output feature map. A filter applied to an input image or input feature map always results in a single number. The systematic left-to-right and top-to-bottom application of the filter to the input results in a two-dimensional feature map.

A filter has the same depth or number of channels as the input, yet, regardless of the depth of the input and the filter, the resulting output is a single number and one filter creates a feature map with a single channel. For example, a 3×3 filter will be applied in 3×3×1 blocks if the input has one channel such as a grayscale image. As another example, a 3×3 filter will be applied in 3×3×3 blocks if the input image has three channels for red, green, and blue. Yet as another example, the 3×3 filter will be applied in 3×3×64 blocks to create the single values to make up the single output feature map if the input is a block of feature maps from another convolutional or pooling layer and has the depth of 64. More details about convolutions will be described below.

Figure 4A:
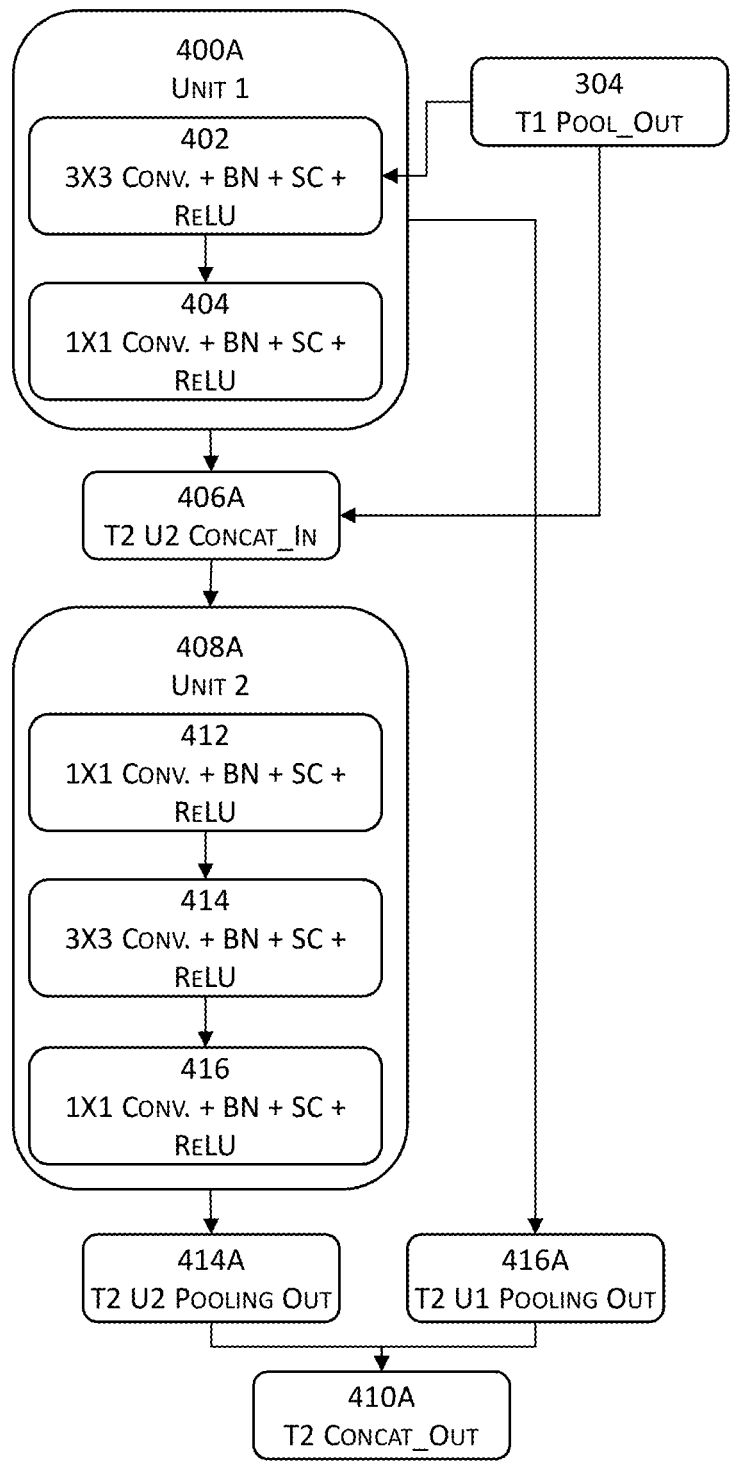
FIGS. 4A-4B illustrate a simplified example of a second tier in the multiple tiers of an example neural network in some embodiments.
Figure 4B:
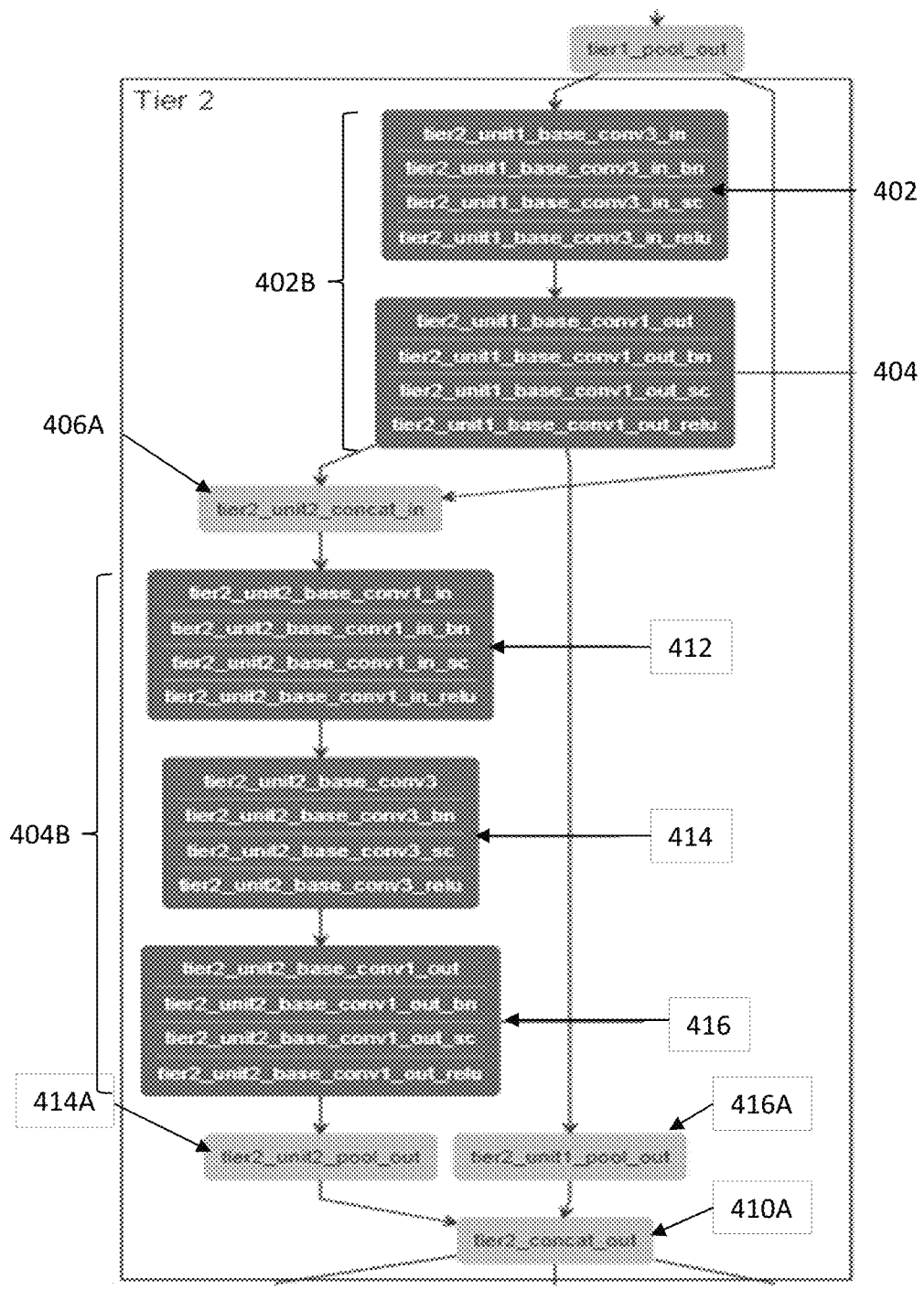

FIGS. 4A-4B illustrate a simplified example of a second tier in the multiple tiers of an example neural network in some embodiments. More particularly, FIG. 4A illustrates a simplified example of a second tier. Unit 1 (400A) includes a first block 402. The first block 402 includes two blocks where the first block 402 includes a 3×3 convolution layer (3×3 Cony) followed by a batch normalization layer (BN) that is further followed by a scale layer (SC). A rectified linear unit (ReLU) follows the scale layer (SC). The second block 404 in the first Unit 400A also similarly includes a batch normalization layer (BN) that is further followed by a scale layer (SC). A rectified linear unit (ReLU) follows the scale layer (SC). The second block 404 differs from the first block 402 in that, rather than having a 3×3 convolution layer, the second block 404 includes a 1×1 convolution layer that is followed by the batch normalization layer.

Convolution is a widely used technique in signal processing, image processing, and other engineering or science fields and is defined as the integral of the product of the two functions after one is reversed and shifted. Convolution in signal and image processing is similar to convolution in deep learning and neural networks in that the purpose of doing convolution is to extract useful features from the input. For example, in image or signal processing, there is a wide range of different filters one could choose for convolution, and each type of filters helps to extract different aspects or features from the input image. Similarly, in convolutional neural networks, different features may be extracted through convolution using filters whose weights are automatically learned during training, and all these extracted features may then be "combined" to make decisions.

Convolution in deep learning is essentially the cross-correlation in signal or image processing and thus slightly differs from convolution in signal processing. More particularly, the filters in a convolution layer are not reversed but are generally known as a sliding dot product or sliding inner-product of two filter functions. That is, convolution is the element-wise multiplication and addition in deep learning and neural networks.

A 1×1 convolution layer has a single parameter or weight for each channel in the input in some embodiments, and like the application of any filter, results in a single output value. That is, a 1×1 convolution layer does not involve any neighboring pixels in the input image. The operation performed by a 1×1 convolution layer may thus be a linear weighting or projection of the input. This structure of a 1×1 convolution layer thus allows the 1×1 convolution layer to act like a single neuron with an input from the same position across each of the feature maps in the input (e.g., from Tier 1 output 304). This single neuron may then be applied systematically with a stride of one (1), e.g., left-to-right and top-to-bottom without any need for padding, resulting in a feature map with the same width and height as the input. As a result, a 1×1 convolution may reduce the dimension along the direction of the number of channels while keeping other dimension(s) unchanged so as not to lose much useful information and not to have to learn new parameter(s) to achieve its purposes. A 1×1 convolutional layer may thus be used at any point in a convolutional neural network to control the number of feature maps. In addition, a 1×1 convolution may also provide efficient low dimensional embedding or feature pooling where a 1×1 convolution embeds separate channels or features into a single channel or feature.

A 3×3 convolution layer applies a 3×3 matrix (e.g., [[0,0,0], [1,1,1], [0,0,0]] to recognize a horizontal line,

[[1,0,0], [1,0,0], [1,0,0]] to recognize a vertical line, etc.) to an input image in a, for example, top-down and left-to-right manner on a 3 pixel-by-3 pixel basis to perform element-wise multiplication and addition (e.g., sliding dot product). For a single channel (e.g., a grayscale image), this results in a 3×3×1 matrix with one channel. For an input image having three channels (e.g., an RGB image), this result in a filter having a 3×3×3 matrix, and the respective results of the three channels are summed together with an element-wise addition to form one single channel (3×3×1) that is a result of applying convolution to the input using a 3×3×3 filter matrix. It shall be noted that the aforementioned 1×1 convolution layer and 3×3 convolution layer move only in two-direction (e.g., height and width) of the input image. For a 3D image, this approach may be easily expanded to move the filter matrix first at a first depth in a substantially similar two-direction manner and then progress through the remaining depths to achieve 3D convolution. One way to implement a convolution having a 2D filter to a 3D image may include the application of a 1×1 convolution in the depth direction in some embodiments.

A batch normalization layer (BN), or batchnorm for short, may be used to coordinate the update of multiple layers in a neural network described herein. A batch normalization may also be referred to "whitening" when applied to images in computer vision. Moreover, batch normalization is applied to training very deep neural networks that standardizes the inputs to a layer for each mini-batch in some embodiments so as to stabilize the learning process and reduce the number of training epochs that are required to train deep networks. In some embodiments, normalizing the inputs to the layer has an effect on the training of the network, reducing the number of epochs required. Batch normalization may also have a regularizing effect, reducing generalization error much like the use of activation regularization. Furthermore, batch normalization may be implemented during training by calculating, for example, the mean and standard deviation of each input variable to a layer per mini-batch and using these statistics to perform the standardization. In the alternative, batch normalization may maintain a running average of mean and standard deviation across mini-batches. After training, the statistics (e.g., the mean and standard deviation) of inputs for the layer may be set as mean values observed over the training dataset.

In a neural network, an activation function is often used to be responsible for transforming a summed weighted input from the node into the activation of the node or output for that input. A rectified linear activation function is a piecewise linear function that will output the input directly if is positive, otherwise, it will output zero. Often, a neural network model that uses ReLU is easier to train and often achieves better performance. A neural network described herein may include multiple layers of nodes and learns to map examples of inputs to outputs. For a given node, the inputs may be multiplied by the weights in a node and summed together to form a value that may be referred to as the summed activation of the node. The summed activation may then be transformed via an activation function and defines the specific output or "activation" of the node. A simple activation function is referred to as the linear activation, where no transform is applied at all. A neural network having only linear activation functions is very easy to train but cannot learn complex mapping functions. In some embodiments, a linear activation function may be used in the output layer for the neural network that predicts, for example, a quantity (e.g. regression problems). Some other embodiments employ nonlinear activation functions to allow the nodes to learn more complex structures in the data.

Traditionally, two widely used nonlinear activation functions are the sigmoid and hyperbolic tangent activation functions. The sigmoid activation function, also called the logistic function, is traditionally a very popular activation function for neural networks. The input to the function is transformed into a value between 0.0 and 1.0. Inputs that are much larger than 1.0 are transformed to the value 1.0, similarly, values much smaller than 0.0 are snapped to 0.0. The shape of the function for all possible inputs is an S-shape from zero up through 0.5 to 1.0. Sigmoid has been one of default activations used on neural networks. The hyperbolic tangent function, or tanh for short, is a similar shaped nonlinear activation function that outputs values between −1.0 and 1.0.

The tanh function was sometimes chosen over the sigmoid activation function as neural networks that use this tanh activation function are easier to train and often present better predictive performance. A shortcoming of both the sigmoid and tanh functions is that they tend to saturate where large values snap to 1.0, and small values snap to −1 or 0 for tanh and sigmoid respectively. Furthermore, the functions are often only sensitive to changes around their mid-point of their input, such as 0.5 for sigmoid and 0.0 for tanh. The limited sensitivity and saturation of the function happen regardless of whether the summed activation from the node provided as input contains useful information or not. Once saturated, it becomes challenging for the learning algorithm to continue to adapt the weights to improve the performance of the model. Finally, as the capability of hardware increased through GPUs' very deep neural networks using sigmoid and tanh activation functions could not easily be trained.

In order to use gradient descent with backpropagation of errors to train deep neural networks, an activation function is needed that appears and acts like a linear function, but is, in fact, a nonlinear function allowing complex relationships in the data to be learned. The activation function may also provide more sensitivity to the activation sum input and avoid easy saturation. A rectified linear activation function, or ReL for short, meets these desired characteristics. A node or unit that implements this activation function is referred to as a rectified linear activation unit, or ReLU for short. In some embodiments, neural networks that use a rectified linear function for, for example, one or more hidden layers may be referred to as rectified networks.

A rectified linear activation function includes a simple calculation that returns the value provided as input directly, or the value 0.0 if the input is 0.0 or less. This simple calculation may be described with a simple if-statement: if input >0: return input else: return 0 or describe this function g( ) mathematically: $g(z)=\max\{0,z\}$. As it may be seen, a rectified linear function is linear for values greater than zero—a rectified linear activation function has many desirable properties of a linear activation function when training a neural network using backpropagation. Yet, a rectified linear activation function is a nonlinear function as negative values are always output as zero.

Scale layers (SC's) are structured in a spatial pyramid-like structure to robustly process objects (e.g., segmentation of objects) at multiple scales so that these scale layers respectively probe an incoming convolutional feature layer with corresponding filters at multiple sampling rates and effective fields-of-views, thus capturing objects as well as image context at multiple scales. In addition or in the alternative, objects may exist at multiple scales. Conventional approaches often deal with the challenge arising out of multiple different scales by presenting, to a conventional neural network, rescaled versions of the same image and then by aggregating the features or feature maps. These conventional approaches may increase the performance yet come at the expense of computing feature responses at all neural network layers for multiple scaled versions of the input image. Unlike these conventional approaches, some embodiments employ a computationally efficient scheme of resampling a feature layer at multiple rates prior to convolution so as to probe the original input image with multiple filters that have complementary effective fields of view, thus capturing objects as well as useful image context at multiple scales. Rather than actually resampling features, these embodiments efficiently implement this mapping using multiple parallel convolutional layers with different sampling rates and different scales.

Unit 2 includes three blocks—412, 414, and 416. The first block 412 includes a 1×1 convolution layer (1×1 cony) followed by a batch normalization layer (BN) that is further followed by a scale layer (SC). A rectified linear unit follows the scale layer in the first block 412. Similar to the first block 412, the second block 414 also includes a batch normalization layer (BN) that is further followed by a scale layer (SC). A rectified linear unit follows the scale layer in the first block 414. The difference between the first block 412 and the second block 414 is that, rather than having a 1×1 convolution, the second unit 414 includes a 3×3 convolution that is followed by the batch normalization layer. The third block 416A includes an identical set of blocks as the second block 414 and thus will not be repeatedly described here.

The second tier comprises two units—Unit 1 (400A) and Unit 2 (408A)—as described above. Furthermore, the output of Unit 1 may be concatenated with the Tier 1 output (304) at a Tier 2 Unit 2 Concatenation Input module (406A) to provide the input to Unit 2. Moreover, the pooling output 414 of the second unit (408A) may be concatenated with the pooling output 416A at the Tier 2 Concatenate Output module 410A to serve as a concatenated input to Tier 3 which will be described in greater details below with reference to FIGS. 5A-5F.

FIG. 4B illustrates Tier 2 of a neural network, according to some embodiments. In these embodiments, Tier 2 may include two units (e.g., a first unit 402B and a second unit 404B). The first unit 402B may include two Conv-BN-SC-ReLU blocks such as those described above with reference to reference numerals 402 and 404 in FIG. 4A.

The second unit 404B may include three blocks (e.g., 412, 414, and 416 as described above with reference to FIG. 4A). Tier 2 may further include concatenation operations (tier_unit2_concat_in, tier_2_concat_out), and max pooling operations (tier2_unit2_pool_out, tier2_unit1_pool_out). 402 and 414 may be 3×3, and 404, 412, and 416 may be 1×1. The inputs and outputs of Tier 2 are illustrated in FIG. 4. Tier 2 may include groups of 4. For example, the output of the first block 402B may be concatenated with the pooling output of tier 1 at the tier 2 unit 2 concatenated input (406A) to provide a concatenated input for the second unit 404B. Furthermore, the pooling output of the first unit 402B may also be concatenated with the pooling output of the second unit 404B at the tier 2 concatenated output 410A which may then provide this concatenated output (from tier 2 unit 1 and tier 2 unit 2) as a concatenated input for the third tier—tier 3.

Figure 5A:
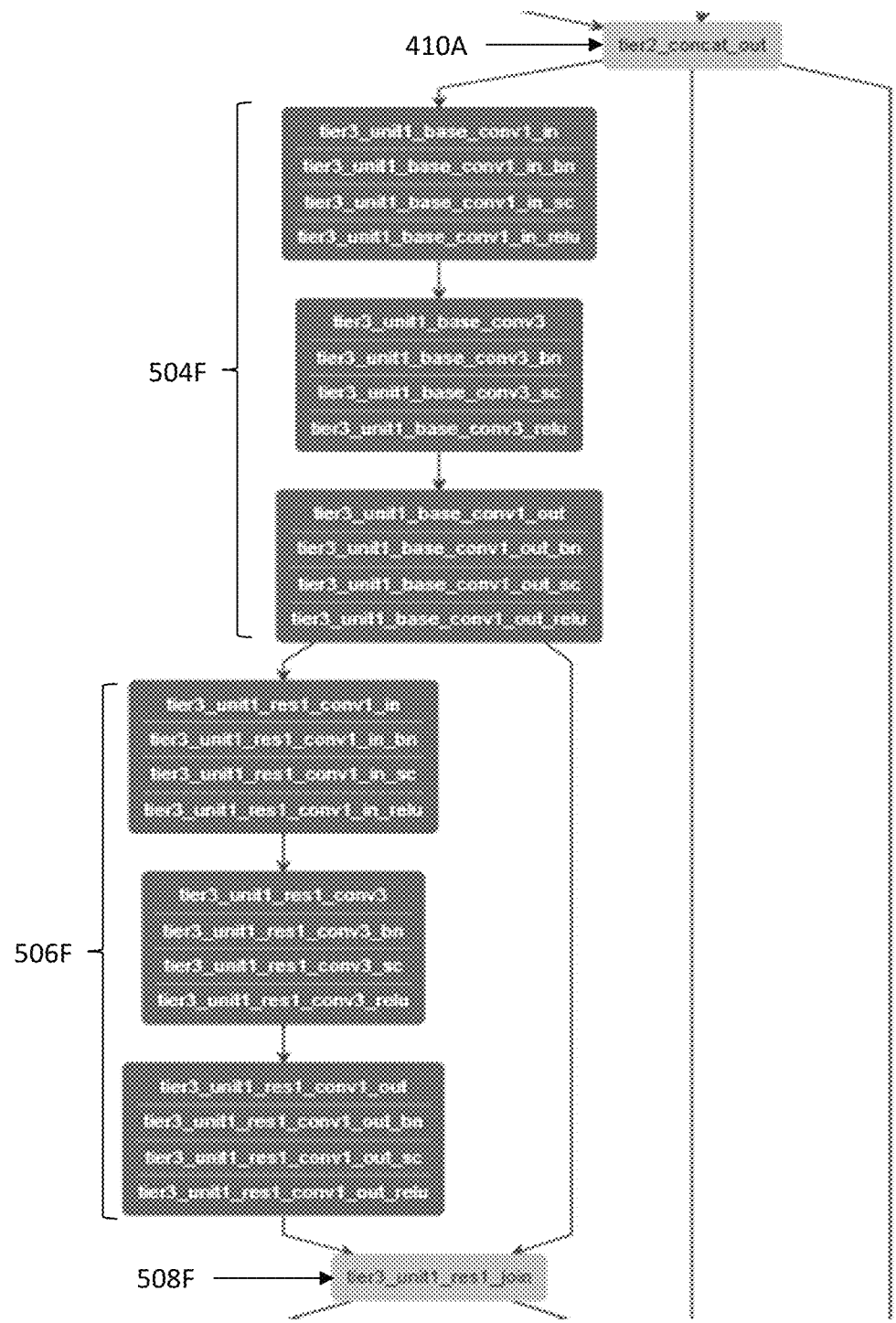
FIGS. 5A-5F illustrate a simplified example of a third tier in the multiple tiers of an example neural network in some embodiments.
Figure 5B:
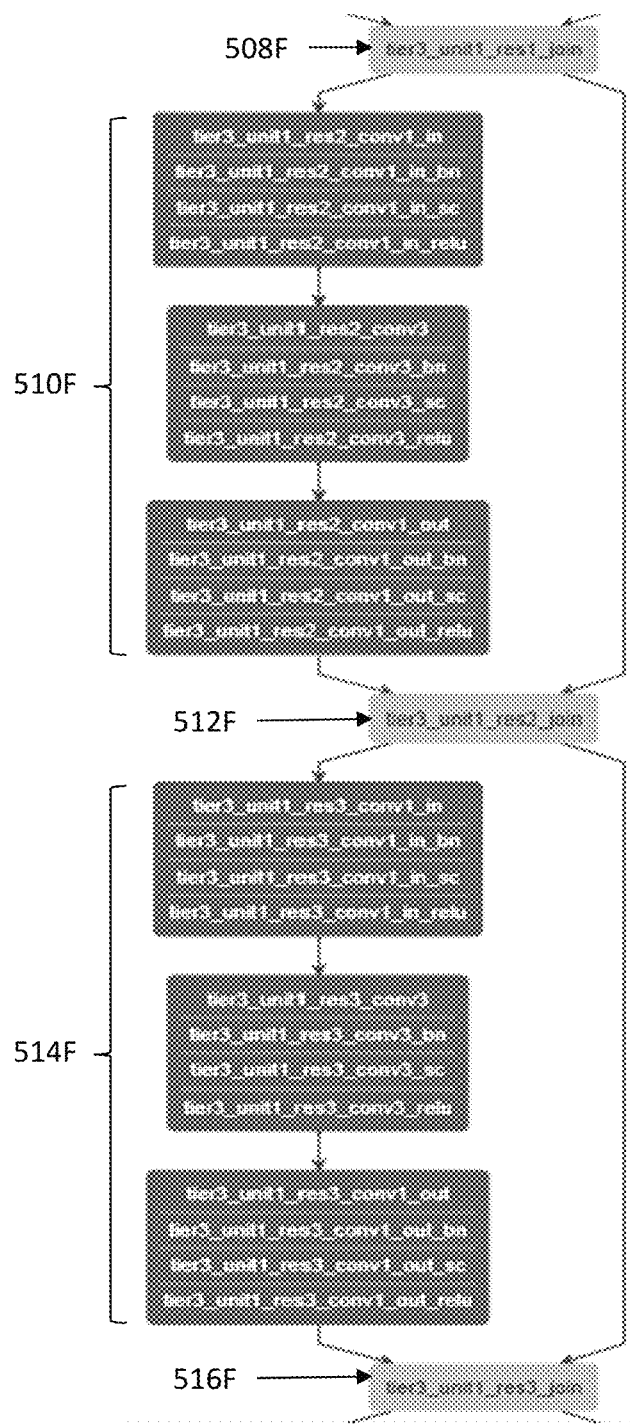
Figure 5C:
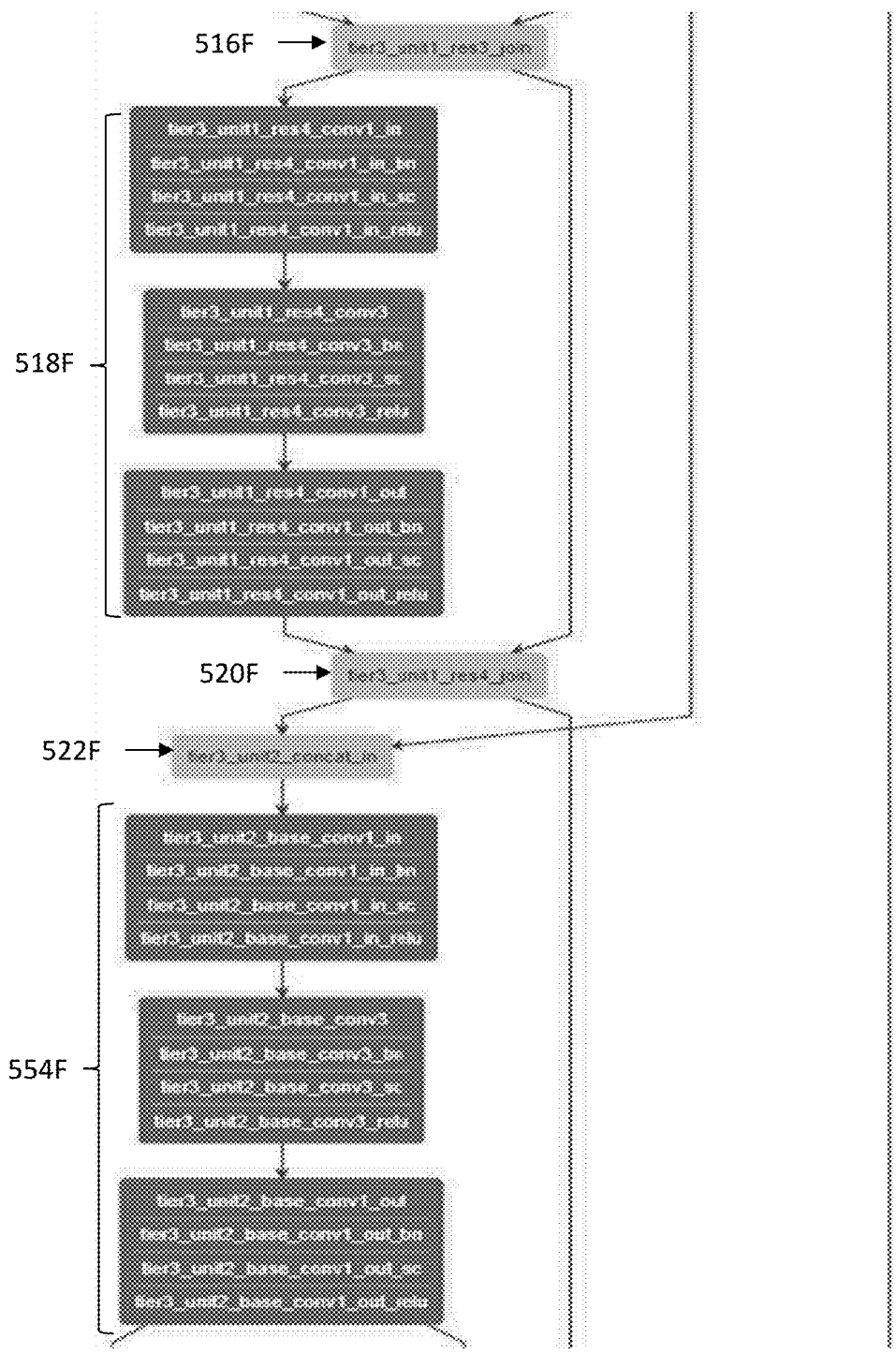
Figure 5D:
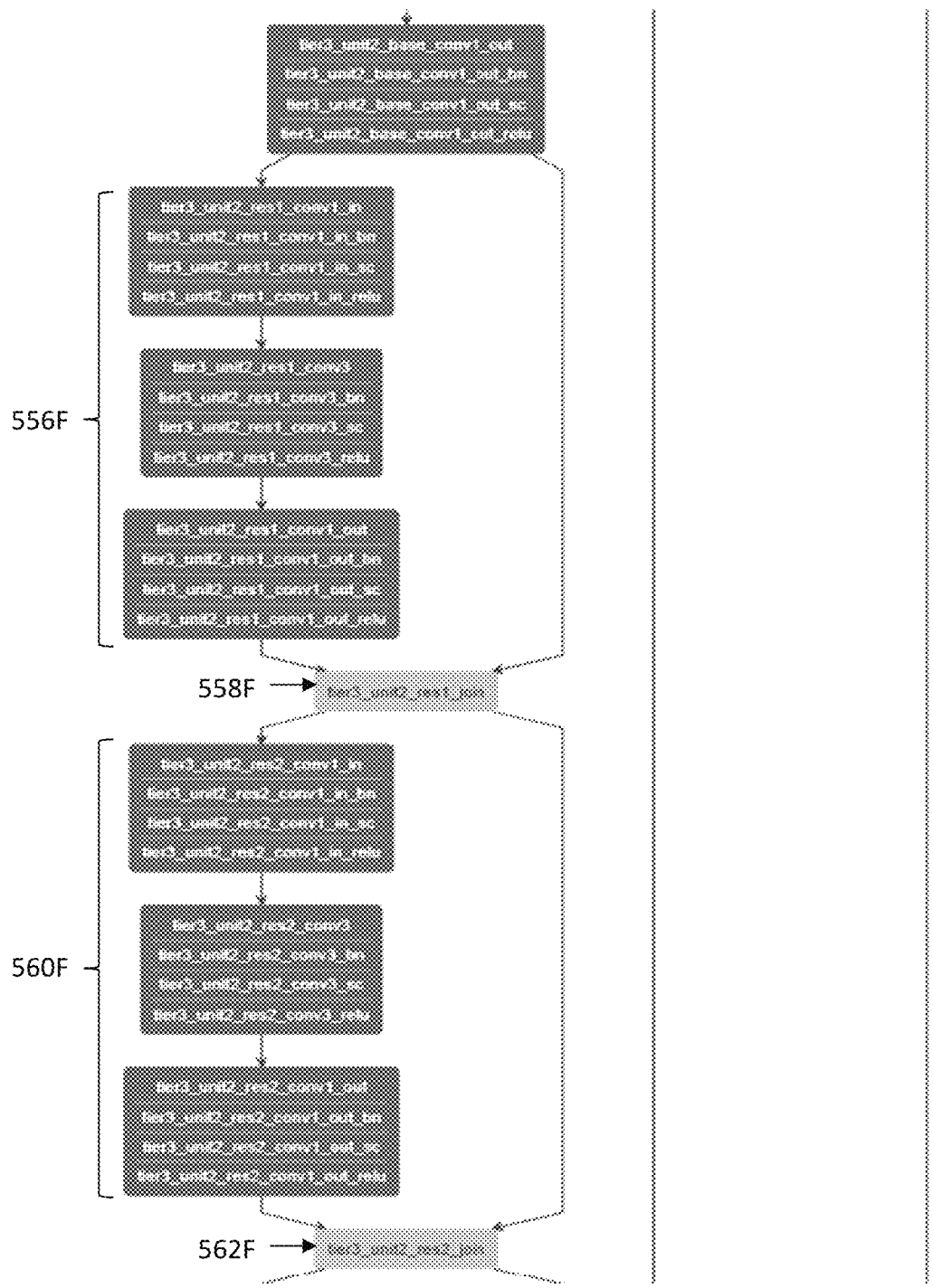
Figure 5E:
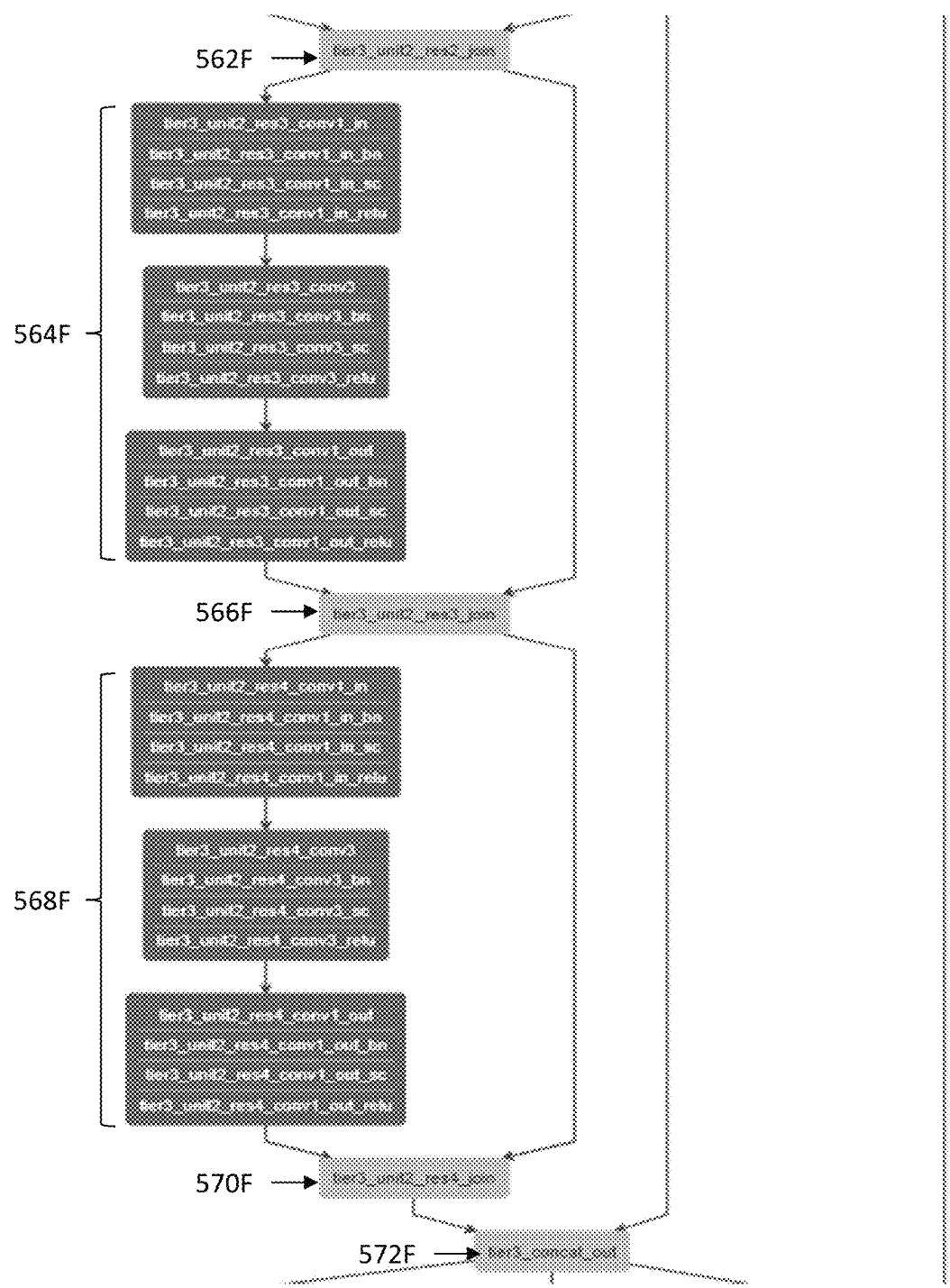

FIGS. 5A-5E illustrate Tier 3 of a neural network, according to some embodiments. Tier 3 may include two units (e.g., a first unit and a second unit). In some embodiments, tier 3 may include three units—unit 1 and unit 2. FIGS. 5A-5B and a portion of FIG. 5C illustrate the components of unit 1 of tier 3. In these embodiments, unit 1 of tier 3 may include multiple blocks that include a base block 504F, a first residual block 506F, a second residual block 510F, a third residual block 514F, and a fourth residual block 518F.

The base block 504F of unit 1 in tier 3 includes three subblocks. The first subblock includes a 1×1 convolution layer followed by a batch normalization layer that is further followed by a scale layer. A rectified linear unit follows the scale layer in the first subblock. The first subblock receives the concatenated output from tier 2 (410A) as an input to the first subblock of the base block of unit 1 in tier 3. The second subblock in the base block of unit 1 in tier 3 includes a 3×3 convolution layer followed by a batch normalization layer that is further followed by a scale layer. Another rectified linear unit follows the scale layer in the second subblock. The second subblock receives the output of the first subblock as an input to the second subblock. The third subblock of unit 1 in tier 3 has the same components as the second subblock with the exception of a 1×1 convolution layer in the third subblock and receives the output from the second subblock as the input to the third subblock.

The first residual block 506F also has three subblocks. The first subblock includes a 1×1 convolution layer followed by a batch normalization layer that is further followed by a scale layer. A rectified linear unit follows the scale layer in the first subblock. The output of the base block 504F is provided to the first subblock as an input. The first subblock receives the output from the third subblock of the base block 504F as an input to the first subblock of the first residual block 506F. The second subblock in the first residual block 506F of unit 1 in tier 3 includes a 3×3 convolution layer followed by a batch normalization layer that is further followed by a scale layer. Another rectified linear unit follows the scale layer in the second subblock. The second subblock in the first residual block 506F receives the output of the first subblock as an input to the second subblock. The third subblock of the first residual block 506F of unit 1 in tier 3 has the same components as the second subblock with the exception of a 1×1 convolution layer in the third subblock and receives the output from the second subblock as the input to the third subblock.

The pooling output of the first residual block 506F may be combined with the pooling output of the base block 504F at the tier 3 unit 1 residual 1 join (508F) to provide an input to the second residual block 510F of unit 1 in tier 3. The second residual block 510F, like the first residual block, may also have three subblocks.

More specifically, the first subblock includes a 1×1 convolution layer followed by a batch normalization layer that is further followed by a scale layer. A rectified linear unit follows the scale layer in the first subblock. The combined output (508F) from both the base block 504F and the first residual block 506F may be provided to the first subblock of the second residual block as an input. The second subblock in the second residual block 510F of unit 1 in tier 3 includes a 3×3 convolution layer followed by a batch normalization layer that is further followed by a scale layer. Another rectified linear unit follows the scale layer in the second subblock. The second subblock in the second residual block 510F receives the output of the first subblock as an input to the second subblock. The third subblock of the second residual block 510F of unit 1 in tier 3 has the same components as the second subblock with the exception of a 1×1 convolution layer in the third subblock and receives the output from the second subblock as the input to the third subblock. The pooling output of the third subblock of the second residual block 510F may also be combined with the combined output (508F) described above as a tier 3 unit 1 residual 2 combined output (512F) that may be further provided to the third residual block 514F of unit 1 in tier 3.

The pooling output of the second residual block 510F may be combined with the combined output (508F) as a tier 3 unit 1 residual 2 combined output (512F) to provide an input to the third residual block 514F of unit 1 in tier 3. The third residual block 514F, like the first and the second residual blocks, may also have three subblocks.

More specifically, the first subblock includes a 1×1 convolution layer followed by a batch normalization layer that is further followed by a scale layer. A rectified linear unit follows the scale layer in the first subblock. The combined output (512F) from both the combined output (508F) and the pooling output from the second residual block 510F may be provided to the first subblock of the third residual block 514F as an input. The second subblock in the third residual block 514F of unit 1 in tier 3 includes a 3×3 convolution layer followed by a batch normalization layer that is further followed by a scale layer. Another rectified linear unit follows the scale layer in the second subblock. The second subblock in the third residual block 514F receives the output of the first subblock as an input to the second subblock. The third subblock of the third residual block 514F of unit 1 in tier 3 has the same components as the second subblock with the exception of a 1×1 convolution layer in the third subblock in the third subblock and receives the output from the second subblock as the input to the third subblock. The pooling output of the third subblock of the third residual block 514F may also be combined with the combined output (512F) described above as a tier 3 unit 1 residual 3 combined output (516F) that may be further provided to the fourth residual block 518F of unit 1 in tier 3.

The pooling output of the third residual block 514F may be combined with the combined output (512F) as a tier 3 unit 1 residual 3 combined output (516F) to provide an input to the fourth residual block 518F of unit 1 in tier 3. The fourth residual block 518F, like the first, the second, and the second residual blocks, may also have three subblocks.

More specifically, the first subblock includes a 1×1 convolution layer followed by a batch normalization layer that is further followed by a scale layer. A rectified linear unit follows the scale layer in the first subblock. The combined output (516F) from both the combined output (512F) and the pooling output from the third residual block 514F may be provided to the first subblock of the fourth residual block 518F as an input. The second subblock in the fourth residual block 518F of unit 1 in tier 3 includes a 3×3 convolution layer followed by a batch normalization layer that is further followed by a scale layer. Another rectified linear unit follows the scale layer in the second subblock. The second subblock in the fourth residual block 518F receives the output of the first subblock as an input to the second subblock. The third subblock of the fourth residual block 518F of unit 1 in tier 3 has the same components as the second subblock with the exception of a 1×1 convolution layer in the third subblock and receives the output from the second subblock as the input to the third subblock. The pooling output of the third subblock of the fourth residual block 518F may also be combined with the combined output (516F) described above as a tier 3 unit 1 residual 4 combined output (520F) that may be further provided to unit 1 in tier 3 as an input (522F).

Similar to unit 1, unit 2 also includes a first base block 554F, a first residual block (556F), a second residual block (560F), a third residual block (564F), and a fourth residual block (568F).

The base block 554F of unit 2 in tier 3 includes three subblocks. The first subblock includes a 1×1 convolution layer followed by a batch normalization layer that is further followed by a scale layer. A rectified linear unit follows the scale layer in the first subblock. The first subblock receives the concatenated output (522F) from unit 1 as an input to the first subblock of the base block of unit 2 in tier 3. The second subblock in the base block of unit 2 in tier 3 includes a 3×3 convolution layer followed by a batch normalization layer that is further followed by a scale layer. Another rectified linear unit follows the scale layer in the second subblock. The second subblock receives the output of the first subblock as an input to the second subblock. The third subblock of unit 2 in tier 3 has the same components as the second subblock with the exception of a 1×1 convolution layer in the third subblock and receives the output from the second subblock as the input to the third subblock.

The first residual block 556F also has three subblocks. The first subblock includes a 1×1 convolution layer followed by a batch normalization layer that is further followed by a scale layer. A rectified linear unit follows the scale layer in the first subblock. The output of the base block 554F is provided to the first subblock as an input. The first subblock receives the output from the third subblock of the base block 554F as an input to the first subblock of the first residual block 556F of unit 2 in tier 3. The second subblock in the first residual block 556F of unit 2 in tier 3 includes a 3×3 convolution layer followed by a batch normalization layer that is further followed by a scale layer. Another rectified linear unit follows the scale layer in the second subblock. The second subblock in the first residual block 556F of unit 2 in tier 3 receives the output of the first subblock as an input to the second subblock. The third subblock of the first residual block 556F of unit 2 in tier 3 has the same components as the second subblock with the exception of a 1×1 convolution layer in the third subblock and receives the output from the second subblock as the input to the third subblock.

The pooling output of the first residual block 556F may be combined with the pooling output of the base block 554F to form the tier 3 unit 2 combined output (558F) to provide an input to the second residual block 560F of unit 2 in tier 3. The second residual block 560F, like the first residual block (556F), may also have three subblocks.

More specifically, the first subblock includes a 1×1 convolution layer followed by a batch normalization layer that is further followed by a scale layer. A rectified linear unit follows the scale layer in the first subblock. The combined output (558F) from both the base block 554F and the first residual block 556F may be provided to the first subblock of the second residual block as an input. The second subblock in the second residual block 560F of unit 2 in tier 3 includes a 3×3 convolution layer followed by a batch normalization layer that is further followed by a scale layer. Another rectified linear unit follows the scale layer in the second subblock. The second subblock in the second residual block 560F receives the output of the first subblock as an input to the second subblock. The third subblock of the second residual block 560F of unit 2 in tier 3 has the same components as the second subblock with the exception of a 1×1 convolution layer in the third subblock and receives the output from the second subblock as the input to the third subblock. The pooling output of the third subblock of the second residual block 560F may also be combined with the combined output (558F) described above to form a tier 3 unit 2 residual 2 combined output (562F) that may be further provided to the third residual block 564F of unit 2 in tier 3.

The pooling output of the second residual block 510F may be combined with the combined output (558F) as a tier 3 unit 2 residual 2 combined output (562F) to provide an input to the third residual block 564F of unit 2 in tier 3. The third residual block 564F, like the first and the second residual blocks, may also have three subblocks.

More specifically, the first subblock includes a 1×1 convolution layer followed by a batch normalization layer that is further followed by a scale layer. A rectified linear unit follows the scale layer in the first subblock. The combined output (562F) from both the combined output (558F) and the pooling output from the second residual block 560F may be provided to the first subblock of the third residual block 564F as an input. The second subblock in the third residual block 564F of unit 1 in tier 3 includes a 3×3 convolution layer followed by a batch normalization layer that is further followed by a scale layer. Another rectified linear unit follows the scale layer in the second subblock. The second subblock in the third residual block 564F receives the output of the first subblock as an input to the second subblock. The third subblock of the third residual block 564F of unit 2 in tier 3 has the same components as the second subblock with the exception of a 1×1 convolution layer in the third subblock in the third subblock and receives the output from the second subblock as the input to the third subblock. The pooling output of the third subblock of the third residual block 564F may also be combined with the combined output (562F) described above as a tier 3 unit 2 residual 3 combined output (566F) that may be further provided to the fourth residual block 568F of unit 2 in tier 3.

The pooling output of the third residual block 564F may be combined with the combined output (562F) as a tier 3 unit 2 residual 3 combined output (566F) to provide an input to the fourth residual block 568F of unit 2 in tier 3. The fourth residual block 568F, like the first, the second, and the second residual blocks, may also have three subblocks.

More specifically, the first subblock includes a 1×1 convolution layer followed by a batch normalization layer that is further followed by a scale layer. A rectified linear unit follows the scale layer in the first subblock. The combined output (566F) from both the combined output (562F) and the pooling output from the third residual block 564F may be provided to the first subblock of the fourth residual block 568F as an input. The second subblock in the fourth residual block 568F of unit 2 in tier 3 includes a 3×3 convolution layer followed by a batch normalization layer that is further followed by a scale layer. Another rectified linear unit follows the scale layer in the second subblock. The second subblock in the fourth residual block 568F receives the output of the first subblock as an input to the second subblock. The third subblock of the fourth residual block 568F of unit 1 in tier 3 has the same components as the second subblock with the exception of a 1×1 convolution layer in the third subblock and receives the output from the second subblock as the input to the third subblock. The pooling output of the third subblock of the fourth residual block 518F may also be combined with the combined output (566F) described above as a tier 3 unit 1 residual 4 combined output (570F) that may be further concatenated with the tier 3 unit 1 residual 4 combined output (520F) to form the tier 3 concatenated output (572F).

Figure 5F:
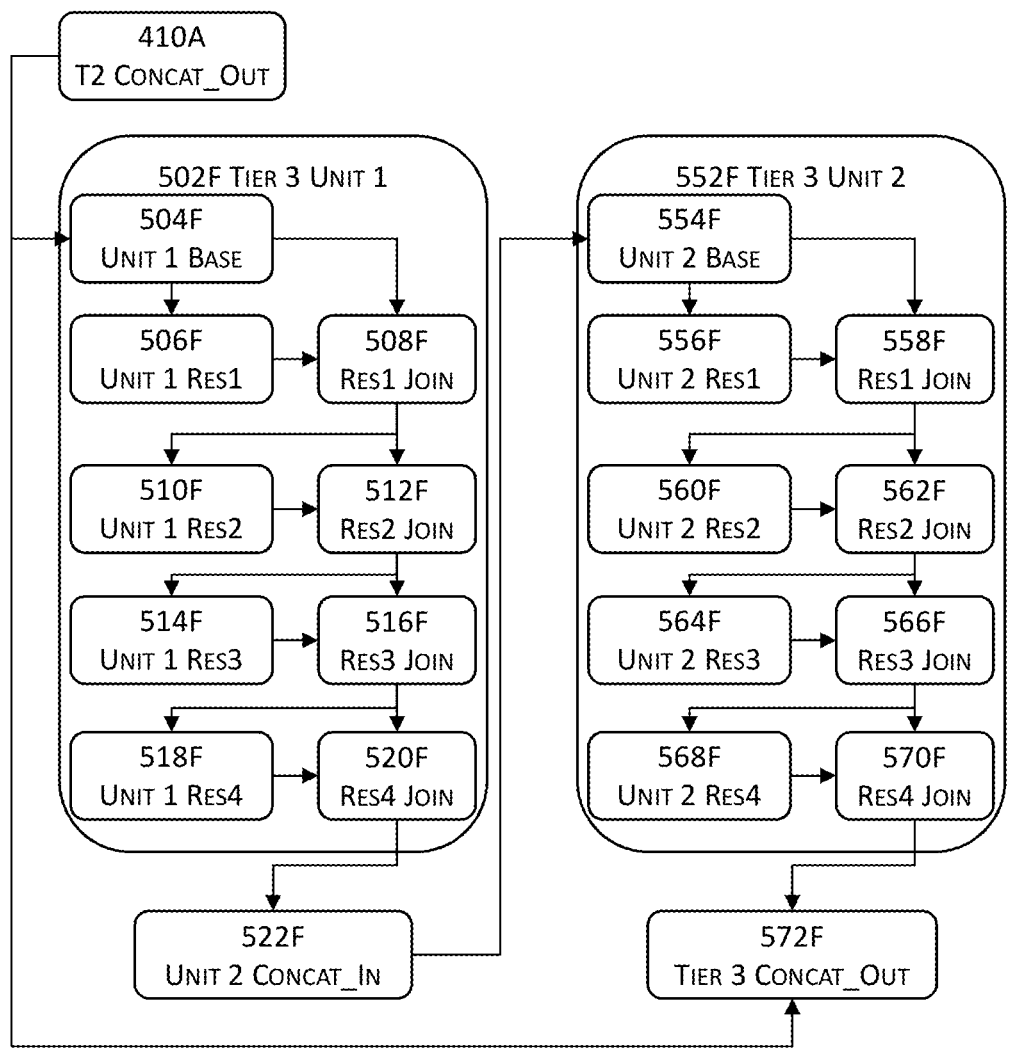

As it can be seen from FIGS. 5A-5E described above, some embodiments combine or concatenate various pieces of data to form input tensors for various blocks in a neural network. Unlike some conventional approaches, some embodiments do not concatenate the input tensors with intermediate feature tensors or outputs to reduce compute. Another reason for not concatenating the input tensors with intermediate feature tensors is that in many cases, an input feature tensor may be mostly redundant and thus does not contribute performance gains. This aspect is more clearly illustrated in FIG. 5F. As illustrated in FIG. 5F, a block (including multiple subblocks as described above with reference to FIGS. 5A-5E) in a unit provides its pooling out to a combiner and also to the next block as a first part of an input. A combiner may combine the pooling out from the immediately preceding block and the pooling out from the next preceding block to form a combined pooling out that is further provided to the next block as a second part of the input.

For example, the pooling out of the unit 1 base block 504F is provided to the first residual block 506F as a first part of input to the first residual block 506F and also to the tier 3 unit 1 residual 1 join 508F. The tier 3 unit 1 residual 1 join (508F) then combines the pooling out of the first residual block 506F with the pooling out of the unit 1 base block 504F. Moreover, the pooling out of the unit 1 second residual block 510F is provided to the tier 3 unit 1 residual 2 join (512F) which in turn combines the pooling out of the unit 1 second residual block 510F with the tier 3 unit 1 residual 1 combined output 508F as a second residual combined output.

This second residual combined output at 512F is provided to the third residual block 514F as an input and also to the tier 3 unit 1 residual 3 combiner 516F that combines this second residual combined output with the pooling out of the third residual block 514F of unit 1 in tier 3 as a third residual combined output. This third residual combined output (at 516F) is provided to the fourth residual block 518F as an input and also to the tier 3 unit 1 residual 4 combiner 520F that combines this third residual combined output with the pooling out of the fourth residual block 518F of unit 1 in tier 3 as a fourth residual combined output. This fourth residual combined output is then used as the input to unit 2 which performs similar combinations or concatenations as unit 1 to generate the tier 3 unit 2 residual 4 combined output (570F) which is then concatenated with the tier 2 concatenated output (410A) to form the tier 3 concatenated output 572F.

Figure 6A:
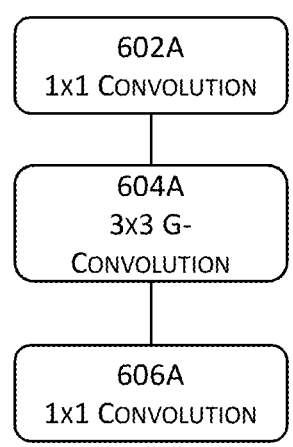
FIG. 6A illustrates a simplified example of a set of 1-3-1 convolution modules or layers that may be used in a neural network described herein in some embodiments.

FIG. 6A illustrates a simplified example of a set of 1-3-1 convolution modules, blocks, or subblocks that may be used in a neural network described herein in some embodiments. In some embodiments, FIG. 6A illustrates a ladder convolution structure that includes a 1×1 convolution layer 602A followed by a 3×3 grouped convolution layer (G-Convolution in FIG. 6A) with grouped convolutions 604A that is further followed by a 1×1 convolution layer. Some examples of such a 1-3-1 convolution modules, blocks, or subblocks may include the base blocks and the residual blocks in unit 1 or unit 2 of tier 3 described above with reference to FIGS. 5A-5F or the second unit 404B of unit 2 in tier 2 described above with reference to FIGS. 4A-4B.

Figure 6B:
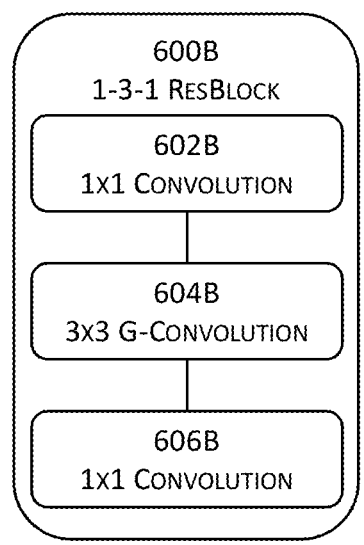
FIG. 6B illustrates a simplified example of a residual block having the set of 1-3-1 convolution modules or layers that may be used in a neural network described herein in some embodiments.

FIG. 6B illustrates a simplified example of a residual block having the set of 1-3-1 convolution modules or layers that may be used in a neural network described herein in some embodiments. More particularly, FIG. 6B illustrates a ladder residual block or subblock that includes a 1×1 convolution layer 602B followed by a 3×3 grouped convolution layer 604B that is further followed by a 1×1 convolution layer. Some examples of such a 1-3-1 residual block or subblock may include the residual blocks in unit 1 or unit 2 of tier 3 described above with reference to FIGS. 5A-5F. These residual blocks are used in tier 3 to improve information flow during back-propagation that is used in feed-forward neural network to train the large deep learning network. More precisely, these residual blocks are used to forward-propagate an input to calculate an output and to back-propagate errors or losses and train a neural network. These residual blocks are devised to work with, for example, 64 channels to reduce parallel compute after tier 1. In addition or in the alternative, tier 3 employs dilated convolutions with different dilation factors to increase the receptive field of the neural network in order to capture large objects in the input. For example, the base block, the first residual block, the second residual block, the third residual block, and the fourth base block may respectively correspond to the dilation factors of 0 (zero), 1 (one), 2 (two), 3 (three), and 4 (four). It shall be noted that other dilation schemes with different combinations of dilation factors may also be used.

Furthermore, tier 3 may employ grouped convolutions in the blocks (e.g., the blocks and/or subblocks described above with reference to FIGS. 5A-5F) with a grouping factor to reduce compute in some embodiments. In some of these embodiments where tier 2 also employs grouped convolutions, the grouping factor of tier 2 may be different from that of tier 3. In some embodiments, tier 2 may employ a grouping factor of 4, and tier 3 may employ a grouping factor of 8. In some embodiments, tier 1 employs a max pooling layer but does not employ grouped convolutions. It shall be noted that other grouping factors may also be used.

In some embodiments, the number of groups (e.g., governed by the grouping factors) is devised to be equal to the number of channels because convolutions, as explained above, are channel-wise operations (e.g., channel-wise convolution). Moreover, channel-wise convolution (also known as depth-wise convolution) is a special case of grouped convolution because channel-wise convolution is a grouped convolution with a groping factor that is equal to the number of channels. In these embodiments, convolution layers may be grouped so that the number of filters per group is a multiple of the number of register lanes so as to enhance vector register utilization. In some embodiments where grouped convolutions cause some undesirable effects (e.g., some keypoints fail to train), these embodiments may add additional keypoint supervision heads with different spatial resolutions to stabilize training and to facilitate better gradient flow for training. More details will be described below with reference to, for example, FIGS. 9A-9F.

In some embodiments, the neural network represents an encoder-decoder architecture (e.g., FIG. 6G) wherein a hand is labeled with a set of keypoints, the neural network predicts a first subset of keypoints in the set for predicting or determining hand pose and uses a second subset of keypoints (the remaining keypoint(s) in the set of keypoints) for training supervision. For example, a hand may be labeled with 17 (seventeen) keypoints from #1 through #17 as illustrated in FIG. 1. This set of 17 keypoints are categorized as a primary set of keypoints (e.g., the shaded labels 1, 2, 4, 5, 6, 7, 10, and 17) and an auxiliary set of keypoints (e.g., the non-shaded labels 3, 8, 9, 11, 12, 13, 14, 15, and 16) so that the network generate predictions for the primary set of keypoints while using the auxiliary set of keypoints as training supervision. Some of these embodiments do not employ grouping in convolutions for the decoder portion of the network to avoid issues such as floating keypoints, keypoints jumping off a hand, etc. and to regularize the feature tensor after the encoder.

Figure 6C:
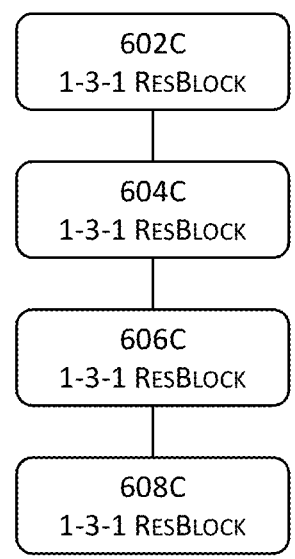
FIG. 6C illustrates a simplified example of a block having four residual modules illustrated in FIG. 6B that may be used in a neural network described herein in some embodiments.

FIG. 6C illustrates a simplified example of a block having four residual modules illustrated in FIG. 6B that may be used in a neural network described herein in some embodiments. More specifically, FIG. 6C illustrates an example dilated ladder unit having multiple blocks with respective, different dilation factors. For example, the dilated ladder unit may include a first 1-3-1 residual block 602C corresponding to a dilation factor of 1, a second 1-3-1 residual block 604C having groped convolutions and corresponding to a dilation factor of 2, a third 1-3-1 residual block 606C corresponding to a dilation factor of 3, and a fourth 1-3-1 residual block 608C corresponding to a dilation factor of 4. It shall be noted that other dilation factors may also be used in some other embodiments.

Figure 6D:
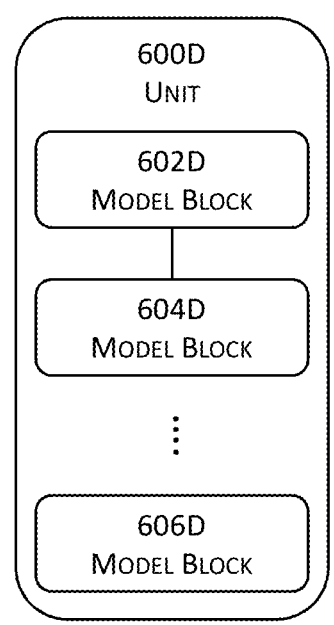
FIG. 6D illustrates a simplified example of a unit comprising multiple blocks in some embodiments.

FIG. 6D illustrates a simplified example of a unit comprising multiple blocks in some embodiments. FIG. 6D presents a use of nomenclatures in the present disclosure. As already described above with reference to, for example, a network may include multiple tiers, and a tier may include one or more units. As illustrated in FIG. 6D, a unit 600D may include one or more blocks. In the example unit 600D illustrated in 600D, this unit 600D includes multiple blocks—602D, 604D, and 606D. A block may include one or more subblocks, modules, or layers. For example, a residual block described above may include a convolution layer, a batch normalization layer, a scale layer, and a rectified linear unit. In some embodiments, model 604D may employ groped convolutions in a similar manner as that described above with reference to FIG. 6A or 6B.

Figure 6E:
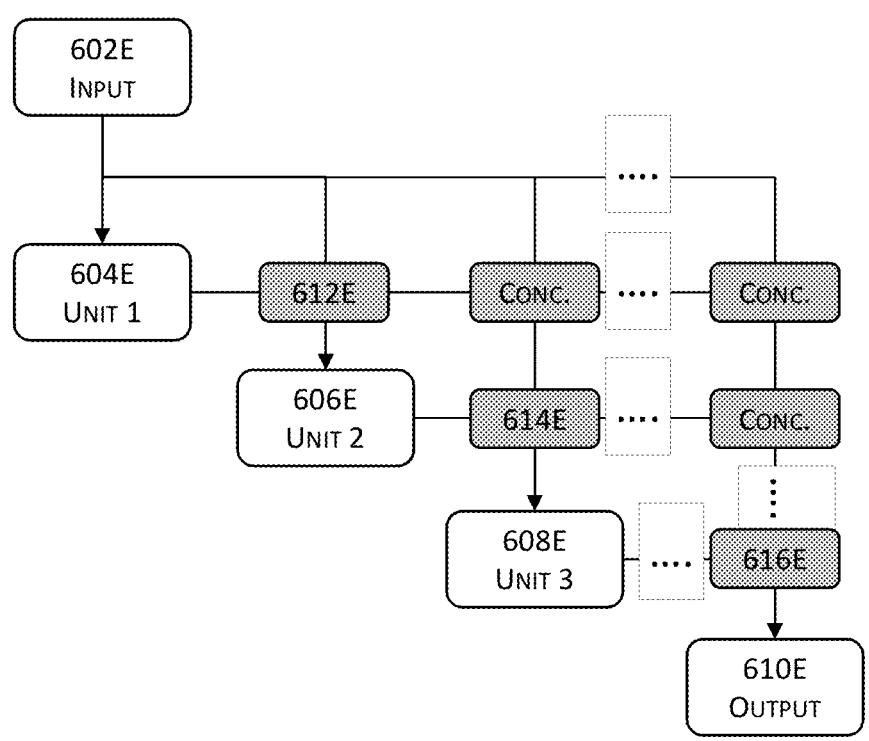
FIG. 6E illustrates a simplified example of concatenating multiple input(s) and/or output(s) among multiple units in some embodiments.

FIG. 6E illustrates a simplified example of concatenating multiple input(s) and/or output(s) among multiple units in some embodiments. More specifically, FIG. 6E illustrates an example where the input 602E is provided to unit 1 604E. The input 602E is further concatenated with the output of unit 1 (604E) at a concatenation module 612E. This concatenated output after 612E is provided as an input to unit 2 606E. Similarly, the output of unit 2 (606E) is concatenated with, for example, the input 602E and/or the output of unit 1 (604E) at the concatenation module 614E, and this concatenated result is provided as an input to unit 3 (608E); and the output of unit 3 (608E) is concatenated with, for example, the input 602E, the output of unit 2 (606E), and/or the output of unit 3 (608E) at the concatenation module 616E to generate the output 610E for the illustrated network having three example units.

In some other embodiments, the concatenation (e.g., 612E, 614E, or 616E, etc.) may be progressive. That is, these embodiments do not need a quadratic number of concatenation modules as shown in FIG. 6E. Rather, the input to $\text{Unit}_{K+1}$ may include the previously concatenated input to $\text{Unit}_K$ concatenated with the output of $\text{Unit}_K$. In some of these embodiments, the initial input may be hidden from the final output of a tier. In these embodiments, the output is unlike the output that is the concatenation of the initial input together with the output of all the Units illustrated in FIG. 6E. Rather, the initial input is hidden from and does not contribute to the concatenated output 610E. Moreover, the (i+1)-th concatenation (e.g., 616E) expands the (i)-th concatenation (e.g., 614E), rather than re-performing all the previous concatenation from scratch in some embodiments.

In some embodiments, pooling may be performed and then concatenate the Unit outputs to further conserve compute because pooling is performed per channel independently and further because pooling and concatenation commute in these embodiments. In a multithreaded environment, concatenation may commence immediately as any Unit completes its processing, rather than waiting for all the Units to complete their respective processing. In some embodiments, the initial part of the data tensor which comes from 602E to generate the output.

Figure 6F:
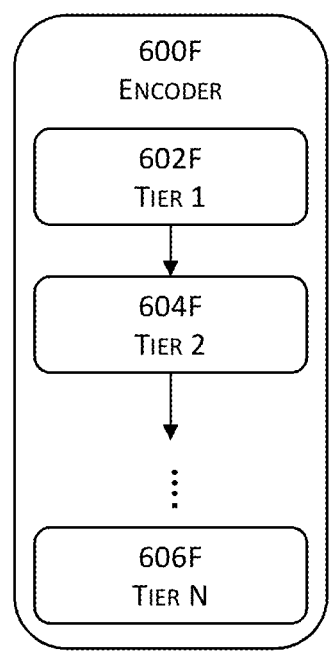
FIG. 6F illustrates a simplified schematic example of an encoder having multiple tiers in some embodiments.

FIG. 6F illustrates a simplified schematic example of an encoder having multiple tiers in some embodiments. FIG. 6E presents a use of nomenclatures in the present disclosure. As already described above with reference to, for example, a network may include multiple tiers, and a tier may include one or more units. As illustrated in FIG. 6F, an encoder 600F may include one or more tiers. In the example encoder 600F illustrated in 600F, this encoder 600F includes multiple tiers—602F, 604F, and 606F. A tier may include one or more units; and a unit may include one or more blocks, and a block may include one or more subblocks, modules, or layers.

Figure 6G:
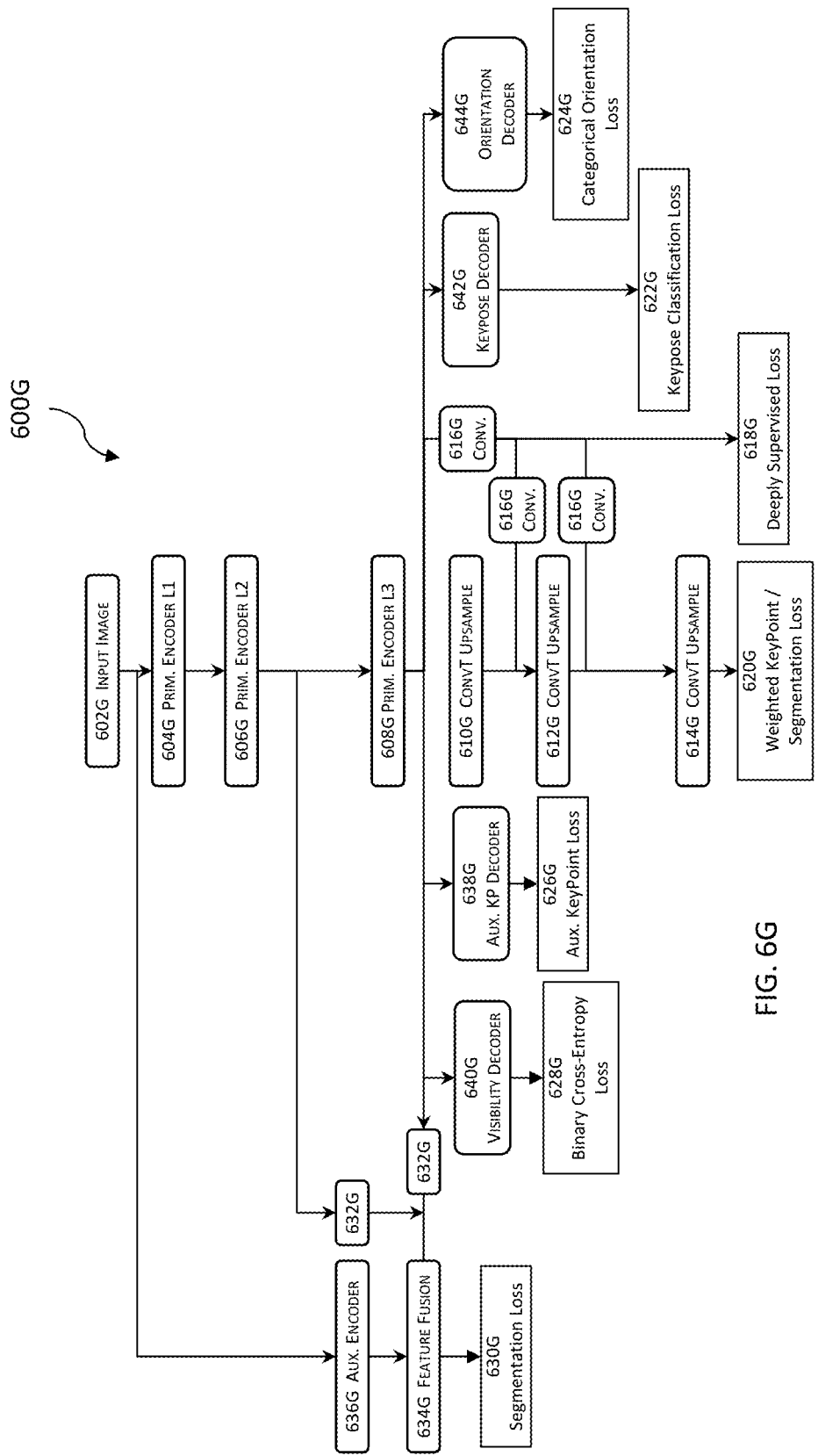
FIG. 6G illustrates a simplified example of a network architecture comprising multiple tiers each having one or more units of one or more blocks in some embodiments.

FIG. 6G illustrates a simplified, schematic example of a network architecture comprising multiple tiers each having one or more units of one or more blocks in some embodiments. More specifically, FIG. 6G illustrates a network 600G of the encoder-decoder architecture for training, validating, and/or testing semantic segmentation for input image(s) 602G with a neural network with multi-task deep learning of computer vision while preserving spatial information and enhancing receptive field. The example network architecture is a lightweight network that can be embedded in mobile electronic devices including, for example, a wearable device such as a VR, AR, MR, or XR device.

An embedded implementation described herein includes a combination of a processor (e.g., a VPU or vision processing unit), computer memory, and input/output devices—that has a dedicated function within a larger system. In some embodiments, an embedded implementation described herein includes the implementation of a neural network described herein or at least a portion thereof in a mobile computing device such as a wearable electronic device. An embedded implementation may include implementing various modules, layers, blocks, etc. of a neural network in some form of memory (e.g., EPROM, RAM, etc.), as a custom IC (integrated circuit) such as an ASIC (application specific integrated circuit), a system-on-chip (SoC), an FPGA (field-programmable gate array), a miniaturized computer board with components and devices, or any combination thereof.

For a wearable electronic device (e.g., an MR or XR device), minimization amounts to difficult, if not insurmountable, challenges to conventional implementations. For example, deep learning framework often converts convolutions into one or more large matrix multiplications in a highly memory inefficient manner that is not suitable for wearable electronic devices having limiting space to accommodate components to provide sufficient capacity for compute and/or storage tasks and for power consumption. Another challenge is that the input data tensors from images are often stored in channel planar format that is inefficient for vectorization. Moreover, kernel sizes are often not a multiple of the vector instruction width; and off-the-shelf implementations of dilated convolutions have considerable computational overhead.

To address at least the aforementioned challenges, some embodiments described herein reorder and interleave input data channels to each convolution layer to align with the vector instruction ordering. More specifically, these embodiments simultaneously reorder the kernel stack so that convolutions are reduced to dot products and the output channel is encoded in the interleaved format for the next layer. These embodiments further group convolution layers so that the number of filters per group is equal to a multiple of the register lanes and thus maximize vector register utilization.

In addition or in the alternative, some embodiments using a comb design for dilated convolutions where the comb design minimizes the on-chip memory footprint. It shall be noted that a layer is a separate set of one or more functional components that interacts in some sequential or hierarchical way to another layer above or below it.

In some embodiments, all the layers, blocks, modules, components, etc. in this example network architecture may be completely embedded in a computing device (e.g., a wearable device) to facilitate expedient inference time at runtime when compared to, for example, utilizing a remote computing device (e.g., a cloud service) for such purposes, whereas in some other embodiments, some, but not all, of the layers, blocks, modules, components, etc. are embedded in a computing device. Expedient inference time from a neural network with low latency is important for computer vision applications in, for example, automotive applications (e.g., autonomous driving vehicles), hand pose tracking, estimation, prediction, and/or recognition, etc. of VR/AR/MR/XR devices.

Some embodiments embed all but the layers, blocks, modules, components, etc. pertaining to training the neural network in a computing device. For example, convolution with a dilation factor of 2 may be split into four independent field-wise computations (e.g., even rows-even columns, even rows-odd columns, odd rows-even columns, and odd rows-odd columns). These four independent field-wise computations are computed independently and recombined on output so that dilation convolutions employed in various layers described herein may be performed at reduced, minimal, or even zero effective overhead.

For example, the encoders (primary encoder layer 1 (604G), primary encoder layer 2 (606G), and primary encoder layer 3 (606G)), the up-samplers (610G, 612G, and 614G), and one or more decoder modules (e.g., a visibility decoder 640G, a key-pose decoder 642G, and/or an orientation decoder 644G) may be embedded in a computing device, while the other modules (e.g., the auxiliary keypoint decoder 638G, and the auxiliary encoder 636G) as well as the losses (e.g., the segmentation loss 630G, the binary cross-entropy loss 628G, the auxiliary keypoint loss 626G, the deeply supervised loss 618G, the keypose classification loss 622G, the categorical orientation loss 624G, and the weighted keypoint and segmentation loss 620G) are used primarily during training but are not embedded on the computing device to be deployed with the computing device. Reference numeral 632G represent the attention refinement module, and reference numeral 616G represents the 1×1 convolutions.

In some embodiments, the neural network predicts binary segmentation mask(s) for the left and/or right hand at inference time whereas some other embodiments predict binary segmentation mask(s) for the left and/or right hand at inference time. These latter embodiments may reserve two channels (e.g., the last two channels of an upsampled feature output at 614G) to predict binary segmentation mask(s) for the left and/or right hand. At training time, in addition to the training time only auxiliary spatial branch which predicts segmentation, a segmentation loss may also be applied to these two channels of the output of, for example, 614G. That is, runtime segmentation channels may be enabled in some embodiments or disabled in some other embodiments.

In addition or in the alternative, these latter embodiments may produce a data tensor with 32 channels where each channel may be interpreted as a heatmap. For example, these embodiments may divide these first 30 channels up into 15 channels per hand (e.g., 15 channels for the left hand and 15 channels for the right) and use a spatial softmax independently for each of these channels to learn to predict keypoints (e.g., the predicted keypoint for each channel) may be the argmax, or alternately the soft-argmax, of the channel interpreted as a heatmap. In some embodiments, each channel may correspond to a different keypoint. In these embodiments, the two reserved channels may respectively correspond to the left and right binary segmentation masks for the left and right hands. Furthermore, unlike the auxiliary spatial branch, these segmentation predictions may be retained for the runtime inference network because these segmentation predictions may add little to either the size or compute of the model.

Figure 6H:
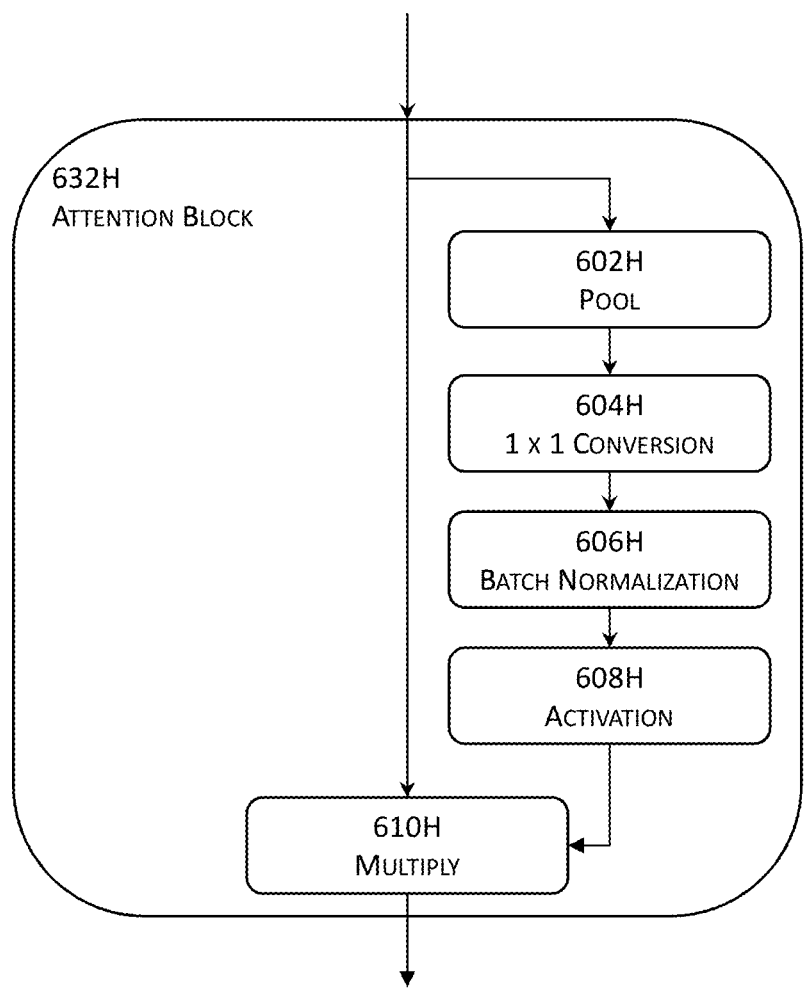
FIG. 6H illustrates a simplified example of an attention block having multiple various layers in some embodiments.

FIG. 6H illustrates a simplified example of a block having multiple various layers in some embodiments. More particularly, FIG. 6H illustrates an example of an attention refinement layer or block 632H that is also referenced as reference numeral 632G in FIG. 6G. An attention refinement block may provide better accuracy in predictions with an inference model without loss of speed. An attention refinement block 632H may receive an input at a pooling layer 602H (e.g., a global average pooling layer, a max pooling layer, etc.) to encode an output feature (e.g., an output feature from an encoder layer) into an attention vector.

The output vector may be provided to a convolution layer 604H (e.g., a 1×1 convolution layer), a batch normalization layer 606H, and an activation layer 608H (e.g., a rectified linear unit, a sigmoid activation layer, a hyperbolic tangent or tanh activation layer, etc.) so that the original input may be re-weighted by the attention vector. An attention refinement module as illustrated in FIG. 6H enables capturing context information (e.g., global context information) and refining predictions of the neural network to provide more accurate sematic segmentation, without complex up-sampling operations. In the example neural network 600G illustrated in FIG. 6G, the Tier 2 (the primary encoder layer 2 606G) output and the Tier 3 (the primary encoder layer 3 608G) output are respectively provided to their corresponding attention refinement modules 632G to refine their respective outputs. The refined output from 608H and the original input are provided to, for example, a multiplier 610H which performs a tensorial operation to eventually provide the output from the attention refinement module 632H.

Figure 6I:
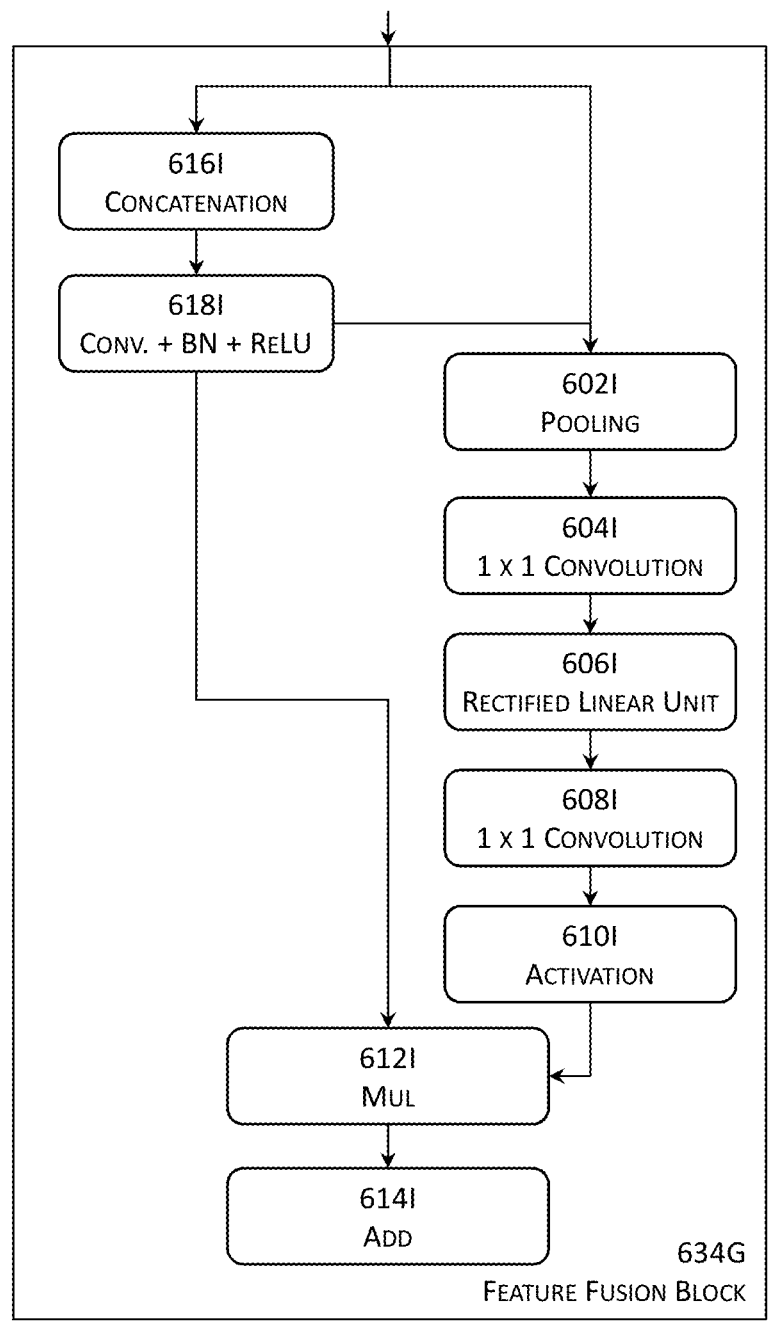
FIG. 6I illustrates a simplified example of a feature fusion block having multiple modules or layers in some embodiments.

FIG. 6I illustrates a simplified example of a feature fusion block having multiple modules or layers in some embodiments. Some embodiments are directed to a semantic segmentation neural network that employs a spatial path to preserve spatial information and to increase the receptive field for computer vision. These embodiments include a feature fusion module that fuse the features of the spatial path and the context path. It shall be noted that a context path encodes context information (e.g., global context information) that is considered high-level information while the spatial path encodes detail information that is considered low-level information. Such high-level context information and low-level spatial information cannot be simply summed together. A feature fusion module concatenates the features output from the spatial path and the context path and use batch normalization to balance the scales of these features. The feature fusion module then pools the concatenated features to a feature vector and computes a weight vector to re-weight the features for feature selection and combination. The feature fusion module receives features or feature maps from the spatial path and the context path and concatenates (616I) the respective features/feature maps.

The concatenated output from the spatial path and the context path is also forwarded to a block 618I having a convolution layer followed by a batch normalization layer that is further followed by a rectified linear unit. The batch normalization layer in 618I balances the scales of the features from the spatial path and the context path. The concatenation operation 616I may be not viable when the size of feature maps changes. In some embodiments, a part of a convolutional neural network is down-sampling layers that change the size of feature-maps. To facilitate down-sampling in the neural network architecture, some embodiments divide the neural network into multiple densely connected dense blocks.

More particularly, the features from the spatial path and the context path are also sent to a pooling layer 602I (e.g., a max pooling layer, a global average pooling layer, an atrous spatial pyramid pooling, etc.) The pooling layer 602I output is sent to a 1×1 convolution layer 604I that applies a 1×1 filter to the input. The 1×1 convolution layer output is sent to a rectified linear unit 606I that applies a rectified linear function as an activation. The output of the rectified linear unit 606I is forwarded to the 1×1 convolution layer 608I that applies another 1×1 filter matrix to the input.

The repeated application of the 1×1 filter matrix in the 1×1 convolution layer 604I and the 1×1 convolution layer 608I results in a map of activations that is also called a feature map that indicates the locations and strengths of detected feature(s) in the input to these convolution layers. The output of the 1×1 convolution layer 608I is sent to another activation layer 610I. The activation function applied at the activation layer transforms the input to the activation layer 610I into the activation of the output for the input. Various activation functions such as a rectified linear function, a hyperbolic function (tanh), sigmoid, etc. may be employed at 610I. The output of the activation layer 610I and that from the block 619 is joined (e.g., multiplied as in dot product) at 612I and summed at 614I. With the feature fusion module illustrated in FIG. 6I, features from the context path and the spatial path are concatenated into the concatenated features that are further processed into feature vector(s), and the feature fusion module further computes a weight vector that is then used to re-weight the features, which amounts to feature selection and combination.

Figure 7A:
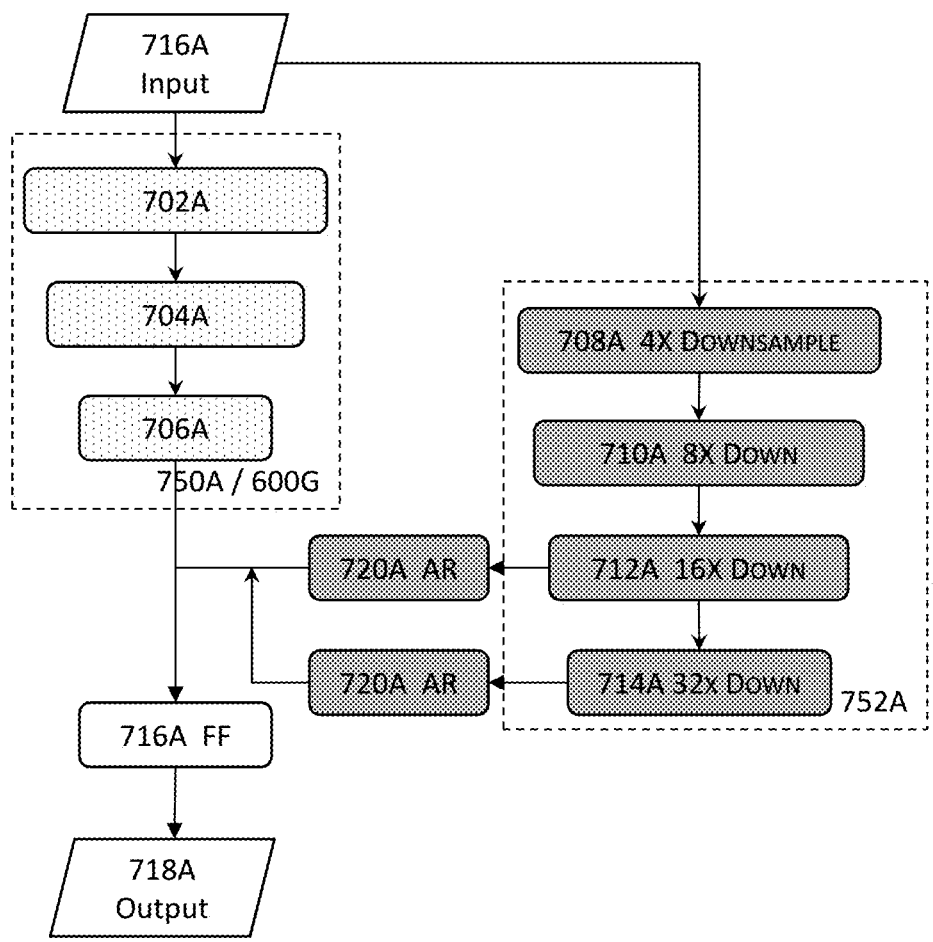
FIG. 7A illustrates a high-level schematic block diagram of semantic segmentation with multi-task deep learning and a neural network while preserving spatial information and enhancing receptive field for computer vision in some embodiments.

FIG. 7A illustrates a high-level schematic block diagram of semantic segmentation with multi-task deep learning and a neural network while preserving spatial information and enhancing receptive field for computer vision in some embodiments. The neural network illustrated in FIG. 7A includes a spatial path 750A and a context path 752A and may thus be called a bilateral sematic segmentation neural network. The spatial path 750A may be processed by the network illustrated in FIGS. 3, 4A-4B, 5A-5F, and 6G. Due to the complexity of the neural network, FIG. 7A merely shows the three tiers—702A, 704A, and 706A.

It shall be noted that the widths of these three tiers 702A, 704A, and 706A indicate the respective spatial sizes. The spatial path generated with the aforementioned network preserves spatial information by encoding rich detailed information, while the context path is utilized to increase the receptive field to accommodate large objects for computer vision.

In some embodiments, tier 1 702A uses 16 channels to reduce parallel compute after tier 1 but does not employ grouped convolutions; tier 2 704A uses 32 channels to reduce parallel compute after tier 2. Tier 2 704A further employs grouped convolutions with a grouping factor to reduce compute. In some embodiments, tier 2 704A employs a grouping factor of 2 (two) to reduce compute. In some embodiments, tier 3 706A uses 64 channels to reduce parallel compute and also uses grouped convolutions with a grouping factor to reduce compute. In one embodiment, tier 3 706A uses a grouping factor of eight (8) to reduce compute.

The context path 752A receives the input 716A and performs a 4× down-sampling (708A). The output of the 4× down-sampling (708A) is forwarded to an 8× down-sampling (710A) followed by a 12× down-sampling (712A). The output of the 16× down-sampling layer 712A is provided to a 32× down-sampling (714A) as well as to an attention refinement layer (720A). The output of the 32× down-sampling layer (714A) is also provided to another attention refinement layer (720A) that is described above and illustrated in FIG. 6H. The outputs of these two attention refinement layers (720A) are joined and provided to a feature fusion layer (716A) as described above and illustrated in FIG. 6I; and the feature fusion layer 716A generates the output 718A.

Figure 7B:
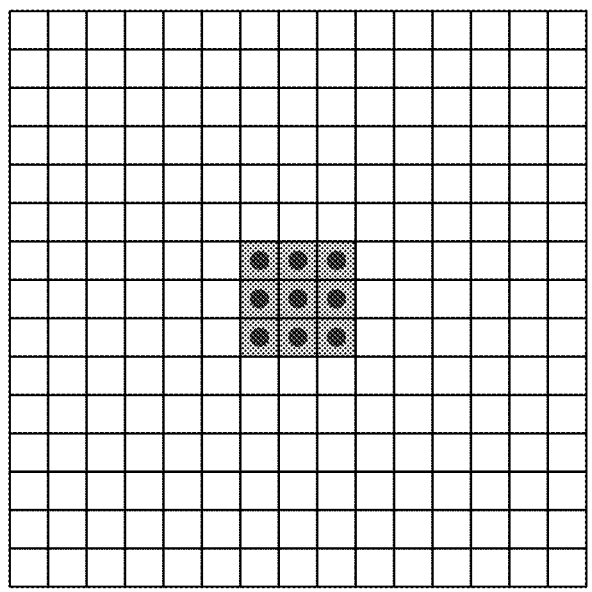
FIG. 7B illustrates a simplified example of a one (1)-dilated convolution having a 3×3 receptive field in some embodiments.

FIG. 7B illustrates a simplified example of a one (1)-dilated convolution having a 3×3 receptive field in some embodiments. More particularly, FIG. 7B illustrates that dilation supports exponential expansion of the receptive field without loss of resolution or coverage. Each element (the circular dots) in FIG. 7B has a receptive field of 3×3, and the number of parameters associated with each layer is identical with a one-dilated convolution.

Figure 7C:
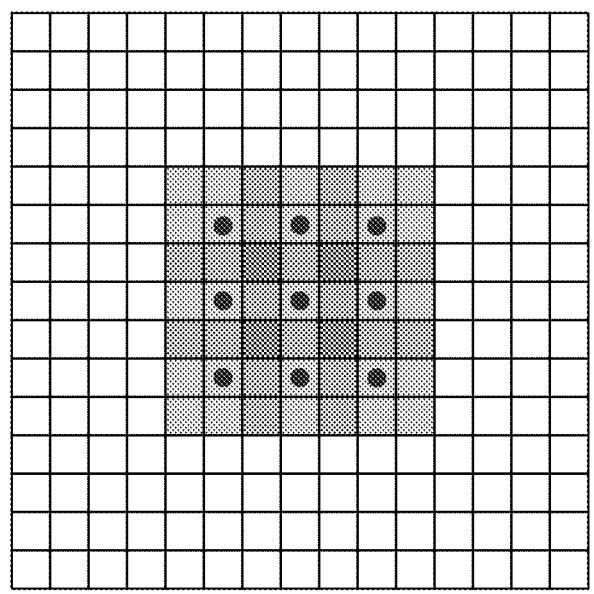
FIG. 7C illustrates a simplified example of a two (2)-dilated convolution produced from the one-dilated convolution in FIG. 7B and having a 7×7 receptive field in some embodiments.
Figure 7D:
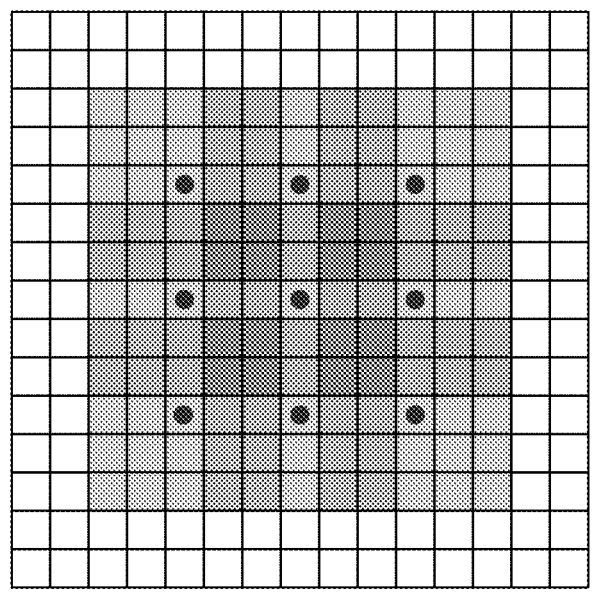
FIG. 7D illustrates a simplified example of a three (3)-dilated convolution produced from the two-dilated convolution in FIG. 7C and having a 11×11 receptive field in some embodiments.
Figure 7E:
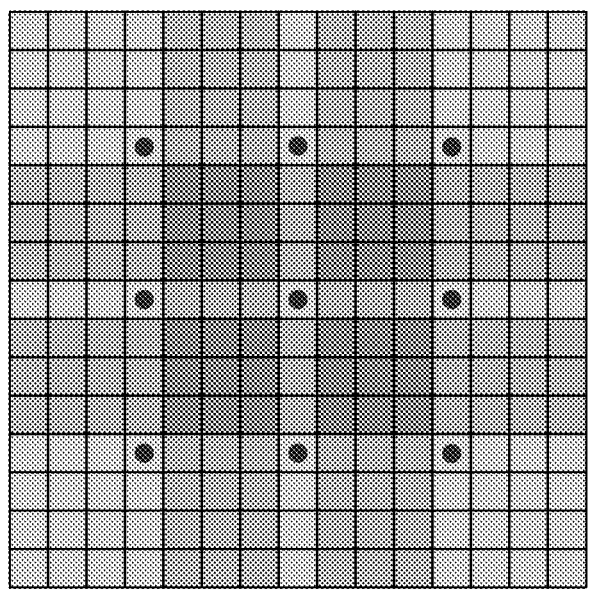
FIG. 7E illustrates a simplified example of a four (4)-dilated convolution produced from the two-dilated convolution in FIG. 7D and having a 15×15 receptive field in some embodiments.

FIG. 7C illustrates a simplified example of a two (2)-dilated convolution produced from the one-dilated convolution in FIG. 7B and having a 7×7 receptive field due to the two-dilated convolution in some embodiments. FIG. 7D illustrates a simplified example of a three (3)-dilated convolution produced from the two-dilated convolution in FIG. 7C and having a 11×11 receptive field due to the three-dilated convolution in some embodiments. FIG. 7E illustrates a simplified example of a four (4)-dilated convolution produced from the two-dilated convolution in FIG. 7D and having a 15×15 receptive field due to the four-dilated convolution in some embodiments. As it can be seen from FIGS. 7B-7E, the receptive field is a square of exponentially increasing size. That is, the respective field of each element is $(2^{i+1}-1)^2$, where i=1, 2, 3, . . . , n, and i indicates the dilation factor.

Figure 8A:
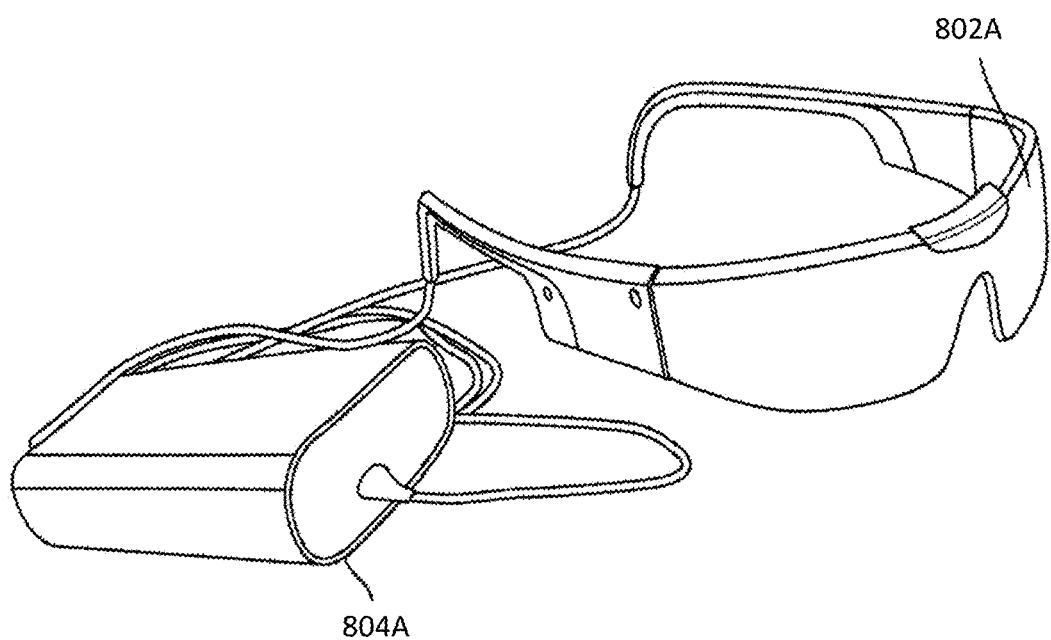
FIG. 8A illustrates a simplified example of a wearable XR device with a belt pack external to the XR glasses in some embodiments.

FIG. 8A illustrates a simplified example of a wearable XR device with a belt pack external to the XR glasses in some embodiments. More specifically, FIG. 8A illustrates a simplified example of a user-wearable VR/AR/MR/XR system that includes an optical sub-system 802A and a processing sub-system 804A and may include multiple instances of personal augmented reality systems, for example a respective personal augmented reality system for a user. Any of the neural networks described herein may be embedded in whole or in part in or on the wearable XR device. For example, some or all of a neural network described herein as well as other peripherals (e.g., ToF sensors) may be embedded on the processing sub-system 804A alone, the optical sub-system 802A alone, or distributed between the processing sub-system 804A and the optical sub-system 802A.

Some embodiments of the VR/AR/MR/XR system may comprise optical sub-system 802A that deliver virtual content to the user's eyes as well as processing sub-system 804A that perform a multitude of processing tasks to present the relevant virtual content to a user. The processing sub-system 804A may, for example, take the form of the belt pack, which can be convenience coupled to a belt or belt line of pants during use. Alternatively, the processing sub-system 804A may, for example, take the form of a personal digital assistant or smartphone type device.

The processing sub-system 804A may include one or more processors, for example, one or more micro-controllers, microprocessors, graphical processing units, digital signal processors, application specific integrated circuits (ASICs), programmable gate arrays, programmable logic circuits, or other circuits either embodying logic or capable of executing logic embodied in instructions encoded in software or firmware. The computation component 804A may include one or more non-transitory computer—or processor-readable media, for example volatile and/or nonvolatile memory, for instance read only memory (ROM), random access memory (RAM), static RAM, dynamic RAM, Flash memory, EEPROM, etc.

The processing sub-system 804A may be communicatively coupled to the head worn component. For example, the processing sub-system 804A may be communicatively tethered to the head worn component via one or more wires or optical fibers via a cable with appropriate connectors. The processing sub-system 802A and the optical sub-system 804A may communicate according to any of a variety of tethered protocols, for example UBS®, USB2®, USB3®, Ethernet®, Thunderbolt®, Lightning® protocols.

Alternatively or additionally, the processing sub-system 804A may be wirelessly communicatively coupled to the head worn component. For example, the processing sub-system 804A and the optical sub-system 802A may each include a transmitter, receiver or transceiver (collectively radio) and associated antenna to establish wireless communications there between. The radio and antenna(s) may take a variety of forms. For example, the radio may be capable of short-range communications, and may employ a communications protocol such as BLUETOOTH®, WI-FI®, or some IEEE 802.11 compliant protocol (e.g., IEEE 802.11n, IEEE 802.11a/c). Various other details of the processing sub-system 102 and the optical sub-system 100 are described in U.S. patent application Ser. No. 14/707,000 filed on May 8, 2015 and entitled "EYE TRACKING SYSTEMS AND METHOD FOR AUGMENTED OR VIRTUAL REALITY", the content of which is hereby expressly incorporated by reference in its entirety for all purposes.

Figure 8B:
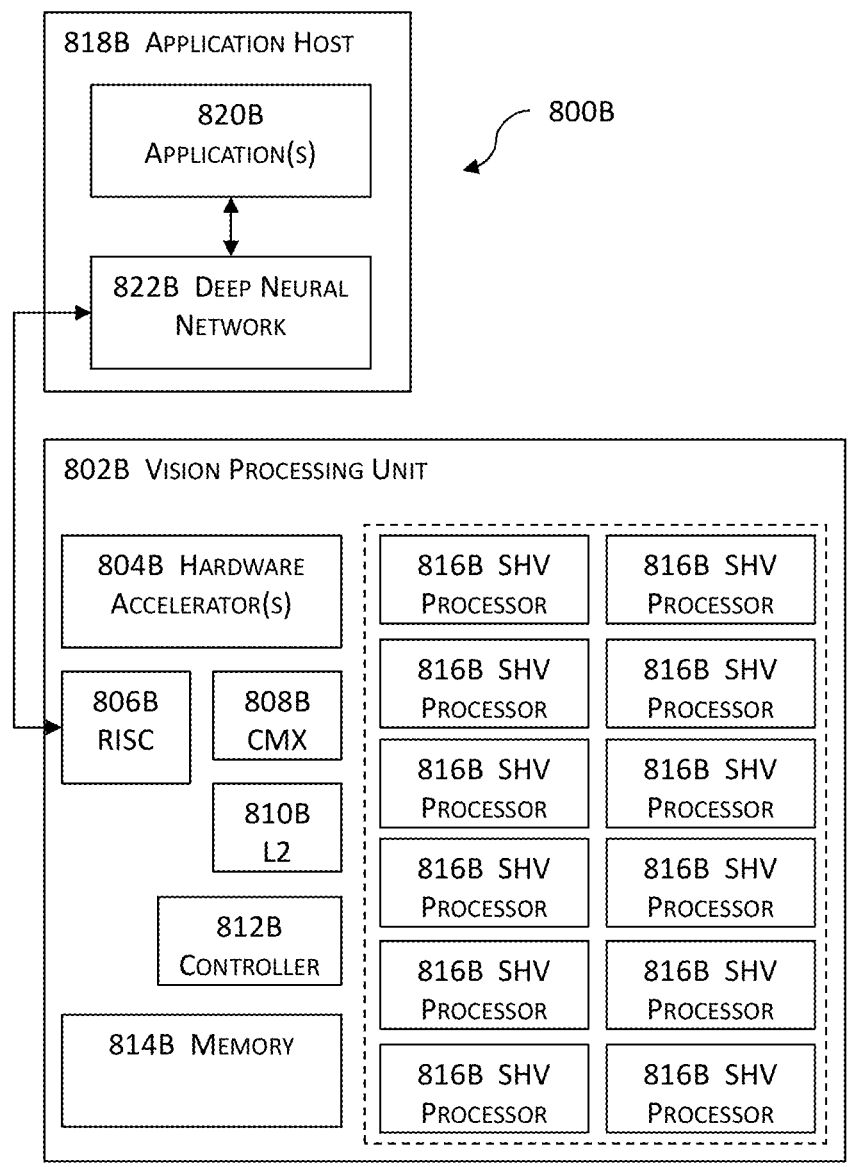
FIG. 8B illustrates a simplified example of an embedded implementation of a neural network on the wearable XR device with a belt pack illustrated in FIG. 8A in some embodiments.

FIG. 8B illustrates a simplified example of an embedded implementation of a neural network on the wearable XR device with a belt pack illustrated in FIG. 8A in some embodiments. As described above, any of the neural network may be embedded in whole or in part on a hardware system (e.g., a wearable electronic system) to facilitate expedient inference for computer vision and will referred to as an embedded implementation in this disclosure. In these embodiments illustrated in FIG. 8B, an embedded implementation may include, for example, an application host 818B that includes one or more applications 820B (e.g., a 3D browser, a VR/AR/MR/XR game, a virtual television, a virtual media player, a productivity application, etc.) and a neural network 822B that may be any of the neural network described in this disclosure.

The embedded implementation may further include a vision processing unit (VPU) 802B. A VPU may include various components and is a microprocessor that is devised to accelerate machine vision or computer vision tasks. These various components of a VPU 802B may include, for example, a hardware accelerator 804B that serves the function of an artificial intelligence (AI) accelerator. A hardware accelerator 804B may be a computer system in some embodiments in and of itself or a specialized hardware accelerator in some other embodiments and is designed to accelerate artificial intelligence applications such as neural networks, machine vision, machine learning, or any other sensor-driven or data-intensive tasks, etc.

The hardware accelerator 804B may be operatively coupled to various other components such as one or more RISC (reduced instruction set computer) processors 806B, level-2 (L2) cache 810B, memory 814B (e.g., LPDDR3 or Low-Power Double Data Rate Synchronous Dynamic Random Access Memory-3), and memory controller 812B (e.g., a DDR or double data rate memory controller). The vision processing unit 802B includes a plurality of super high vision (SHV) processors 816B (12 illustrated in FIG. 8B). A super high vision processor 812B may include a VLIW (very long instruction word) vector processor, where VLIW refers to an instruction set architecture that is designed to exploit instruction level parallelism (ILP). A vision processing unit 802B is thus distinguishable from a central processing unit (CPU) where a central processing unit mostly allows programs to specify instructions to execute in sequence only, but a VLIW processor allows programs to explicitly specify instructions to execute in parallel. The plurality of SHVs are operatively coupled to a connection matrix (CMX) 808B that enables seamless interactions between the SHVs and the other hardware components.

It shall be noted that Vision processing units are distinct from video processing units (which are specialized for video encoding and decoding) in their suitability for running machine vision algorithms such as CNN (convolutional neural networks), SIFT (Scale-invariant feature transform) and similar. A VPU may include direct interfaces to take data from cameras (bypassing any off-chip buffers), and have a greater emphasis on on-chip dataflow between many parallel execution units with scratchpad memory, like a manycore DSP. But, like video processing units, they may have a focus on low precision fixed point arithmetic for image processing. A VPU is also distinct from GPUs (graphic processing units), which include specialized hardware for rasterization and texture mapping (for 3D graphics), and whose memory architecture is optimized for manipulating bitmap images in off-chip memory (reading textures, and modifying frame buffers, with random access patterns).

Figure 8C:
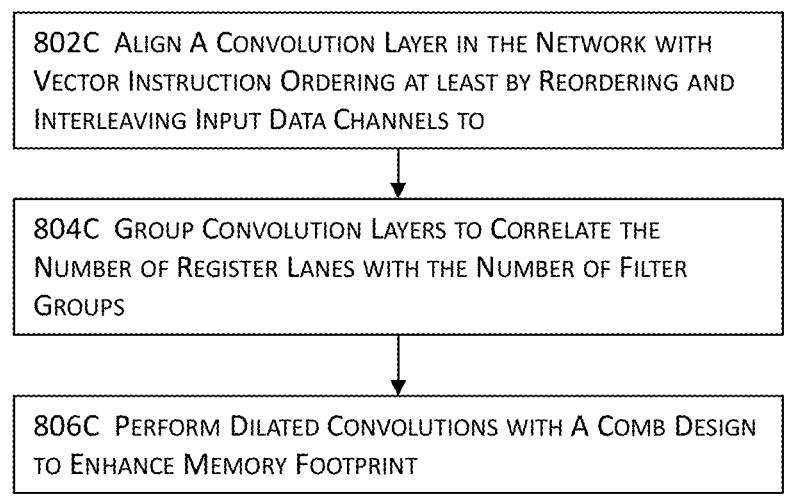
FIG. 8C illustrates a high-level example block diagram of some operations of the embedded implementation illustrated in FIG. 8B in some embodiments.

FIG. 8C illustrates a high-level example block diagram of some operations of the embedded implementation illustrated in FIG. 8B in some embodiments. In these embodiments illustrated in FIG. 8B, input data channels may be reordered and interleaved to align convolution layer in a neural network described herein with the vector instruction ordering at 802C. Furthermore, convolution layers may be grouped at 804C to correlate the number of register lanes with the number of filter groups. For example, convolution layers may be grouped in such a way that the number of filters per group is a multiple (e.g., 1×, 2×, etc.) of register lanes to increase or even maximize vector register utilization.

With the grouped convolution layers, dilated convolutions at one or more dilation factors (e.g., 1, 2, 3, 4, etc.) may be performed at 806C with a comb design to enhance memory footprint. For example, convolutions with a dilation factor of two (2) may be split into four independent field-wise computations (e.g., even rows-even columns, even rows-odd columns, odd rows-even columns, and odd rows-odd columns). These four independent field-wise computations may be executed independently from each other or in parallel, and their respective outputs may be recombined.

Figure 9A:
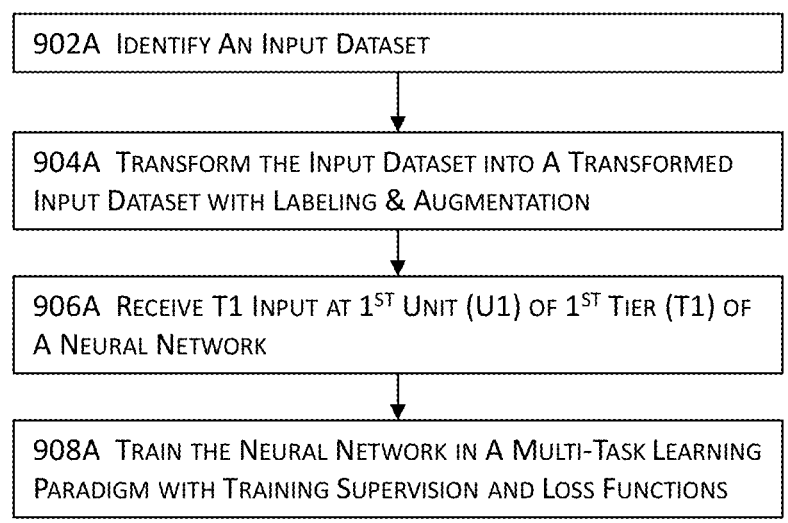
FIG. 9A illustrates a high-level example block diagram of some example operations in a neural network having three example tiers in some embodiments.

FIG. 9A illustrates a high-level example block diagram of some example operations in a neural network having three example tiers in some embodiments. More particularly, FIG. 9A illustrates a simplified, high-level example block diagram for semantic segmentation with three tiers of blocks and multi-task deep learning of a neural network. In some embodiments, an input dataset may be identified at 902A. In some embodiments, one or more ground-truth images may also be identified at 902A. A ground-truth image includes a histogram equalized version of phase image or depth image and may also be labeled with a set of keypoints. The input dataset may be transformed into a transformed input dataset at 904A at least by labeling and/or augmentation.

In some embodiments, an input dataset identified at 902A may include one or more images, and the one or more images may include, for example, a phase image, a depth image, an RGB image, a grayscale image, an amplitude image, or any combination thereof. As described above, an amplitude image may include a combination (e.g., a linear combination) of multiple phase images. In some embodiments where the input dataset includes a phase image, the phase image may be captured by, for example one or more time-of-flight (ToF) sensors. In some embodiments, transforming the input dataset at 904A may include translating or transforming a phase image into a depth image using post-processing and/or labeling the input dataset.

One of the reasons for labeling an input dataset is to train the neural network and/or to supervise the training with labeled data in some embodiments although it shall be noted that some other embodiments may also employ self-supervised training heads on unlabeled datasets. Moreover, semantic segmentation of an image generally involves labeling each pixel in an image with its corresponding class. Unlike conventional approaches that employ convolutions followed by de-convolutions, some embodiments thus label keypoints and apply dilated convolutions to maintain high output resolutions and to ensure that the output from the neural network is of the same size as the input, while avoiding the need for up-sampling. The de-convolutions in those conventional approaches introduce more parameters and hence increase the memory footprint and compute and are thus unfit for embedded implementations on wearable devices. Moreover, these embodiments employ dilated convolutions because dilated convolution is a way of increasing receptive field of the network exponentially with linear parameter accretion and thus provide a wider context with less cost.

Labeling the input dataset at 904A may include, for example, labeling an image, labeling a set of keypoints in an image, and/or labeling an auxiliary task. Keypoints may be labeled as primary keypoints for a neural network to predict or auxiliary keypoints that serve as training supervision. As the example illustrated in FIG. 1, a hand image may be labeled with 17 keypoints that include a set of primary keypoints for a neural network to predict and a set of auxiliary keypoints that is used for training supervision. In some embodiments, the set of primary keypoints include eight (8) keypoints, and the set of auxiliary keypoints contains the remaining nine (9) keypoints.

It shall be noted that other configurations of primary keypoints (e.g., for a neural network to predict) and auxiliary keypoints (e.g., for training) may also be used. For example, the number of primary keypoints may be eight (8), fifteen (15), or any other number that may be determined based on one or more criteria (e.g., compute cost, accuracy requirements, complexity of poses to be determined, etc.) or a balance of multiple criteria (e.g., the aforementioned criteria). The number of auxiliary keypoints employed may be determined based at least in part upon, for example, how many keypoints are labeled per hand and how many keypoints are predicted by the neural network. This determination may also be based at least in part upon, one or more criteria or a balance of multiple criterial described immediately above. In some embodiments, a neural network provides a configuration interface that may be used to adjust the number of primary keypoints per hand, the number of auxiliary keypoints per hand, and/or the number of total keypoints (primary keypoints plus auxiliary keypoints) per hand.

It shall be noted that other numbers of keypoints per hand may also be used, and that using more keypoints per hand increases accuracy and/or enables more complex hand poses although at the expense of more computing resource consumption. A keypoint may thus be labeled with a primary label (for a primary keypoint) or an auxiliary label (for an auxiliary keypoint). In some embodiments, the set of primary keypoints and other information or data pertaining thereto may be included in the embedded implementation, while the set of auxiliary keypoints is used to supervise training of the underlying neural network but is not included or deployed in the embedded training. In some embodiments, predicting the set of primary keypoints with a neural network employs grouped convolutions as described herein. In these embodiments, the auxiliary keypoints do not employ convolution grouping to avoid issues such as floating keypoints, or keypoints jumping off a hand, etc. and to regularize the feature tensor after the encoder (see, e.g., FIG. 6G).

An image may also be labeled with one of a number of keypose classes. In some embodiments where the neural network is used to predict hand-poses, and thus the input image constitutes an image of one or both hands, the input image may be labeled with one of a number of keypose classes. These keypose classes may include, for example, "OK," "open-hand," "pinch," "C-pose," "fist," "L-pose," "point," "thumbs-up," and "dummy". The "dummy" class captures all the other keyposes and may be stored for subsequent relabeling with the addition of one or more new keyposes. In addition or in the alternative, some embodiments label eight (8) categorical hand orientations that may arise from supination (rotation of the forearm and hand so that the palm faces forward or upward) or pronation (rotation of the hand and forearm so that the palm faces backwards or downwards) of the hand. These eight categories may be approximate, and the labels may thus be softened by using, for example, cross-entropy loss to train these tasks for hand-pose prediction.

In some embodiments, the input dataset may be transformed by augmentation. Augmentation may include, for example, compositing an image of a left hand with another image of a right hand so that the composite image appears to be a two-handed gesture or operation. Augmentation may also include compositing multiple images having more than one background image that includes a distractor object to expand training dataset in order to generalize handpose estimation or prediction to multiple different environments. The transformed input dataset may then be used to train a neural network in a multi-task learning paradigm with training supervision and a plurality of loss functions at 908A. More details about training a neural network will be described below.

Figure 9B:
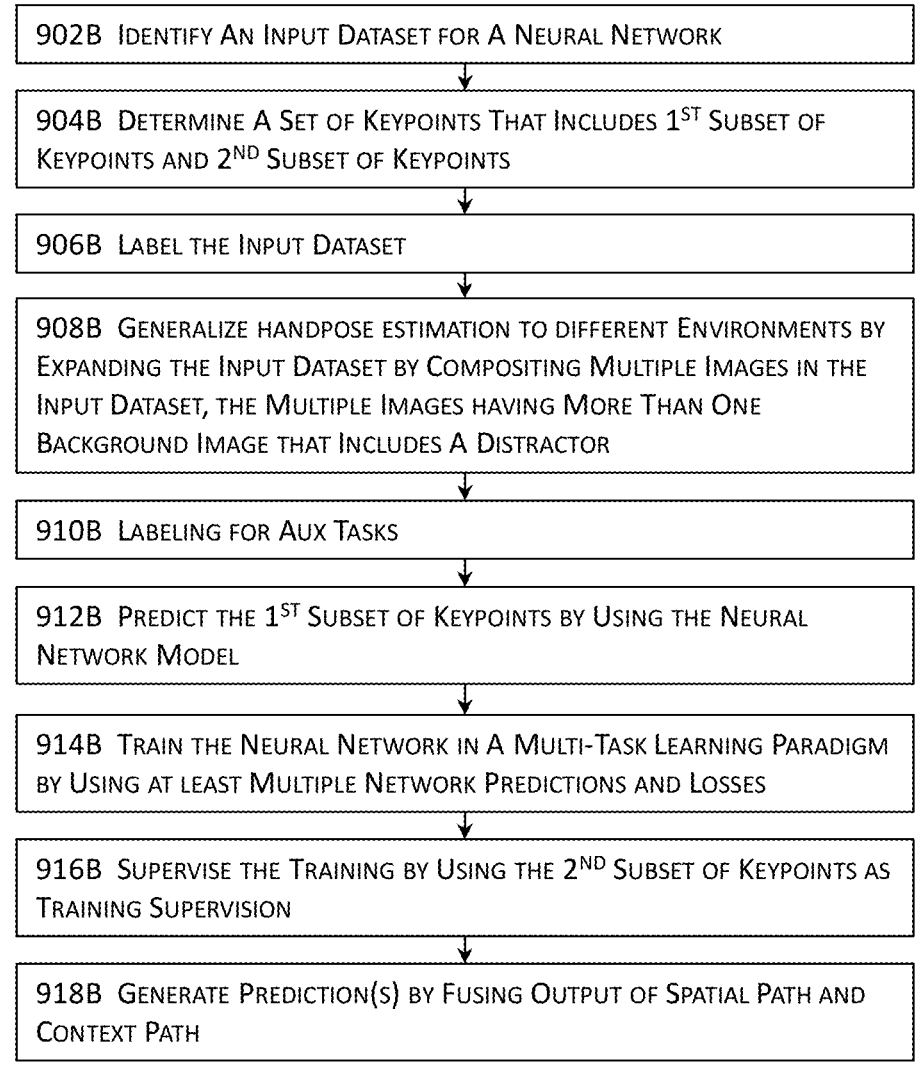
FIG. 9B illustrates a high-level example block diagram of multi-task deep learning in a neural network in some embodiments.

FIG. 9B illustrates a high-level example block diagram of multi-task deep learning in a neural network in some embodiments. More particularly, FIG. 9B illustrates a block diagram for hand-pose tracking and prediction with a neural network. In these embodiments, an input dataset may be identified at 902B in a substantially similarly manner as that described with reference to reference numerals 902A above.

A set of keypoints may be determined at 904B. The set of keypoints may include a first subset of keypoints and a second subset of keypoints in some embodiments where the first subset of keypoints represents the keypoints to be predicted by a neural network, and the second subset of keypoints represents the keypoints that are used as training supervision for the neural network.

The input dataset determined at 902B may be labeled with one or more keypose classes at 906B in an identical or substantially similar manner as that described with reference to reference numeral 904A above. In some embodiments, the one or more keypose classes may include, for example, "OK," "open-hand," "pinch," "C-pose," "fist," "L-pose," "point," "thumbs-up," and "dummy". The "dummy" class captures all the other keyposes and may be stored for subsequent relabeling with the addition of one or more new keyposes.

With the input dataset labeled at 906B, hand-pose or keypose (which is used interchangeably with hand-pose) estimation or prediction may be generalized at 908B to different environments at least by expanding the input dataset. The input dataset may be expanded by, for example, compositing multiple images having at least one distractor object in more than one background image in the input dataset into one or more composited, additional images. One or more auxiliary tasks may be labeled at 910B. Some examples of auxiliary tasks include a discrete hand-pose training task, a categorical orientation training task, an auxiliary encoder layer training task, a visibility decoder layer training, an auxiliary keypoint decoder training task, etc. In some embodiments, labeling one or more auxiliary tasks may be a byproduct of one or more other processes such as keypoint labeling described above.

The neural network may then predict a keypoint in the first subset of keypoints at 912B. The neural network may be trained at 914B in a multi-task learning paradigm by using at least multiple network predictions generated at 912B and losses. More details about training a neural network will be described below. In addition or in the alternative, the training may be supervised at 916B by using the second subset of keypoints as training supervision in some embodiments. With the neural network trained, the neural network may be used to generate predictions at 918A for hand-poses captured by, for example, an image capturing device (e.g., a camera, a ToF sensor, etc.) at least by fusing output of a spatial path and a context path. More details about spatial path and context path are described below with reference to FIGS. 10A-10B.

Figure 9C:
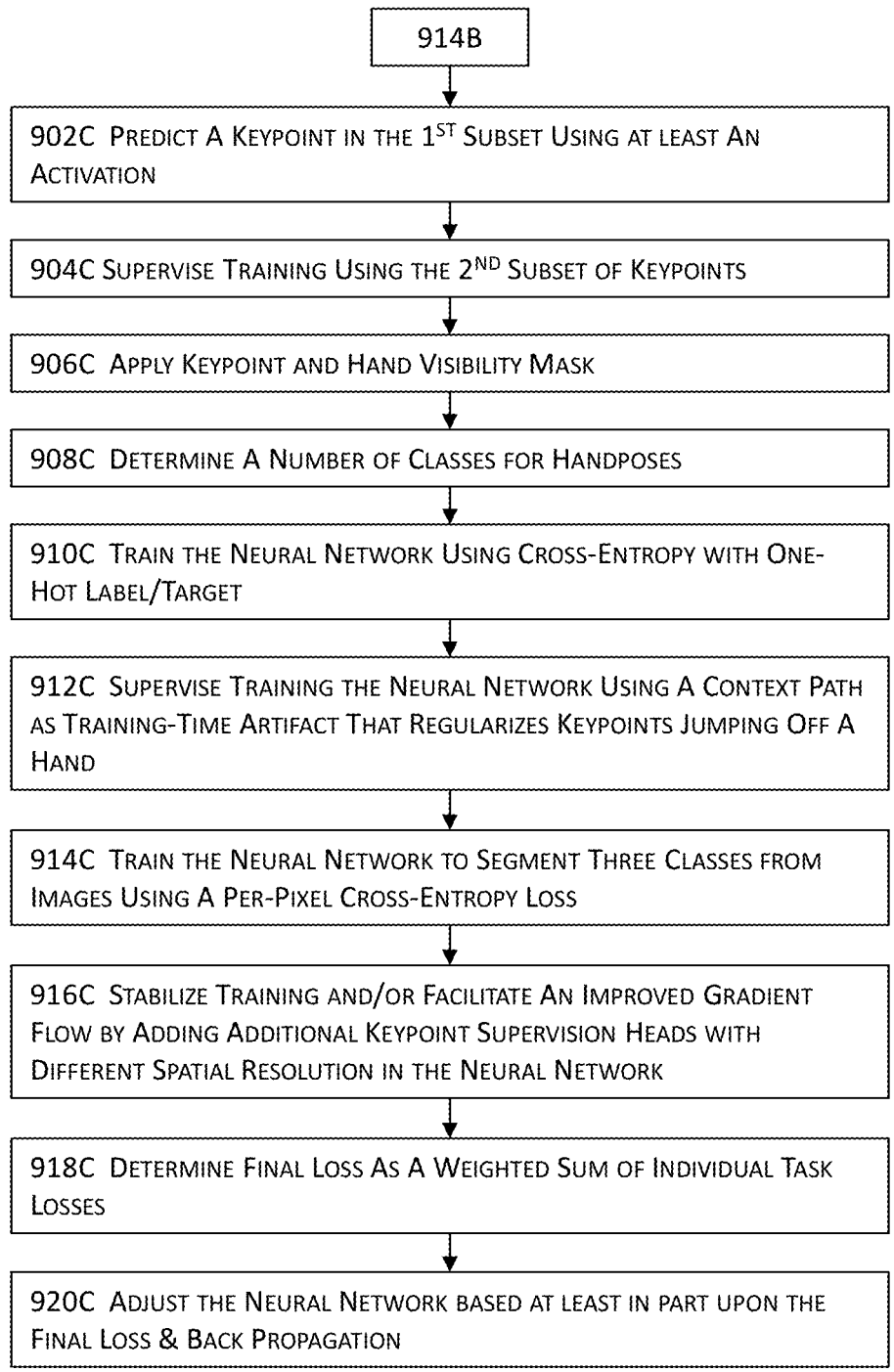
FIG. 9C illustrates more details about a portion of the high-level example block diagram of multi-task deep learning in a neural network illustrated in FIG. 9B in some embodiments.

FIG. 9C illustrates more details about a portion of the high-level example block diagram of multi-task deep learning in a neural network illustrated in FIG. 9B in some embodiments. More particularly, FIG. 9C illustrates more details about training a neural network at 914B of FIG. 9B. In some embodiments, the neural network may generate, at 902C, a prediction for a keypoint in the first subset of keypoints using at least a loss function and backpropagation. In some embodiments, a cross-entropy loss with one-hot label or target may be used as the loss function at 902C while other embodiments may use other loss function such as a mean squared loss (MSE) function layer, etc.

A cross-entropy with one-hot encoding implies that the target vector is all zero (0), except for one (1). As a result, all of the zero entries are ignored, and only the entry with one (1) is used for updates. Therefore, only the predicted probability associated with the label influences the value of the loss with a cross-entropy function with one-hot label. A cross-entropy function works because the neural network prediction comprises a probability vector over mutually-exclusive outcomes in some embodiments. Therefore, the prediction vector has non-negative elements, and these elements sum to 1. In other words, making one part of the prediction vector larger results in shrinking the sum of the remaining components by the same amount. Furthermore, for the case of one-hot labels, a softmax function may be used. Moreover, softmax has asymptotes at 0 and 1 so singularities may not occur. On the other hand, overflow may occasionally result in log(1) or log(0) as a matter of floating point arithmetic. Nonetheless, such overflows may be avoided by rearranging the equations and working on a different scale, such as logits which comprises the logarithm of the odds, p/(1−p) where p is the probability.

Some embodiments supervise the training at 904C using the second subset of keypoints identified at 904B. In some embodiments, the first subset of keypoints (the subset of primary keypoints) but not the second subset of keypoints (the subset of auxiliary keypoints) is in the final, deployed model of the neural network. In these embodiments, the computing device having the neural network may have a trained neural network embedded but not the portion of the neural network pertaining to or responsible for training the neural network to further conserve computing and/or storage resource utilization. In addition or in the alternative, the decoder portion for the second subset of keypoints does not group convolutions to avoid floating keypoints and to regularize the feature tensors after the encoder.

In some embodiments, a visibility mask may be applied at 906C to stabilize the training process, to suppress occluded keypoint(s) and invisible hands during inference, and/or to enable an early output during inference to reduce latency. For example, some embodiments may apply a keypoint and hand visibility mask to stabilize the training process, to suppress occluded keypoint(s) and invisible hands during inference, and/or to enable an early output during inference to reduce latency. In some embodiments, the neural network is trained by using labeled dataset(s), and these embodiments only label visible keypoints and hands in images. As a result, these embodiments employing a hand and keypoint visibility mask may enable early or earlier output to further reduce latency during inference time.

A number of classes for handposes may be determined at 908C. The number of handpose classes may be classified from input images anew or identified from an existing classification result. Some examples of handpose classes may include "OK," "open-hand," "pinch," "C-pose," "fist," "L-pose," "point," "thumbs-up," and "dummy". The "dummy" class captures all the other keyposes and may be stored for subsequent relabeling with the addition of one or more new keyposes.

The neural network may be trained at 910C using the prediction and the loss determined at 902C. In order to use gradient descent with backpropagation of losses to train neural networks, an activation function is needed that appears and acts like a linear function, but is, in fact, a nonlinear function allowing complex relationships in the data to be learned. As described above, some embodiments use a rectified linear unit as the activation function layer to enable the use of cross-entropy loss and backpropagation to train the neural network.

Moreover, one or more individual types of losses may also be determined for the predictions generated by the neural network. These individual types of losses may include, for example, a segmentation loss, a cross-entropy loss, an auxiliary keypoint loss, a deeply supervised keypoint loss, a keypose classification loss, a categorical orientation loss, etc. A segmentation loss corresponds to an auxiliary encoder layer (e.g., 636G) and represents the losses that pertain to the auxiliary encoder layer in whole or in part. A cross-entropy loss or a binary cross-entropy loss pertains to a visibility decoder (e.g., 640G) and represents the losses that pertain to the visibility layer in whole or in part. An auxiliary keypoint loss pertains to an auxiliary keypoint decoder (e.g., 638G) and represents the losses that pertain to the auxiliary keypoint layer in whole or in part. A deeply supervised loss pertains to a primary encoder layers (e.g., 602G, 604G, and 606G) and/or convolutions (e.g., 616G) and represents the losses that pertain to these layers in whole or in part. A keypose classification loss pertains to a keypose decoder layer (e.g., 642G) and represents the losses that pertain to the keypose decoder layer in whole or in part. A categorical orientation loss pertains to a categorical orientation layer (e.g., 644G) and represents the losses that pertain to the categorical orientation layer in whole or in part.

Some embodiments further supervise the training of the neural network at 912C by using a context path as training-time artifact that regularizes keypoints that may otherwise jump off a hand. More details about the context path are described elsewhere such as FIGS. 7A and 10A-10B in this disclosure. In addition, the neural network under training may be further trained at 914C to segment a number of classes from the input dataset. In some embodiments, the number of classes includes, for example, a background class, a right-hand class, and a left-hand class. In addition, the number of classes may include a two-handed class in some of these embodiments.

One or more additional keypoint supervision heads or branches having different spatial resolutions may be added at 916C to the neural network. In an example of a three-tier neural network as described above with reference to, for example, FIGS. 3, 4, 5A-5F, and 6G, the output of tier 3 has ⅛ of the full resolution of an input image. A first additional keypoint supervision head may be added to up-sample the output of tier 3 to ¼ of the full resolution; a second additional keypoint supervision head may be added to up-sample the output of the first keypoint supervision head to ½ of the full resolution; etc. Adding one or more keypoint supervision head may stabilize the training of the neural network, facilitate an improved gradient flow for training to address possible vanishing gradient issues.

Some embodiments determine whether to add one or more keypoint supervision branches by first performing a set of iterations of backpropagation for the neural network with supervision only at the final layer of the neural network and plot the gradient values (e.g., mean gradient values) of intermediate layers. These embodiments may then add supervision head or branch after the layer where the mean gradient value vanishes or drops below a threshold gradient and repeat this process to reduce or eliminate gradient vanishing problems that may slow down the training process for the neural network.

At 918C, a final loss may be determined. In some embodiments, the final loss may be determined based at least in part upon one or more of the individual losses described above with reference to reference numeral 910C. In some embodiments, the final loss or the cumulative loss may be determined to be a weighted sum of a plurality of the aforementioned individual losses. In some embodiments, the respective weight for the loss of fingertip prediction may be doubled based at least in part upon the observation that fingertips are more difficult to detect when compared to other keypoints. The neural network may be adjusted at 920C based at least in part upon the final loss determined at 918C. In some embodiments, the neural network is trained by backpropagation with a gradient descent (e.g., stochastic gradient descent or SGD) to produce more accurate results.

Figure 9D:
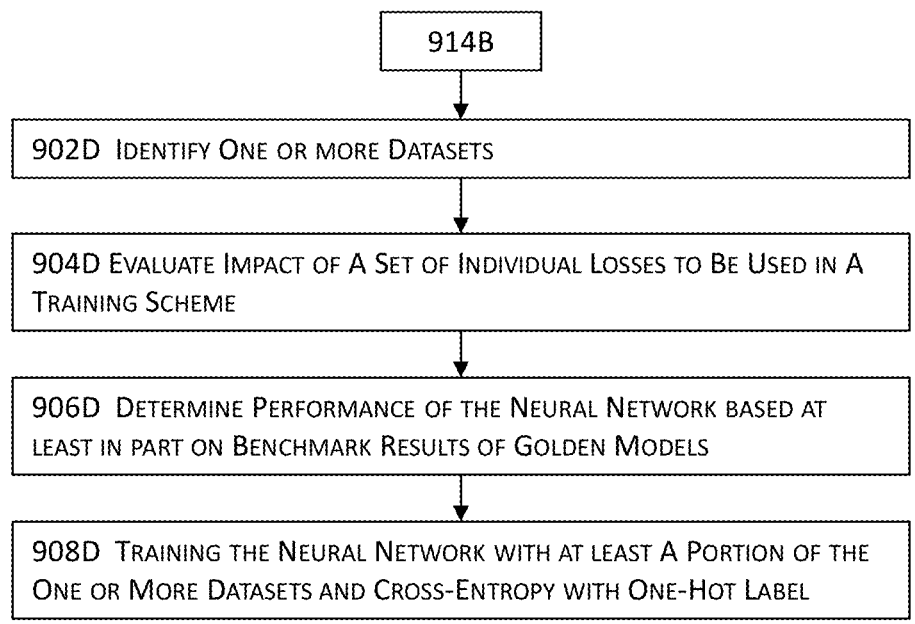
FIG. 9D illustrates more details about a portion of the high-level example block diagram of multi-task deep learning in a neural network illustrated in FIG. 9B in some embodiments.

FIG. 9D illustrates more details about a portion of the high-level example block diagram of multi-task deep learning in a neural network illustrated in FIG. 9B in some embodiments. In these embodiments, one or more input datasets may be identified at 902D. In some embodiments, these one or more input datasets include at least one amplitude image which is a combination (e.g., a linear combination) of multiple phase images. At 904D, the respective impact of a set of individual losses may be evaluated in a training scheme.

As described above, the set of individual losses may include, for example, a segmentation loss, a cross-entropy loss, an auxiliary keypoint loss, a deeply supervised keypoint loss, a keypose classification loss, a categorical orientation loss, etc. A segmentation loss corresponds to an auxiliary encoder layer (e.g., 636G) and represents the losses that pertain to the auxiliary encoder layer in whole or in part. A cross-entropy loss or a binary cross-entropy loss pertains to a visibility decoder (e.g., 640G) and represents the losses that pertain to the visibility layer in whole or in part. An auxiliary keypoint loss pertains to an auxiliary keypoint decoder (e.g., 638G) and represents the losses that pertain to the auxiliary keypoint layer in whole or in part. A deeply supervised loss pertains to a primary encoder layers (e.g., 602G, 604G, and 606G) and/or convolutions (e.g., 616G) and represents the losses that pertain to these layers in whole or in part. A keypose classification loss pertains to a keypose decoder layer (e.g., 642G) and represents the losses that pertain to the keypose decoder layer in whole or in part. A categorical orientation loss pertains to a categorical orientation layer (e.g., 644G) and represents the losses that pertain to the categorical orientation layer in whole or in part. More details about evaluating the respective impact of the set of individual losses will be described below with reference to FIG. 9E.

The performance of the neural network may be determined at 906D based at least in part upon benchmark results of state-of-the-art neural networks or inference models. In some embodiments, the performance of a neural network may be determined based at least in part upon, for example, the total number of parameters in the neural network, the total number of floating point operations for a single frame of image, the 2D keypoint error for the neural network, any other metrics, or any combinations thereof by comparing the neural network with those state-of-the-art neural networks or inference models. At 908D, the neural network may be trained at 908D with at least a portion of the one or more datasets and a loss function such as a cross-entropy function with one-hot label or target described above.

Figure 9E:
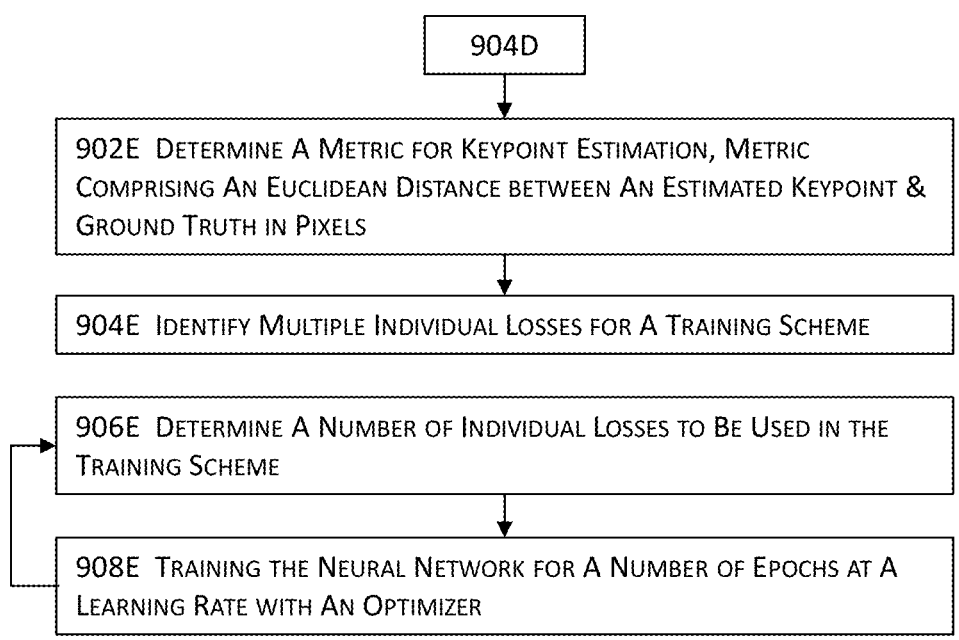
FIG. 9E illustrates more details about a portion of the high-level example block diagram of multi-task deep learning in a neural network illustrated in FIG. 9D in some embodiments.

FIG. 9E illustrates more details about a portion of the high-level example block diagram of multi-task deep learning in a neural network illustrated in FIG. 9D in some embodiments. More specifically, FIG. 9E illustrates more details about evaluating the respective impact of a set of individual losses of FIG. 9D. In these embodiments, a metric for keypoint estimation may be determined at 902E. In some of these embodiments, the metric comprises a Euclidean distance between an estimated keypoint and a ground truth expressed in pixels.

Multiple individual types of losses may be identified or determined at 904E for a training scheme. A number of individual types of losses may be determined at 906E to be used in the training scheme. The individual types of losses include, for example, a segmentation loss, a cross-entropy loss, an auxiliary keypoint loss, a deeply supervised keypoint loss, a keypose classification loss, a categorical orientation loss, etc. An individual loss determined to be used in the training scheme will be fed back into the refinement of the neural network by backpropagation. In some embodiments, multiple candidate training schemes may be determined to correspond to respective sets of individual losses.

The neural network may be trained at 908E with the determined number of individual losses in a candidate training scheme for a number of epochs at a learning rate with an optimizer, and the resulting loss of the trained network is also determined to determine a final training scheme with the corresponding selected individual types of losses. In some embodiments, the neural network is trained for 20 epochs with a learning rate of 0.001 with the Adam optimizer.

In terms of artificial neural networks, an epoch refers to one cycle through the full training dataset. In some embodiments, training a neural network takes more than a few epochs. An epoch may often be mixed up with an iteration. An iteration is the number of batches or steps through partitioned packets of the training data, needed to complete one epoch. Heuristically, one motivation is that (especially for large but finite training sets) it gives the network a chance to see the previous data to readjust the model parameters so that the model is not biased towards the last few data points during training. With a neural network, one of the goals of neural network is generally to classify or generate material that is either right or wrong. Therefore, an epoch for an experimental agent performing many actions for a single task may vary from an epoch for an agent trying to perform a single action for many tasks of the same nature. In reinforcement learning terminology, this is more typically referred to as an episode.

Deep learning neural networks may be trained using a gradient descent algorithm (e.g., a stochastic gradient descent optimization algorithm). The learning rate is a hyperparameter that controls how much to change the neural network in response to the estimated error each time the neural network weights are updated. Choosing the learning rate may be challenging as a value too small may result in a long training process, whereas a value too large may result in learning a sub-optimal set of weights too fast or an unstable training process. The Adam optimization algorithm is an extension to stochastic gradient descent that has recently seen broader adoption for deep learning applications in computer vision and natural language processing.

The process may return to 906E to determine a different candidate training scheme with a different set of individual types of losses. The candidate training scheme with the corresponding set of individual types of losses having the best performance (e.g., best performance in terms of accuracy and/or speed) will be selected as the training scheme. In some embodiments, the selected training scheme encompasses all of the individual types of losses described above.

Figure 9F:
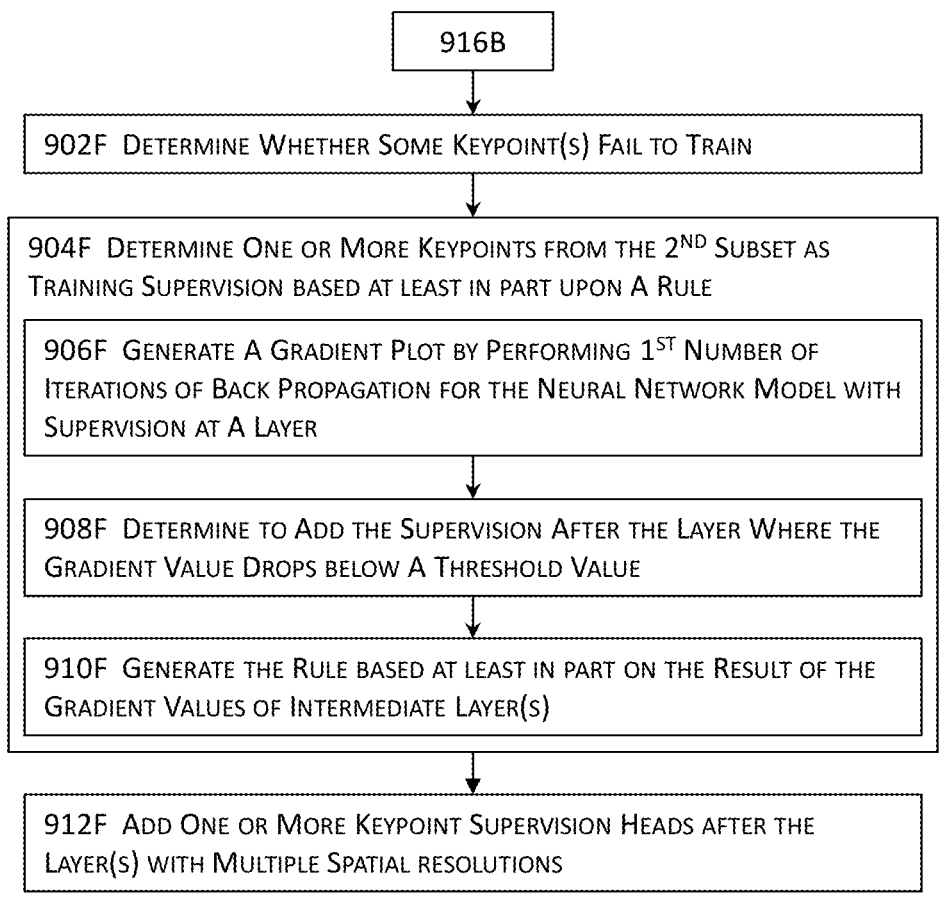
FIG. 9F illustrates more details about another portion of the high-level example block diagram of multi-task deep learning in a neural network illustrated in FIG. 9B in some embodiments.

FIG. 9F illustrates more details about another portion of the high-level example block diagram of multi-task deep learning in a neural network illustrated in FIG. 9B in some embodiments. More particularly, FIG. 9F illustrates more details about 916B of FIG. 9B. In these embodiments, a determination may be made at 920F to decide whether one or more keypoints fail to train. As described above, some embodiments use grouped convolutions. In some cases where a decoder layer uses grouped convolutions, some keypoints may fail to train due to the grouped structure of the decoder layer. If it is determined at 902F that one or more keypoints have failed to train, one or more keypoint supervision heads or branches from the second subset of keypoints determined at 904B may be determined at 904F as one or more training supervision head or branch based at least in part upon one or more rules.

This process of adding one or more keypoints as training supervision at 904F may include generating a gradient plot (e.g., a mean gradient plot) at 906F at least by executing a small number of iterations of backpropagation for the neural network with supervision at a layer. In some embodiments, the supervision is located at the final layer of the neural network. Because training the neural network may involve the use of backpropagation with a gradient descent technique, this gradient plot of intermediate layers may be used to identify any potential gradient vanishing issues where the gradient vanishes or falls below a threshold gradient value.

A supervision head or branch may be added at 908F after a layer (e.g., an intermediate layer that originally corresponds to training supervision) where the gradient drops below a threshold gradient value. A rule may be generated at 910F based at least in part upon the result of the gradient values of the intermediate layer. With the one or more keypoint supervision heads or branches determined at 904F, these one or more keypoint supervision heads or branches with multiple spatial resolutions may be added at 912F to the designated locations (e.g., after the intermediate layer described above with reference to 908F) in the neural network.

Figure 10A:
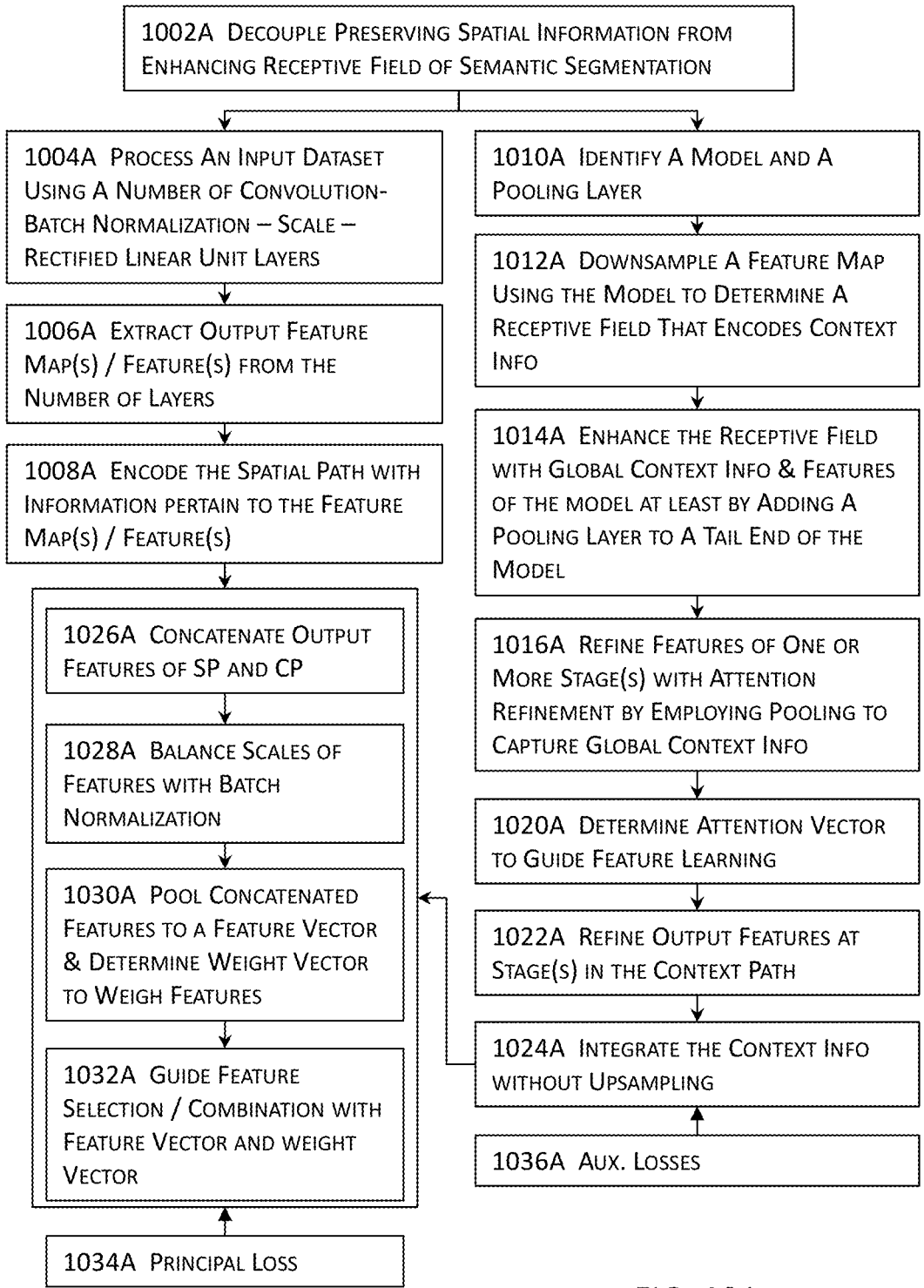
FIG. 10A illustrates another high-level schematic block diagram of semantic with multi-task deep learning and a concatenated dilation ladder (CDL) neural network while preserving spatial information and enhancing receptive field for computer vision in some embodiments.

FIG. 10A illustrates another high-level schematic block diagram of semantic with multi-task deep learning and a neural network while preserving spatial information and enhancing receptive field for computer vision in some embodiments. More specifically, FIG. 10A illustrates semantic segmentation by using a spatial path to preserve spatial information and a context path to increase the receptive field and further by fusing the respective outputs of the spatial path and the context path with a feature fusion layer. In these embodiments illustrated in FIG. 10A, preserving spatial information may be decoupled from enhancing the receptive field at 1002A for semantic segmentation. The blocks 1004A, 1006A, and 1008A on the left-hand side illustrates some example layers for the spatial path processing, and the blocks on the right-hand side 1010A, 1012A, 1014A, 1016A, 1020A, 1022A, and 1024A illustrates some example layers for the context path processing. The blocks in the lower left-hand corner 1026A, 1028A, 1030A, and 1032A illustrate some example blocks for feature fusion. The blocks in the lower right-hand corner 1016A, 1020A, 1022A, and 1024A illustrate some example attention refinement layers.

It shall be noted that the spatial path processing illustrated in FIG. 10A may be performed by using the neural network described in, for example, FIGS. 3-4 and 5A-5F and/or 6G. Regarding the spatial path, an input dataset may be processed at 1004A using a number of layers (e.g., convolution—batch normalization-scale—rectified linear unit). More details about each of these layers are described above with reference to, for example, FIGS. 3-4 and 5A-5F and/or 6G.

Output feature maps or features may be extracted at 1006A from one or more of the aforementioned layers in 1004A; and the spatial path may be encoded at 1008A with the information pertaining to the extracted feature maps or features. The spatial path or the information/data thereof may then be forwarded to the layer 1026A of a feature fusion layer where the output from the spatial path is concatenated with that from the context path. With the neural network described in, for example, FIG. 6G, the output from the spatial path corresponds to ⅛ of the original input image.

Regarding the context path, a model and a pooling layer may be identified at 1010A. In some embodiment, the model may be selected based at least in part upon the receptive field provided by the model. For example, a lightweight model such as an Xception model may be identified at 1010A. In some embodiments, multiple pooling layers having different scales may be identified at 1010A so as to capture the context (e.g., the global context) of an image to improve the network by a scale adaptive convolution layer in order to obtain an adaptive field of context information.

A receptive field that is used to encode context information may be determined at 1012A by down-sampling a feature map using the model identified at 1010A. The receptive field may be enhanced (e.g., increased) at 1014A with global context information and features of the model at least by adding a pooling to a tail end of the model identified at 1010A. In some embodiments, the pooling layer added to the tail end of the model may include, for example, a global average pooling layer, a max pooling layer, a pyramid pooling layer, an atrous spatial pyramid pooling layer, etc. The pooling layer to be added may be determined based at least in part upon, for example, a balance between performance of the context path and computing resource utilization. For example, the pyramid pooling layer and the atrous spatial pyramid pooling layer are known to be more computation demanding and memory consuming and may thus lower the speed of computation while consuming more resources.

The features from one or more stages may be refined at 1016A with attention refinement at least by employing one or more pooling layers to capture global context information that may be encoded into the context path. For example, an attention vector may be determined at 1020A to guide feature leaning as described above with reference to, for example, FIG. 6H. One or more output features may be refined at 1022A at one or more stages in the context path; and the context path information may be integrated and encoded in the context path at 1024A, without up-sampling. In some embodiments, one or more auxiliary loss functions may be employed at 1036A to train the context path.

For the spatial path, a principal loss function (e.g., the final loss or cumulative loss described above with reference to reference numeral 918C) may be employed to train the output of the spatial path and/or the output of feature fusion layer. That is, the principal loss function may be used to train the concatenated output of the entire network illustrated in FIG. 10A in some embodiments. In some embodiments, the spatial path and the context path are computed and processed in parallel to reduce latency in inference with the neural network and/or to expedite the training.

In some embodiments, a loss function may be softmax loss. These embodiments use a parameter alpha (e.g., alpha=1 in some embodiments) to balance the weight of the principal loss and auxiliary loss to produce the joint loss which may make an optimizer more comfortable to optimize the model.

The output of the attention refinement layer (e.g., from 1024A) may also be forwarded to the feature fusion layer. At 1026A, the output features from the spatial path (e.g., from 1008A) and the output features from the context path (e.g., from 1024A) may be concatenated at 1026A. This concatenated output may be further provided to 1028A that balances the different scales of some features with a batch normalization layer. Some embodiments pool the concatenated features to a feature vector (e.g., an attention vector described above with reference to FIG. 6I) and determine a weight vector to weigh various features at 1030A. These embodiments may then guide feature selection and feature combination with the feature vector and weight vector at 1032A.

The neural network described herein is benchmarked against some state-of-the-art networks. In the benchmarks, a dataset comprising 40 users using a 28:4:8 split among training, validation, and testing and comprises over 5,000 frames per user with a total of 225,733 frames. The respective impact of all the losses used in the training scheme have been evaluated with an ablation study. At runtime, the 2D predictions on input images are lifted to hybrid-3D using the depth image processed in parallel. The depth values are validated for at least the identified 2D keypoints using filtering and heuristics. The runtime performance of the neural network described herein is benchmarked with state-of-the-art neural networks (e.g., mvTensor) and shows around 16 ms latency that is at least 12× improvement in inference speed over those state-of-the-art neural networks. More importantly, the latency in the neural network is sufficient for mobile electronic devices including, for example, wearable electronic devices.

Figure 10B:
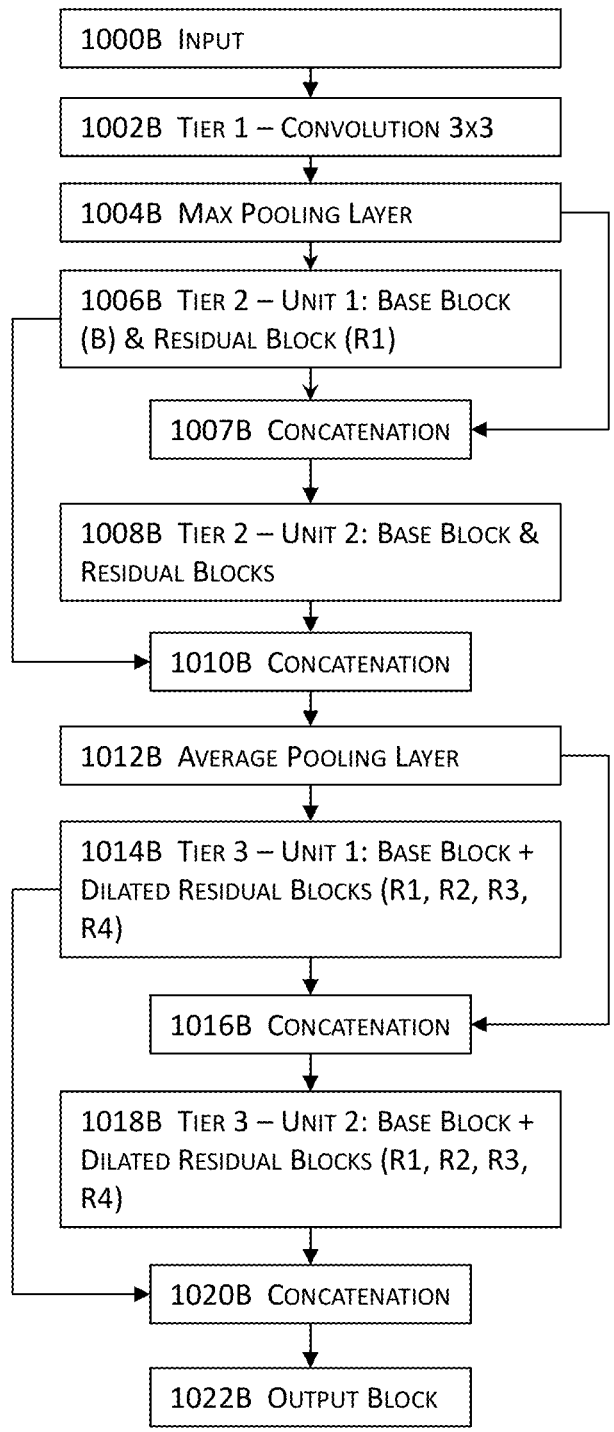
FIG. 10B illustrates another high-level schematic block diagram of a multi-tier encoder architecture in neural network with multi-task deep learning in some embodiments.

FIG. 10B illustrates another high-level schematic block diagram of a multi-tier encoder architecture in neural network with multi-task deep learning in some embodiments. In these embodiments illustrated in FIG. 10B, an encoder includes a sequence of tiers. A tier is a specific type of module in the sense of the Network-In-Network in some embodiments. A tier may receive a feature tensor, which may be optionally scaled, of the previous tier or the input image tensor in the case of the first tier. A tier includes a concatenated sequence of units. Some or all units within a tier may have the same output spatial resolution. In some embodiments, only the first unit is optionally allowed to change the spatial resolution from the input in, for example, the case where strided convolution is used instead of pooling. It does so by having a stride 2 convolution inside the first block in some embodiments.

A Unit includes a sequence of Blocks. The first Block may be referred to as a Base Block which, in some embodiments, may not include any Residual skip connections as inputs. For example, Tier 1 may include a 3×3 convolution layer with stride 2. In this example, Tier 1 includes a single simple unit which is a convolution layer. Some embodiments may include, for example, 5×5 and/or 7×7 convolution kernels and 7×1 plus 1×7 separable convolutions. These convolution kernels and convolutions may add additional complexity and compute while providing some gains in model accuracy.

In some embodiments, tier 2 includes more complex units, which includes a Base Block (B) followed by a Residual Block (R1) in FIG. 10B. Some embodiments concatenate two such Units (e.g., Unit 1 and Unit 2), although some other embodiments may use three or more Units. A Unit may receive, as input, the concatenation of the input to the first Unit, together with the outputs of some or all of the previous Units. In these embodiments, the output of the entire Tier is the concatenated output of all of its units. While the input to the first Unit may be visible to each of the Units within the Tier, some embodiments hide the input from the final output of the Tier. In these embodiments, the two separate concatenation pathways in FIG. 10B. In some embodiments that optionally do not hide the Tier's input from its output, then these embodiments may simplify this to only have a single concatenation pathway, rather than two. The hiding of an input may encourage a Tier to produce more transformative features, rather than simply refining and resizing features from the previous Tier in some embodiments.

A concatenated unit may add one or more feature channels to the output data tensor. In some embodiments, the number of features in a convolution layer may be bound, while still building up arbitrarily many feature channels and incurring only linear scaling of compute and model parameters. This may be because the compute cost and model size may be proportional to the square of the size of the convolution layers. Compared to some conventional approach (e.g., DenseNet), rather than dense (i.e., between every layer within what DenseNet calls a "Dense Block" is roughly analogous to our Units), some embodiments have far fewer concatenated connections and hence the compute, memory, and parameter cost is much lower because the concatenated connections are sparse (i.e., only at the Unit level).

Tier 3 is where the network has the most complex Units. A Unit in Tier 3 may include a Base Block plus a sequence of k Residual Blocks of increasing dilation size. In some embodiments, the sequence of k Residual Blocks has linearly increasing dilation size (e.g., 1, 2, 3, 4, . . . , etc.) In FIB. 10B, Tier 3 includes Unit 1 and Unit 2, where each of Unit 1 and Unit 2 includes a Base Block (B) plus a sequence of Residual Blocks (R1+R2+ . . . +Rk) in some embodiments. In some embodiments, Tier 3 may have chosen four Residual Blocks based at least in part on, for example, empirical evaluation on selected Validation datasets, or heuristics, etc. In some embodiments, the Base Block (B) plus the Residual Block (R1) units of Tier 2 represent a special case where the dilation ladders have k=1.

In some embodiments, the feature dimension of the output may be widened or increased by concatenating more Units. It shall be noted that Residual Blocks may require to have the same input and output feature dimensions in some embodiments. In these embodiments, Residual Blocks may not widen or increase the feature dimension (e.g., the number of output channels). Some or all of these Residual Blocks may refine their inputs and increase the receptive field size (e.g., increase the receptive field size rapidly due to, for example, the increasing dilation within the ladder) in some embodiments. In these embodiments, because the Dilation Ladders are additive, the Dilation Ladders allow features to be robustly scaled at different scales (e.g., a feature may receive a strong signal from a different Rk based on the apparent size and/or proximity of an object).

A Concatenated Dilation Ladders (CDL) architecture as illustrated in FIG. 10B may be agnostic to block structure in some embodiments. For instance, some embodiments may employ a (paired) 3×3 block structure of VGG or ResNet-34, or the 1-3-1 bottleneck block structure used by ResNet-50/101/152, as well as earlier architectures, including in some form IIRC the original Network In Network (NiN)). Moreover, the aforementioned "1-3-1" includes a 1×1 convolution followed by a 3×3 convolution followed by a 1×1 convolution (with or without activation functions such as ReLU applied in a channel-wise manner after each convolution layer) in some embodiments. In these embodiments, the activation (e.g., ReLU) may be applied after the 3×3 convolution. Some of these embodiments do not apply rectification after the 1×1 layers.

Some embodiments may use mostly 1-3g-1 bottleneck blocks where the bottleneck ratio is 1. It shall be noted that the bottleneck ratio may optionally be less than 1 (e.g., "channel squeezing") or greater than 1 (e.g., "inverted/ channel expanding"). The aforementioned "g" in "1-3g-1" stands from "grouped convolution" where the grouping factor may be set to the number of channels (C) into the convolution layer divided by kernel depth (kd), which results in the kernel depth of each convolutional kernel being equal to kd where kd is set to either 1, 2, or 4 depending on validation model performance versus compute cost in some embodiments. This grouping may be used in controlling the compute cost and model size because grouping renders the cost of the 3×3 convolution layers to grow linearly with respect to the number of channels due to the number of input and output channels being the same for Residual Blocks in some embodiments, rather than quadratically. The 3×3 layers may be expanded to wider k×k (where k>3) convolution kernels in some embodiments where more spatial receptive field and/or model power is desired. Because the kernel depth may be fixed to some small constant, expanding a convolution layer may not dramatically increase the compute cost or model size, as it would in conventional approaches (e.g., VGG or ResNet-50/101/152 style network).

In some cases, such as the Tier 2 Unit 1 Base Block, a "half bottleneck block" of type 3g-1 may be used to reduce compute cost vs the full 1-3g-1 bottleneck block. Half bottleneck blocks include either of type "3g-1" (3×3 grouped convolution followed by 1×1 convolution) or "1-3g" (by 1×1 convolution followed by 3×3 grouped convolution). These half-bottleneck blocks may save compute cost, memory, and model parameters at a slight expense of a very slightly worse model performance. Some embodiments may apply post-training sparsification (e.g., zero out sufficiently small weights of the network) to achieve, for example, 50% sparsification that generally does not adversely impact model validation performance. This may be performed on top of the folding of Scale and BatchNorm layers into the convolution layers, and the conversion of the weights from fp32 to fp16 in some embodiments.

A pooling layer may be employed between Tiers. In some embodiments, a stride 2 Max Pooling layer may be employed in between Tier 1 and Tier 2. Some other embodiments employ either overlapping Pooling (e.g., 3×3 windows) or non-overlapping (e.g., 2×2 windows) pooling based at least in part on, for example, the availability of efficient embedded implementations of the Pooling variant. Overlapping (3×3/s2) Pooling is more accurate but can be slightly more expensive.

An average pooling layer may be employed between Tiers 2 and 3 in some embodiments. The use of an average pooling in these embodiments, as found empirically, has produced superior model performance in certain cases. The choice between Max Pooling and Average Pooling may be determined by, for example, evaluation on Validation data sets in some embodiments.

In some other embodiments, one or more of the Pooling layers may be eliminated. These embodiments may apply a stride 2 Convolution to the subsequent Tier in the first Block of its first Unit. In some embodiments where 1-3g-1 Bottleneck blocks are used, grouped 3×3 convolution layer may be made stride 2.

In some embodiments, for example as illustrated in the aforementioned figures, Tier 3 includes a dilation ladder within each unit. In the figures, res1 corresponds to a dilation of 1, res2 corresponds to a dilation of 2, res3 corresponds to a dilation of 3, and res 4 corresponds to a dilation of 4. Tier 3 may include groups of 8. One or more DenseNet blocks may be used in Tier 2 and Tier 3, wherein two Conv-BN-S-ReLU model units may be used instead of four conventional units in order to reduce sequential compute. In some embodiments, fewer channels may be used to reduce parallel compute with, for example, 16 channels after Tier 1, 32 channels after Tier 2, and 64 channels after Tier 3. Furthermore, dilated convolutions may be used in Tier 3 to increase the receptive field of the relatively shallow network. One of ordinary skill in the art would appreciate that different numbers of channels may be used after each of the Tiers (e.g., Tier 1, Tier 2, and Tier 3).

In some of these embodiments, 16-channel outputs may be split up as 8-channel for left-hand keypoint prediction and 8-channel for right-hand keypoint prediction. In some embodiments, the last deconvolution layer may be removed, and the last convolution layer may be configured to produce 32 channels, instead of 16 channels so that the last layer now has 32 output channels, rather than 16 output channels, with outputs produced at half resolution as that of the input image(s). In these embodiments, bilinear up-sampling may be employed to recover full resolution. As an alternative to bilinear up-sampling, some embodiments may employ a learned up-sampling kernel that is applied lazily on to the highest response region (or one or more higher response regions) of a coarse keypoint heatmap. In some of these latter embodiments, the 32-channel outputs may be split up as 15 channels for the left-hand keypoints, 15 channels for the right-hand keypoints, and two segmentation channels reserved for enabling or disabling runtime segmentation. In some embodiments, a mixed bag of data having a varying number of labeled keypoints (e.g., up to 26 labeled keypoints) may be employed to the neural network to use these additional keypoints to provide auxiliary keypoint supervision.

In some embodiments, grouped convolutions may be employed/used at all but Tier 1 so as to reduce compute. For example, a grouping factor of 4 may be used in Tier 2 and a grouping factor of 8 may be used in Tier 3. In some embodiments, an encoder may be responsible for a majority of gains in performance, and changing a decoder may only marginally affect performance. In some embodiments, a key-point decoder may be very lean and all convolutions are channel wise (e.g., a number of groups may be equal to a number of channels).

With no grouping, a kernel in a convolution layer may be Y×Z×C, where C denotes the number of channels. In some embodiments where C is 32, and Y and Z are 3, the kernel of the convolution layer is 3×3×32. If, however, there is grouping, for example with 8 groups, then the kernel of the convolution layer is 3×3×4 per group with 8 groups, and all may be done in parallel.

A ConvT Upsample at an output of Tier 3 may be referred to as a first ConvT Upsample, a ConvT Upsample at an output of the first ConvT Upsample may be referred to as a second ConvT Upsample, and a ConvT Upsample at an output of the second ConvT Upsample may be referred to as a third ConvT Upsample. The output of the third ConvT Upsample is a same resolution as the input image or the modified input image. Each ConvT Upsample may include a deconvolution, a convolution, and a deconvolution. Each ConvT Upsample may be maximally grouped.

In some embodiments, the third ConvT Upsample may be replaced with a Bi-Linear Upsample. The output of the Bi-Linear Upsample is a same resolution as the input image or the modified input image. In a training implementation, the Bi-Linear Upsample may produce a full resolution, however, this may not be necessary in an embedded implementation. For example, with the Bi-Linear Upsample in an embedded implementation, only the portions where there are estimated key-points may be upsampled.

An embedded implementation of the network architecture disclosed herein may be carefully designed to reduce compute/memory overhead and energy consumption. For example, Myriad2 VPU runs at 600 MHz and provides 12 VLIW compute cores called SHVs. Under typical workloads, total power consumption of the Myriad2 chip is less than 2 W. Each SHV is allocated a 128 KB working memory slice out of 2 MB on-chip SRAM. In some embodiments, a Gestures DNN may perform real-time 45 frames-per-second (FPS) hand tracking and gesture recognition using a single SHV.

In some embodiments, using conventional implementations makes these minimization challenging for several reasons: (a) typical deep learning frameworks convert convolution into a large matrix multiplication in a highly memory inefficient way, (b) input data tensors are typically stored in channel planar format, which is inefficient for vectorization, (c) the kernel sizes are often not a multiple of the vector instruction width, and (d) off-the-shelf implementations of dilated convolutions have considerable computational overhead.

To address these challenges, input data channels may be reordered and interleaved to each convolution layer to align with vector instruction ordering and a kernel stack may be reordered simultaneously such that convolutions are reduced to dot products and an output channel is automatically encoded in the interleaved format for the next layer/tier. Further, convolution layers may be grouped so that the number of filters per group are a multiple of the register lanes, consequently, maximizing vector register utilization. Further yet, a comb design may be used for dilated convolutions which minimizes the on-chip memory footprint. For example, for dilation=2, convolution may be split into 4 independent field-wise computations (even rows-even columns, even-odd, etc.) which are computed independently and recombined on output. Dilated convolutions may be thus computed at zero effective overhead.

A multi-task learning paradigm may be adopted in the training procedure by employing multiple network predictions and loss functions, while maintaining the prime focus on 2D key-point prediction. At inference time, only a primary encoder and decoder are part of the network running on device.

Cross entropy with 1-hot label may be used to predict each of the N*2 key-points (N key-points per hand). An aggressive down-sampling in the early layers coupled with the low network capacity, makes the conventional mean squared loss (MSE) loss ineffective. Cross entropy has a stronger gradient signal and is much more effective. In some embodiments, label smoothing may not lead to observable performance gains.

Given that there are M key-point labels per hand, the additional key-points (M-N) may be used as/in training supervision, even though they are not part of the final inference module. As the decoder is fully grouped, some key-points may fail to train all together. In some embodiments, the decoder for the auxiliary key-points are not grouped so as to avoid floating key-points and regularize the feature tensor after the encoder.

In some embodiments, the binary key-point and hand visibility masks serve three purposes: make training stable, suppress occluded key-points and invisible hands during inference, and enable an early out during inference to reduce latency. Binary cross entropy loss may be used to train these tasks.

In some embodiments, data collected (e.g., training data) may be heavily skewed against palm facing data causing the trained model to under-perform on palm-facing data. To address this, the predictions may be regularized using a categorical hand orientation loss. 8 categorical hand orientations that could arise from supination or pronation of the hand may be labeled. Since the categories are approximate, labels may be softened and cross-entropy loss may be used to train these tasks.

Hand pose may be classified into nine discrete classes: OK, open-hand, pinch, C-pose, fist, L-pose, point, thumbs-up, and a dummy class capturing all other poses. Cross entropy loss may be used to train the discrete hand-pose classification.

Following the architecture of BiseNet, the network architecture disclosed herein may be used as the context path and use a spatial path similar to BiseNet as a training-time artifact to provide useful supervision that regularizes the key-points that jump off the hand. The network may be trained to segment three classes: background, left hand and right-hand using a per-pixel cross entropy loss.

It may be observed that key-points often fail to train due to the grouped structure of decoder. Following Training deeper convolutional networks with deep supervision. Additional key-point supervision heads may be added after three intermediate layers, with different spatial resolutions: Tier 3 of the primary encoder (⅛th the full resolution), the first up-sampling block (¼th the full resolution) the second up-sampling block (½ the full resolution), and the third up-sampling block (the full resolution). In some embodiments, this stabilizes training and facilitates better gradient flow for training.

A final loss is a weighted sum of all the individual task losses: primary key-point loss Lkp, auxiliary key-point loss Lakp, key-point and hand visibility loss Lkphv, categorical hand orientation loss Lcho, discrete hand pose loss Ldhp, segmentation loss Lseg, deep supervision loss Lds.

Task-weighting may be used to weigh the different losses, as the predictions are not all at the same scale. The weights for the different tasks were derived heuristically, but can be replaced with an adaptive weighting using gradient normalization. The full training loss with all task losses and corresponding weights are shown in the example of Equation 1.

Equation 1

$$Ltotal = wkpLkp + wakpLakp + wkphvLkphv + wchoLcho + wdhpLdhp + wsegLseg + wdsLds \quad (1)$$

For example, in Equation 1, wkp=1, wakp=1, wkphv=20, wcho=20, wdhp=10, wseg=50, wds=1.

It may be empirically observed that the network finds it harder to predict finger tips when compared to the other key-points. This may be addressed by doubling the losses for finger tips while calculating Lkp and Lakp.

TABLE 1

Ablation study: Each supervision technique is removed and the corresponding average key-point errors are shown. $\mathcal{W}_i$ here represents key-point loss weighting

| Input mode | $\mathcal{L}_{seg}$ | $\mathcal{L}_{ds}$ | $\mathcal{L}_{cho}$ | $\mathcal{W}_{fk}$ | $\mathcal{L}_{kphv}$ | $\mathcal{L}_{dhp}$ | Err (px) |
|---|---|---|---|---|---|---|---|
| Depth | x | x | x | x | x | x | 6.226 |
| Amplitude | x | x | x | x | x | x | 6.054 |
| Amplitude | ✓ | ✓ | x | ✓ | ✓ | ✓ | 5.941 |
| Amplitude | ✓ | ✓ | ✓ | x | ✓ | ✓ | 5.730 |
| Amplitude | ✓ | x | ✓ | ✓ | ✓ | ✓ | 5.994 |
| Amplitude | x | ✓ | ✓ | ✓ | ✓ | ✓ | 5.690 |
| Amplitude | ✓ | ✓ | ✓ | ✓ | ✓ | x | 5.655 |

TABLE 1-continued

Ablation study: Each supervision technique is removed
and the corresponding average key-point errors are shown.
$\mathcal{W}$ here represents key-point loss weighting

| Input mode | $\mathcal{L}_{seg}$ | $\mathcal{L}_{ds}$ | $\mathcal{L}_{cho}$ | $\mathcal{W}_{\ell k}$ | $\mathcal{L}_{kphv}$ | $\mathcal{L}_{dhp}$ | Err (px) |
|---|---|---|---|---|---|---|---|
| Depth | ✓ | ✓ | ✓ | ✓ | ✓ | ✓ | 5.898 |
| Amplitude | ✓ | ✓ | ✓ | ✓ | ✓ | ✓ | 5.556 |

TABLE 2

Comparison of size, computational cost and performance
between DenseNet, MobileNet-V2 and Our implementation.

| Backbone | Parameters | GFLOPs | Key point Error |
|---|---|---|---|
| DenseNet | 7.017M | 4.866 | 4.457 px |
| MobiteNetV2 | 1.893M | 1.209 | 5.306 px |
| Ours | 0.041M | 0.035 | 5.556 px |

Various example embodiments of the disclosure are described herein. Reference is made to these examples in a non-limiting sense. Examples are provided to illustrate more broadly applicable aspects of the invention. Various changes may be made to various embodiments described herein and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The above description of illustrated embodiments is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other devices that implement virtual or AR or hybrid systems and/or which employ user interfaces, not necessarily the example AR systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof.

In one embodiment, the present subject matter may be implemented via Application Specific Integrated Circuits (ASICs), Field Programmable Gate Array (FPGA), etc. However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory computer-readable medium" may be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

Many of the methods described herein can be performed with variations. For example, many of the methods may include additional acts, omit some acts, and/or perform acts in a different order than as illustrated or described. Various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

Moreover, the various embodiments described above can be combined to provide further embodiments. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A mobile electronic device with an embedded implementation of a neural network, comprising:
   a mobile communication device; and
   an embedded implementation of a neural network in multi-task deep learning paradigm for machine vision, wherein the neural network in the embedded implementation comprises:
      a vision processing unit having a plurality of super hi-vision (SHV) processors or processor cores;
      an encoder comprising a first tier, a second tier, and a third tier, wherein each tier comprises a respective number of unit blocks,
         each succeeding tier receives a respective output from an immediately preceding tier and has a higher network complexity than the immediately preceding tier,
   wherein the embedded implementation of the neural network comprises:
      a visibility decoder layer that is operatively coupled to the encoder and is used to determine one or more masks based at least in part upon an encoder output received from the encoder and a binary cross-entropy loss of the visibility decoder layer;
      a keypose decoder layer that is operatively coupled to the encoder, that is used to receive the encoder output from the encoder, and that corresponds to a classification loss of a keypose predicted from one or more keypoints in an input to the embedded implementation; and
      an orientation decoder layer that is operatively coupled to the encoder and is used to regularize predictions by the embedded implementation based at least in part upon the encoder output received from the encoder and a categorical orientation loss of the orientation decoder layer.

2. The mobile electronic device of claim 1, wherein
   the first-tier unit comprises a convolution layer logically followed by a batch normalization layer that is further logically followed by a scale layer,
   the first-tier unit further comprises a rectified linear unit that logically follows the scale layer,
   the second tier comprises a bottleneck block or a half bottleneck block including a grouped convolution, and
   at least one of the plurality of SHV processors or processor cores allows the neural network to explicitly specify a plurality of instructions to execute in parallel, rather than sequentially executing the plurality of instructions.

3. The mobile electronic device of claim 1, the second tier comprising a first second-tier unit and a second second-tier unit, wherein
   the first tier comprises a first-tier unit that further comprises one or more first-tier unit blocks,
   the second tier comprises a first second-tier unit,
   the first second-tier unit receives a first-tier output from the first tier and comprises a first second-tier first-unit block and a second second-tier first-unit block,
   both the first second-tier first-unit block and the second second-tier first-unit block respectively comprise a corresponding batch normalization layer followed by a corresponding scale layer that is further logically followed by a corresponding rectified linear unit, the corresponding batch normalization layer in the first second-tier first-unit block logically follows a first convolution layer, the corresponding batch normalization layer in the second second-tier first-unit block logically follows a second convolution layer, and the first convolution layer is different from the second convolution layer.

4. The mobile electronic device of claim 1, further comprising:

nonlinearly expanding a receptive field of the neural network without loss of resolution or coverage at least by configuring the second tier with one or more first factors and configuring the third tier of the neural network with one or more second factors, wherein the one or more first factors and the one or more second factors jointly define nonlinearity of expanding the receptive field of the neural network, a first-tier output generated by the first tier concatenated with a second-tier output generated by the second tier and provided as a third-tier input to the third tier, wherein the third tier comprises a first third-tier unit and a second third-tier unit, the first third-tier unit comprises multiple third-tier first-unit blocks located at respective first-unit hierarchical levels, and at least some of the multiple third-tier first-unit blocks comprise different dilated convolution layers corresponding to more than one first dilation factor.

5. The mobile electronic device of claim 4, wherein the second third-tier unit comprises multiple third-tier second-unit blocks located at respective second-unit hierarchical levels, at least some of the multiple third-tier second-unit blocks comprise a plurality of dilated convolution layers respectively corresponding to more than one second dilation factor, and the multiple third-tier first unit blocks and the multiple third-tier second unit blocks comprise at least one respective dilated convolution layer and a plurality of respective residual blocks for training at least the encoder of the neural network in a deep learning paradigm.

6. The mobile electronic device of claim 4, wherein a second tier output is provided to the third tier as a third-tier input and is further concatenated with a third-tier output generated by the third tier as a final concatenated output for the neural output, and training at least the encoder of the neural network in the deep learning paradigm comprises backpropagating the one or more losses using at least an activation layer and the binary cross-entropy loss.

7. The mobile electronic device of claim 3, wherein the second second-tier unit comprises a first second-tier second-unit block that receives a concatenated output from the second second-tier first-unit block and the first-tier output, a second second-tier second-unit block, and a third second-tier second-unit block, the first second-tier second-unit block, the second second-tier second-unit block, and the third second-tier second-unit block respectively comprise the batch normalization layer followed by the scale layer that is further logically followed by the rectified linear unit, the batch normalization layer in the first second-tier second-unit block logically follows the second convolution layer, the batch normalization layer in the second second-tier second-unit block logically follows the first convolution layer, the batch normalization layer in the third second-tier second-unit block logically follows the second convolution layer, and the third second-tier second-unit block is configured to generate a second-tier output.

8. The mobile electronic device of claim 1, further comprising a decoder operatively coupled to the encoder to receive an encoder output from the encoder, wherein at least the second tier and the third tier in the embedded implementation are configured not to include deconvolution layers while maintaining a resolution in outputs of the embedded implementation.

9. The mobile electronic device of claim 1, wherein the neural network in the embedded implementation simultaneously reorders a kernel stack.

10. The mobile electronic device of claim 1, further comprising: grouping, by the neural network in the embedded implementation, multiple convolutional layers of the neural network into one or more groups such that a number of filters in a group of the one or more groups is equal to a multiple of a total number of lanes of an SHV processor or processor core, wherein the SHV processor or processor core comprises a total number of registers that is divided among the total number of lanes for processing one or more data elements in a processor instruction.

11. The mobile electronic device of claim 1, wherein the embedded implementation further comprises:

a spatial path that is configured for encoding low-level information or data in the neural network of the embedded implementation; and a context path that is configured for encoding high-level information or data in in the neural network of the embedded implementation, wherein the spatial path is configured to generate a first output, the context path is configured to generate a second output, the high-level information or data comprises global context information, and the low-level information or data comprises more details than the high-level information or data.

12. The mobile electronic device of claim 11, wherein the embedded implementation further comprises:

a fusion block that concatenates first data pertaining to the first output from the spatial path with second data pertaining to the second output from the context path into a concatenated output; and a normalization block that balances a plurality of scales in concatenated data of the concatenated output.

13. The mobile electronic device of claim 12, wherein the embedded implementation is further configured to perform a set of acts, the set of acts comprising:

receiving the first output from the spatial path; and processing the first output of the spatial path through a plurality of down-sampling layers to produce a down-sampled output for the spatial path, wherein each down-sampling layer corresponds to a respective down-sampling rate, and each succeeding down-sampling layer has a greater down-sampling rate than an immediately preceding down-sampling layer.

14. The mobile electronic device of claim 13, wherein the embedded implementation is further configured to perform a set of acts, the set of acts further comprising:

transmitting a first down-sampled output from a next to last down-sampling layer of the plurality of down-sampling layer to a last down-sampling layer and a first attention layer;

generating, by the first attention layer, a first attention layer output;

transmitting a second down-sampled output from the last down-sampling layer of the plurality of down-sampling layer to a second attention layer; and generating, by the second attention layer, a second attention layer output; and transmitting the first attention output and the second attention output to the fusion block for concatenation.

15. The mobile electronic device of claim 14, wherein the first and the second attention layers respectively capture context data and refine predictions of the neural network, without up-sampling.

16. The mobile electronic device of claim 12, wherein the embedded implementation further comprises:

a pooling block that determines a weight vector for the concatenated data of the concatenated output and re-weighs the concatenated data for selection and combination of at least some of the concatenated data into combined concatenated data.

17. The mobile electronic device of claim 16, wherein the embedded implementation further comprises:

a first convolution layer that is configured to receive the combined concatenated data as an input and to generate a first convolution output based at least in part upon the input;

a normalization layer that is configured to receive, from the convolution layer, and balance a plurality of scales from the convolution output generated by the spatial path and the context path and to generate a normalized output;

an activation function that is configured to receive the normalized output from the normalization layer and to generate an activated output; and a second convolution layer that is configured to receive the activated output from the activation function and to determine a second convolution output based at least in part upon the activated output.

18. The mobile electronic device of claim 1, further comprising:

performing group convolutions in the second tier using a grouping factor and a second number of channels, wherein the first tier employs a first number of channels for processing but does not perform group convolutions;

performing separate group convolutions in the third tier using a different grouping factor and a third number of channels.

19. The mobile electronic device of claim 18, wherein the second number is greater than the first number, and the third number is greater than the second number, and the different grouping factor for the third tier is greater than the grouping factor for the second tier.

* * * * *